US010212491B2

United States Patent
Denoual et al.

(10) Patent No.: US 10,212,491 B2
(45) Date of Patent: Feb. 19, 2019

(54) METHOD, DEVICE, AND COMPUTER PROGRAM FOR ENCAPSULATING PARTITIONED TIMED MEDIA DATA USING SUB-TRACK FEATURE

(71) Applicant: CANON KABUSHIKI KAISHA, Tokyo (JP)

(72) Inventors: Franck Denoual, Saint Domineuc (FR); Frédéric Maze, Langan (FR); Jean Le Feuvre, Cachan (FR); Cyril Concolato, Combs La Ville (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/906,534

(22) PCT Filed: Jul. 21, 2014

(86) PCT No.: PCT/EP2014/065654
§ 371 (c)(1),
(2) Date: Jan. 20, 2016

(87) PCT Pub. No.: WO2015/011108
PCT Pub. Date: Jan. 29, 2015

(65) Prior Publication Data
US 2016/0165321 A1  Jun. 9, 2016

(30) Foreign Application Priority Data
Jul. 23, 2013 (GB) .................... 1313157.8

(51) Int. Cl.
*H04N 21/845* (2011.01)
*H04N 21/4728* (2011.01)
(Continued)

(52) U.S. Cl.
CPC ........... *H04N 21/845* (2013.01); *H04N 19/17* (2014.11); *H04N 19/30* (2014.11); *H04N 19/70* (2014.11);
(Continued)

(58) Field of Classification Search
CPC .. H04N 21/85406; H04N 19/70; H04N 19/46; H04N 21/234345; H04N 21/4728;
(Continued)

(56) References Cited

U.S. PATENT DOCUMENTS 9,354,799 B2 * 5/2016 Shivadas ............... G06F 3/0485
2002/0085219 A1 * 7/2002 Ramamoorthy ........ G06T 15/10
358/1.9
(Continued)

FOREIGN PATENT DOCUMENTS

WO    WO 2012168365 A1 * 12/2012 ........... H04N 21/218

OTHER PUBLICATIONS

Le Feuvre et al., "Describing HEVC Tiles in ISOBMFF", International Organisation for Standardisation, ISO/IEC JTC1/SC29/WG11, MPEG2013/M30294, Jul. 2013, Vienna (AT) pp. 1-4.
(Continued)

*Primary Examiner* — Nathan J Flynn
*Assistant Examiner* — Cynthia M Fogg
(74) *Attorney, Agent, or Firm* — Canon U.S.A., Inc. I.P. Division

(57) ABSTRACT

The invention relates to encapsulating partitioned timed media data to be streamed to a client's device, the partitioned timed media data comprising timed samples, each comprising a plurality of subsamples. After having grouped several of the subsamples to form at least one group so that at least part of the subsamples belongs to a group of subsamples, at least two subsamples of the same group are selected from amongst the plurality of subsamples of one of the timed samples and at least one track comprising the selected subsamples is created. Next, for the at least one created track, one sub-track box is created for each of the subsamples selected to create the at least one track, at least one of the created sub-track boxes comprising definitions and properties that are common to the selected sub-samples. Each of the created tracks is independently encapsulated in at least one media file.

20 Claims, 20 Drawing Sheets

(51) Int. Cl.
  *H04N 21/6587* (2011.01)
  *H04N 21/854* (2011.01)
  *H04N 19/70* (2014.01)
  *H04N 19/30* (2014.01)
  *H04N 19/17* (2014.01)
  *H04N 21/438* (2011.01)

(52) U.S. Cl.
  CPC ..... *H04N 21/4382* (2013.01); *H04N 21/4728* (2013.01); *H04N 21/6587* (2013.01); *H04N 21/8451* (2013.01); *H04N 21/854* (2013.01); *H04N 21/85406* (2013.01)

(58) Field of Classification Search
  CPC ...... H04N 21/845; H04N 19/17; H04N 19/30; H04N 21/4382; H04N 21/6587; H04N 21/8451; H04N 21/854
  USPC .......................................................... 725/116
  See application file for complete search history.

(56) References Cited

U.S. PATENT DOCUMENTS

| | | | |
|---|---|---|---|
| 2003/0177470 A1* | 9/2003 | Lifshitz | G06T 9/00 717/106 |
| 2005/0200762 A1* | 9/2005 | Barletta | G06F 17/30802 348/700 |
| 2006/0242240 A1* | 10/2006 | Parker | H04N 7/17318 709/205 |
| 2008/0159639 A1* | 7/2008 | Dvir | H04N 19/176 382/236 |
| 2012/0005303 A1* | 1/2012 | Hwang | H04N 21/23614 709/217 |
| 2013/0101035 A1* | 4/2013 | Wang | H04N 19/70 375/240.12 |
| 2015/0016514 A1* | 1/2015 | Wang | H04N 19/46 375/240.08 |

OTHER PUBLICATIONS

File Format Editors. "WD of ISO/IEC 14496-15:2013 AMD 2 Sample Groups and Sub-Track Definitions for HEVC tiles", International Organisation for Standardisation, ISO/IEC JTC1/SC29/WG11 MPEG2013/M13670, Jul. 2013, Vienna, (AT), pp. 1-6: Section 8.5.4 TileRegionGroupEntry; Section 8.5.5 TileSetGroupEntry; Section 8.5.6 Tile Sub track definition.

Le Feuvre et al: "Support for efficient tile access in the HEVC File Format". International Organisation for Standardisation ISO/IEC JTC1/SC29/WG11, MPEG2012/M29231, Apr. 2013, Incheon (KR), Telecom ParisTech, Canon Research Centre France, pp. 1-12.

International Standard, ISO/IEC 14496-15, Third edition (2013), Information Technology—Coding of audio-visual objects, Part 15: Carriage of NAL unit structured video in the ISO Base Media File Format, pp. 1-118: chapter 8. HEVC elementary streams andsample definitions; Annex B Chapter 6. Sub track definitions.

International Standard, ISO/IEC 14496-12, Information technology—Coding of audio-visual objects, Part 12: ISO base media file format, Draft 4th edition, (2012), pp. 1-190: citing Chapter 8.14 Sub tracks.

Hirabayashi et al., "Proposal to access HEVC Tile in the HEVC File Format", International Organisation for Standardisation ISO/IEC JTC1/SC29/WG11, MPEG2013/m30371, Jul. 2013, Vienna, Austria, pp. 1-6.

Andersson et al., "Sub tracks for HEVC file format", International Organisation for Standardization, ISO/IEC JTC1/SC29/WG11 MPEG2012/M30255, Jul. 2013, Vienna, Austria, pp. 1-6.

* cited by examiner

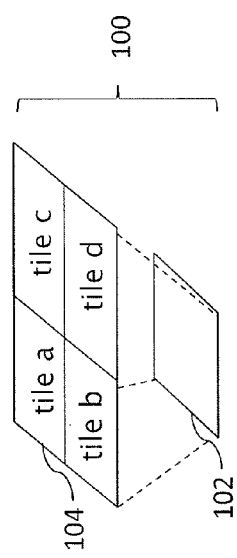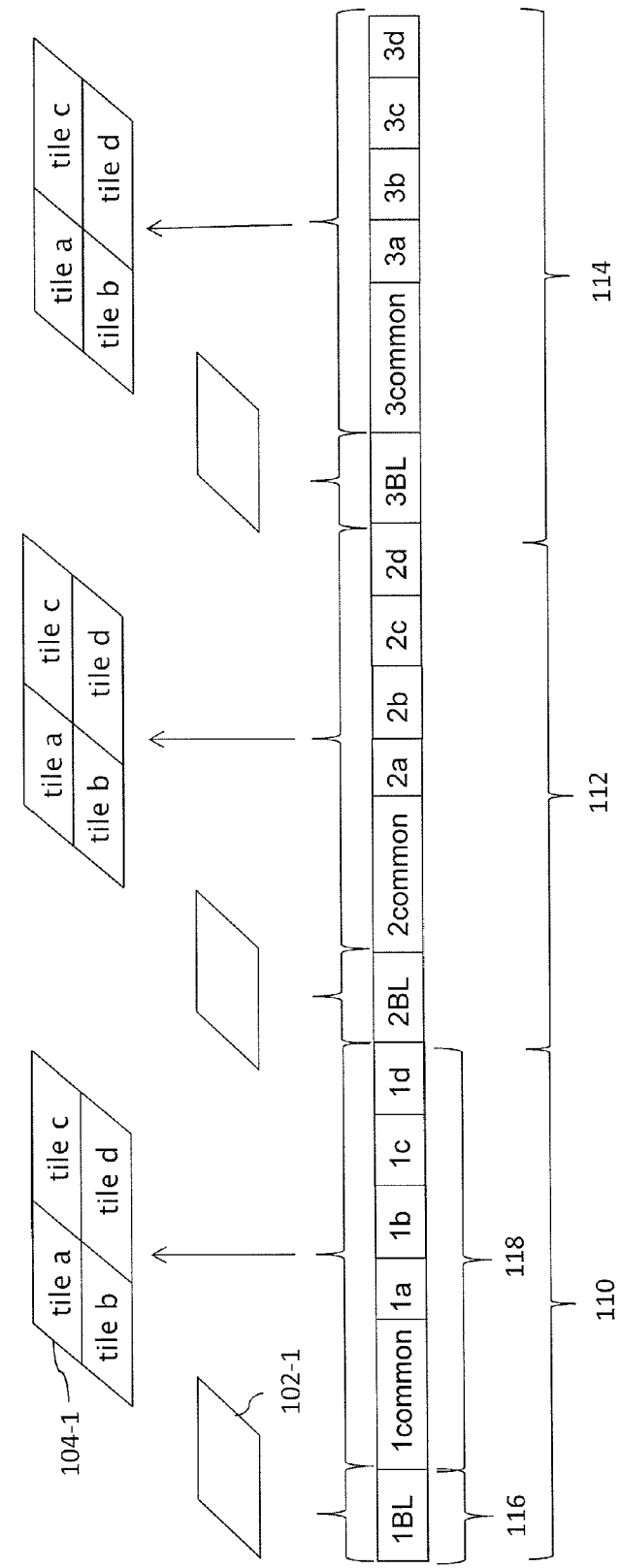
Fig. 1a
Fig. 1b

METHOD, DEVICE, AND COMPUTER PROGRAM FOR ENCAPSULATING PARTITIONED TIMED MEDIA DATA USING SUB-TRACK FEATURE

This application is a national phase application of PCT application no. PCT/EP2014/065654 filed on Jul. 21, 2014 and which claims the benefit under 35 U.S.C. § 119(a)-(d) of United Kingdom Patent Application No. 1313157.8, filed on Jul. 23, 2013 and entitled "method, device, and computer program for encapsulating partitioned timed media data using sub-track feature". The above cited patent applications are incorporated herein by reference in their entirety.

FIELD OF THE INVENTION

The invention generally relates to the field of encapsulation of timed media data, e.g. according to Base Media File Format as defined by the MPEG standardization organization, to improve stream delivery, in particular regarding HTTP (HyperText Transfer Protocol) streaming of user-selected regions of interest in compressed video streams. More particularly, the invention concerns a method, device, and computer program for encapsulation of an elementary stream containing partitioned data such as spatial tiles allowing efficient streaming of data, in particular of one or more tiles, using sub-track feature.

BACKGROUND OF THE INVENTION

Video coding is a way of transforming a series of video images into a compact digitized bit-stream so that the video images can be transmitted or stored. An encoding device is used to code the video images, with an associated decoding device being available to reconstruct the bit-stream for display and viewing. A general aim is to form the bit-stream so as to be of smaller size than the original video information. This advantageously reduces the capacity required of a transfer network, or storage device, to transmit or store the bit-stream code. To be transmitted, a video bit-stream is generally encapsulated according to a transmission protocol that typically adds headers and check bits.

Recently, the Moving Picture Experts Group (MPEG) published a new standard to unify and supersede existing streaming solutions over HTTP (HyperText Transfer Protocol). This new standard, called "Dynamic adaptive streaming over HTTP (DASH)", is intended to support a media-streaming model over HTTP based on standard web servers, in which intelligence (i.e. selection of media data to stream and dynamic adaptation of the bit-streams to user choices, network conditions, and client capabilities) relies exclusively on client choices and devices.

In this model, a media presentation is organized in data segments and in a manifest called "Media Presentation Description (MPD)" that represents the organization of timed media data to be presented. In particular, a manifest comprises resource identifiers to use for downloading data segments and provides the context to select and combine those data segments to obtain a valid media presentation. Resource identifiers are typically HTTP-URLs (Uniform Resource Locator), possibly combined with byte ranges. Based on a manifest, a client device determines at any time which media segments are to be downloaded from a media data server according to its needs, its capabilities (e.g. supported codecs, display size, frame rate, level of quality, etc), and depending on network conditions (e.g. available bandwidth).

In addition, video resolution is continuously increasing, going from standard definition (SD) to high definition (HD), and to ultra-high definition (e.g. 4K2K or 8K4K, that is to say video comprising images of 4,096×2,400 pixels or 7,680×4,320 pixels). However, not all receiving and video decoding devices have resources (e.g. network access bandwidth or CPU (Central Processing Unit)) to access video in full resolution, in particular when video is of ultra-high definition, and not all users need to access such video. In such a context, it is particularly advantageous to provide the ability of accessing only some Regions-of-Interest (ROIs) that is to say to access only some spatial sub-parts of a whole video sequence.

A known mechanism to access spatial sub-parts of frames belonging to a video consists in organizing each frame of the video as an arrangement of independently decodable spatial areas generally referred to as tiles. Some video formats such as SVC (Scalable Video Coding) or HEVC (High Efficiency Video Coding) provide support for tile definition. A user-defined ROI may cover one or several contiguous tiles.

Accordingly, for streaming user-selected ROIs according to HTTP protocol, it is important to provide encapsulation of timed media data of an encoded video bit-stream in a way that enables spatial access to one or more tiles and that enables combination of accessed tiles.

It is to be recalled that encoded video bit-streams are generally constructed as a set of contiguous temporal samples that correspond to complete frames, the temporal samples being organized as a function of the decoding order. File formats are used to encapsulate and describe such encoded bit-streams.

For the sake of illustration, the International Standard Organization Base Media File Format (ISO BMFF) is a well-known flexible and extensible format that describes encoded timed media data bit-streams either for local storage or transmission via a network or via another bit-stream delivery mechanism. This file format is object-oriented. It is composed of building blocks called boxes that are sequentially or hierarchically organized and that define parameters of the encoded timed media data bit-stream such as timing and structure parameters. According to this file format, the timed media data bit-stream is contained in a data structure referred to as mdat box that is defined in another data structure referred to as track box. The track represents a timed sequence of samples where a sample corresponds to all the data associated with a single timestamp that is to say all the data associated with a single frame or all the data associated with several frames sharing the same timestamp.

For scalable video such as video of the SVC format, the layered media data organization can be efficiently represented by using multiple dependent tracks, each track representing the video at a particular level of scalability. In order to avoid data duplication between tracks, extractors can be used. According to a standard file format, an extractor is a data structure directly included in a bit-stream that enables efficient extraction of network abstraction layer (NAL) units from other bit-streams. For instance, the bit-stream of an enhancement layer track may comprise extractors that reference NAL units from a base layer track. Then later on, when such enhancement layer track is extracted from the file format, extractors must be replaced by the data that they are referencing to.

Several strategies can be adopted when using ISO BMFF embedding these mechanisms to describe sub-information and to ease access to this sub-information or to efficiently organize bit-streams into multiple segments.

For example, in the article entitled "Implications of the ISO Base Media File Format on Adaptive HTTP Streaming of H.264/SVC", the authors, Kofler et al., present three different strategies for organizing a scalable video bit-stream (H264/SVC) for HTTP streaming considering possibilities as well as limitations of the ISO BMFF:

a) a single file containing a particular file header comprising a file type box "ftyp" and a movie box "moov" containing all ISO BMFF metadata (including track definitions), the single file also comprising a single mdat box containing the whole encoded bit-stream. This organization is suitable for local storage but is not adapted to HTTP streaming where a client may only need a part of the whole bit-stream;

b) a single file containing multiple moof/mdat boxes suitable for fragmentation. This format allows for progressive download. The moof box is equivalent to the moov box at fragment level. According to this scheme, using a fragmented media file, the scalable bit-stream is split into multiple dependent tracks representing the video at different scalability levels. Extractors are used to reference NAL units from other tracks. In case a track per tile is used, all addressable tracks have to be prepared in advance and tracks cannot be selected independently. If several tiles are to be displayed, several bit-streams must be decoded and the base layer is decoded several times;

c) multiple segments files, each file being accessible by its own URL and being downloadable independently. Each segment typically consists of a segment type box (styp), which acts as a kind of file header, an optional segment index box (sidx) and one or multiple fragments. Again, each fragment consists of a moof and a mdat box. According to this scheme, using a fragmented media file, each track is stored in its own segment with the associated bit-stream related to one level of scalability. If necessary, extractors are used to reference required bit-stream from dependent tracks. Such a coding scheme is particularly suitable for streaming tracks independently. It is well adapted to the DASH standard but it is not suitable for tile streaming since several bit-streams are to be decoded and thus, one decoder per track is required. Moreover, there is a potential duplication of the base layer's bit-stream when selecting more than one tile.

When applied to spatial tiles, none of these strategies allows efficient access to specific tiles in the context of HTTP streaming. Indeed with existing file format definition, it would still be necessary to access a multiple number of non-continuous byte ranges in an encoded bit-stream or it would result in bit-stream duplication in order to display spatial tiles of several frames corresponding to a given time interval.

To solve these issues, there is provided an efficient data organization and track description scheme suitable for spatial tiles, which ensures, whatever track combination is selected by a client application, that the result of the ISO BMFF parsing always leads to a valid video elementary bit-stream for the video decoder.

SUMMARY OF THE INVENTION

Faced with these constraints, the inventors provide a method and a device for encapsulating partitioned timed media data in a server and for providing a timed media data bit-stream from partitioned timed media data encapsulated in media files.

It is a broad object of the invention to remedy the shortcomings of the prior art as described above.

According to an aspect of the invention there is provided a method of encapsulating partitioned timed media data in a server, the partitioned timed media data comprising timed samples, each timed sample comprising a plurality of subsamples, the method comprises:

selecting at least one subsample from amongst the plurality of subsamples of one of the timed samples;

for each selected subsample, creating one partition track comprising the selected subsample and one corresponding subsample of each of the other timed samples;

creating at least one dependency box, each dependency box being related to a partition track and comprising at least one reference to one or more of the other created partition tracks, the at least one reference representing a decoding order dependency in relation to the one or more of the other partition tracks; and independently encapsulating each of the partition tracks in at least one media file.

Accordingly, the invention enables the combination of different portions, and in particular of different subsamples (or "tiles"). It is associated with the creation of a valid file format and an elementary stream at parsing time by the client whatever the selected set of portions or tiles downloaded by a client device.

Therefore, the method of the invention is suitable for efficient streaming of independent portions or tiles, given it requires only useful data to be sent to a client device. It is suitable for streaming more than one portion or tile selection (i.e. arbitrary Region Of Interest), given it reduces transmission overhead (compared to sample based byte-range requests), and can be integrated in a MPEG standard.

In an embodiment, the method further comprises a step of creating at least one other dependency box, each other dependency box being related to a partition track and comprising at least one reference to one or more of the other created partition tracks, each of the references of the at least one other dependency box representing a decoding dependency.

In an embodiment, the partitioned timed media data are tiled timed media data, the subsamples being spatial subsamples, the at least one partition track being at least one tile track.

In an embodiment, the method further comprises a step of creating a track fragment header associated to each partition track, which comprises initialization parameters relative to the considered partition track, at least one track fragment header comprising a dependency box with the decoding order dependency of the considered partition track relatively to the other partition tracks.

In an embodiment, the method further comprises a step of creating at least one reference track comprising at least one reference to at least one created partition track and a step of independently encapsulating the at least one reference track in a media segment file, wherein the media segment file resulting from encapsulating the at least one reference track comprises a data structure for storing metadata including definitions, the definitions comprising a list of referenced partition tracks associated with the at least one created composite track, a reference type being associated with each of the referenced partition tracks associated with the at least one created composite track.

In an embodiment, the method further comprises a step of creating at least one initialization data track comprising initialization data relative to a plurality of partition tracks, the at least one initialization data track being independently encapsulated in at least one media segment file, said initialization data track comprising at least one dependency box.

In an embodiment, the at least one media file resulting from encapsulating each of the created tracks are compatible with the Base Media File Format and the Dynamic Adaptive Streaming over HTTP format as defined by the International Standard Organization.

According to another aspect of the invention there is provided a method of providing a timed media data bitstream from partitioned timed media data encapsulated in at least one media file, in a client device, the partitioned timed media data comprising timed samples, each timed sample comprising a plurality of subsamples, the at least one media file comprising at least one dependency box and at least one partition track, each of the at least one partition track comprising one subsample selected from amongst the plurality of subsamples of one of the timed samples and comprising one corresponding spatial subsample of each of the other timed samples, each dependency box being related to a partition track and comprising at least one reference to one or more of the other created partition tracks, the at least one reference representing a decoding order dependency in relation to the one or more of the other partition tracks, the method comprises:

selecting at least one partition track to be displayed;

iteratively determining and ordering partition tracks, the step of selecting a partition track being based on the at least one decoding order dependency of the corresponding dependency box; and de-encapsulating the selected track to be displayed.

Accordingly, the invention enables the combination of different portions, and in particular of different subsamples (or "tiles"). It is associated with the creation of a valid file format and an elementary stream at parsing time by the client whatever the selected set of portions or tiles downloaded by a client device.

Therefore, the method of the invention is suitable for efficient streaming of independent portions or tiles, given it requires only useful data to be sent to a client device. It is suitable for streaming more than one portion or tile selection (i.e. arbitrary Region Of Interest), given it reduces transmission overhead (compared to sample based byte-range requests), and can be integrated in a MPEG standard.

In an embodiment, the at least one media file further comprises at least one other dependency box, each other dependency box being related to a partition track and comprising at least one reference to one or more of the other created partition tracks, each of the references of the at least one other dependency box representing a decoding dependency, the steps of iteratively determining and ordering partition tracks and of selecting a partition track being further based on the at least one decoding dependency of the corresponding other dependency box.

In an embodiment, the method further comprises a step of obtaining a track fragment header associated to each partition track, which comprises initialization parameters relative to the considered partition track, at least one track fragment header comprising a dependency box with the decoding order dependency of the considered partition track relatively to the other partition tracks.

In an embodiment, one initialization data track comprising initialization data relative to a plurality of partition tracks is independently encapsulated in at least one media segment file, the initialization data track comprising at least one dependency box, the method further comprising a step of selecting and of de-encapsulating the initialization data track.

In an embodiment, at least one reference track comprising at least one reference to at least one created partition track is independently encapsulated in at least one media segment file, the media segment file resulting from encapsulating the at least one reference track comprising a data structure for storing metadata including definitions, the definitions comprising a list of referenced partition tracks associated with the at least one created composite track, a reference type being associated with each of the referenced partition tracks associated with the at least one created composite track, the steps of iteratively determining and ordering partition tracks and of selecting a partition track being further based on the reference type being associated with each of the referenced partition tracks associated with the at least one created composite track.

According to another aspect of the invention there is provided a device for encapsulating partitioned timed media data in a server, the partitioned timed media data comprising timed samples, each timed sample comprising a plurality of subsamples, the device comprising at least one microprocessor configured for carrying out the steps of:

selecting at least one subsample from amongst the plurality of subsamples of one of the timed samples;

for each selected subsample, creating one partition track comprising the selected subsample and one corresponding subsample of each of the other timed samples;

creating at least one dependency box, each dependency box being related to a partition track and comprising at least one reference to one or more of the other created partition tracks, the at least one reference representing a decoding order dependency in relation to the one or more of the other partition tracks; and independently encapsulating each of the partition tracks in at least one media file.

Accordingly, the invention enables the combination of different portions, and in particular of different subsamples (or "tiles"). It is associated with the creation of a valid file format and an elementary stream at parsing time by the client whatever the selected set of portions or tiles downloaded by a client device.

Therefore, the device of the invention is suitable for efficient streaming of independent portions or tiles, given it requires only useful data to be sent to a client device. It is suitable for streaming more than one portion or tile selection (i.e. arbitrary Region Of Interest), given it reduces transmission overhead (compared to sample based byte-range requests), and can be integrated in a MPEG standard.

In an embodiment, the at least one microprocessor is further configured for carrying out a step of creating at least one other dependency box, each other dependency box being related to a partition track and comprising at least one reference to one or more of the other created partition tracks, each of the references of the at least one other dependency box representing a decoding dependency.

In an embodiment, the partitioned timed media data are tiled timed media data, the subsamples being spatial subsamples, the at least one partition track being at least one tile track.

In an embodiment, the at least one microprocessor is further configured for carrying out a step of creating a track fragment header associated to each partition track, which comprises initialization parameters relative to the considered partition track, at least one track fragment header comprising a dependency box with the decoding order dependency of the considered partition track relatively to the other partition tracks.

In an embodiment, the at least one microprocessor is further configured for carrying out a step of creating at least one reference track comprising at least one reference to at least one created partition track and a step of independently encapsulating the at least one reference track in a media segment file, wherein the media segment file resulting from encapsulating the at least one reference track comprises a data structure for storing metadata including definitions, the definitions comprising a list of referenced partition tracks associated with the at least one created composite track, a reference type being associated with each of the referenced partition tracks associated with the at least one created composite track.

In an embodiment, the at least one microprocessor is further configured for carrying out a step of creating at least one initialization data track comprising initialization data relative to a plurality of partition tracks, the at least one initialization data track being independently encapsulated in at least one media segment file, said initialization data track comprising at least one dependency box.

In an embodiment, the at least one media file resulting from encapsulating each of the created tracks are compatible with the Base Media File Format and the Dynamic Adaptive Streaming over HTTP format as defined by the International Standard Organization.

According to another aspect of the invention there is provided a video encoder comprising the device described above.

According to another aspect of the invention there is provided a device for providing a timed media data bitstream from partitioned timed media data encapsulated in at least one media file, in a client device, the partitioned timed media data comprising timed samples, each timed sample comprising a plurality of subsamples, the at least one media file comprising at least one dependency box and at least one partition track, each of the at least one partition track comprising one subsample selected from amongst the plurality of subsamples of one of the timed samples and comprising one corresponding spatial subsample of each of the other timed samples, each dependency box being related to a partition track and comprising at least one reference to one or more of the other created partition tracks, the at least one reference representing a decoding order dependency in relation to the one or more of the other partition tracks, the device comprising at least one microprocessor configured for carrying out the steps of:

selecting at least one partition track to be displayed;

iteratively determining and ordering partition tracks, the step of selecting a partition track being based on the at least one decoding order dependency of the corresponding dependency box; and de-encapsulating the selected track to be displayed.

Accordingly, the invention enables the combination of different portions, and in particular of different subsamples (or "tiles"). It is associated with the creation of a valid file format and an elementary stream at parsing time by the client whatever the selected set of portions or tiles downloaded by a client device.

Therefore, the device of the invention is suitable for efficient streaming of independent portions or tiles, given it requires only useful data to be sent to a client device. It is suitable for streaming more than one portion or tile selection (i.e. arbitrary Region Of Interest), given it reduces transmission overhead (compared to sample based byte-range requests), and can be integrated in a MPEG standard.

In an embodiment, the at least one media file further comprises at least one other dependency box, each other dependency box being related to a partition track and comprising at least one reference to one or more of the other created partition tracks, each of the references of the at least one other dependency box representing a decoding dependency, the at least one microprocessor being further configured so that the steps of iteratively determining and ordering partition tracks and of selecting a partition track is further based on the at least one decoding dependency of the corresponding other dependency box.

In an embodiment, the at least one microprocessor is further configured for carrying out a step of obtaining a track fragment header associated to each partition track, which comprises initialization parameters relative to the considered partition track, at least one track fragment header comprising a dependency box with the decoding order dependency of the considered partition track relatively to the other partition tracks.

In an embodiment, one initialization data track comprising initialization data relative to a plurality of partition tracks is independently encapsulated in at least one media segment file, the initialization data track comprising at least one dependency box, the method further comprising a step of selecting and of de-encapsulating the initialization data track.

In an embodiment, at least one reference track comprising at least one reference to at least one created partition track is independently encapsulated in at least one media segment file, the media segment file resulting from encapsulating the at least one reference track comprising a data structure for storing metadata including definitions, the definitions comprising a list of referenced partition tracks associated with the at least one created composite track, a reference type being associated with each of the referenced partition tracks associated with the at least one created composite track, the at least one microprocessor being further configured so that the steps of iteratively determining and ordering partition tracks and of selecting a partition track is further based on the reference type being associated with each of the referenced partition tracks associated with the at least one created composite track.

According to another aspect of the invention there is provided a video decoder comprising the device described above.

According to another aspect of the invention there is provided a method of encapsulating partitioned timed media data in a server to be streamed to a client's device, the partitioned timed media data comprising timed samples, each timed sample comprising a plurality of subsamples, the method comprises:

grouping several of the subsamples to form at least one group so that at least part of the subsamples belongs to a group of subsamples;

selecting at least two subsamples of the same group from amongst the plurality of subsamples of one of the timed samples;

creating at least one track comprising the at least two selected subsamples;

for the at least one created track, creating one sub-track box for each of the subsamples selected to create the at least one track, at least one of the created sub-track boxes comprising definitions and properties that are common to the selected sub-samples; and independently encapsulating each of the created tracks in at least one media file.

Accordingly, the invention enables the combination of different portions, and in particular of different subsamples (or "tiles"). It is associated with the creation of a valid file format and an elementary stream at parsing time by the client whatever the selected set of portions or tiles downloaded by a client device.

Therefore, the method of the invention is suitable for efficient streaming of independent portions or tiles, given it requires only useful data to be sent to a client device. It is suitable for streaming more than one portion or tile selection (i.e. arbitrary Region Of Interest), given it reduces transmission overhead (compared to sample based byte-range requests), and can be integrated in a MPEG standard.

In an embodiment, the created sub-track boxes are defined in accordance with ISO/IEC 14496-12.

In an embodiment, at least one of the created sub-track boxes comprises information to indicate that the at least one of the created sub-track boxes is associated with a particular track providing tiling information.

In an embodiment, the method further comprises a step of linking a group of samples or of subsamples to at least one tile.

In an embodiment, a group of tiles is encoded within at least one sub-track associated with at least one of the created sub-track boxes.

In an embodiment, at least one of the created sub-track boxes comprises information to indicate a number of tiles encoded within a sub-track associated with at least one of the created sub-track boxes.

In an embodiment, media files resulting from encapsulating each of the created tracks comprise a data structure for storing metadata including definitions of the corresponding track, including definitions of the sub-track boxes comprised within the corresponding track.

According to another aspect of the invention there is provided a method of providing a timed media data bitstream from partitioned timed media data encapsulated in at least one media file, in a client device, the partitioned timed media data comprising timed samples, each timed sample comprising a plurality of subsamples, several of the subsamples being grouped to form at least one group so that at least part of the subsamples belongs to a group of subsamples, the at least one media files comprising at least one track, the at least one track comprising at least two subsamples of the same group selected from amongst the plurality of subsamples of one of the timed samples, one sub-track box being created for each of the subsamples selected to create the at least one track, at least one of the created sub-track boxes comprising definitions and properties that are common to the selected sub-samples, the method comprises:

selecting at least one sub-track box from the at least one media file;

obtaining at least one set of definitions and properties from the at least one selected sub-track box; and obtaining a plurality of sub-samples to be decoded, the plurality of sub-samples depending on the at least one set of definitions and properties.

Accordingly, the invention enables the combination of different portions, and in particular of different subsamples (or "tiles"). It is associated with the creation of a valid file format and an elementary stream at parsing time by the client whatever the selected set of portions or tiles downloaded by a client device.

Therefore, the method of the invention is suitable for efficient streaming of independent portions or tiles, given it requires only useful data to be sent to a client device. It is suitable for streaming more than one portion or tile selection (i.e. arbitrary Region Of Interest), given it reduces transmission overhead (compared to sample based byte-range requests), and can be integrated in a MPEG standard.

In an embodiment, the created sub-track boxes are defined in accordance with ISO/IEC 14496-12.

In an embodiment, at least one of the sub-track boxes comprises information to indicate that the at least one of the sub-track boxes is associated with a particular track providing tiling information.

In an embodiment, a group of tiles is encoded within at least one sub-track associated with at least one of the sub-track boxes.

In an embodiment, at least one of the sub-track boxes comprises information to indicate a number of tiles encoded within a sub-track associated with at least one of the created sub-track boxes.

In an embodiment, media files resulting from encapsulating each of the tracks comprise a data structure for storing metadata including definitions of the corresponding track, including definitions of the sub-track boxes comprised within the corresponding track.

According to another aspect of the invention there is provided a method of encapsulating partitioned timed media data in a server to be streamed to a client's device, the partitioned timed media data comprising timed samples, each timed sample comprising a plurality of subsamples, the method comprises:

grouping several of the subsamples to form at least one group so that at least part of the subsamples belongs to a group of subsamples;

selecting at least two subsamples of a same group from amongst the plurality of subsamples of one of the timed samples;

creating at least one track comprising the at least two selected subsamples; and independently encapsulating each of the created tracks in at least one media file.

Accordingly, the invention enables the combination of different portions, and in particular of different subsamples (or "tiles"). It is associated with the creation of a valid file format and an elementary stream at parsing time by the client whatever the selected set of portions or tiles downloaded by a client device.

Therefore, the method of the invention is suitable for efficient streaming of independent portions or tiles, given it requires only useful data to be sent to a client device. It is suitable for streaming more than one portion or tile selection (i.e. arbitrary Region Of Interest), given it reduces transmission overhead (compared to sample based byte-range requests), and can be integrated in a MPEG standard.

According to another aspect of the invention there is provided a device for encapsulating partitioned timed media data in a server to be streamed to a client's device, the partitioned timed media data comprising timed samples, each timed sample comprising a plurality of subsamples, the device comprising at least one microprocessor configured for carrying out the steps of:

grouping several of the subsamples to form at least one group so that at least part of the subsamples belongs to a group of subsamples;

selecting at least two subsamples of the same group from amongst the plurality of subsamples of one of the timed samples;

creating at least one track comprising the at least two selected subsamples;

for the at least one created track, creating one sub-track box for each of the subsamples selected to create the at least one track, at least one of the created sub-track boxes comprising definitions and properties that are common to the selected sub-samples; and independently encapsulating each of the created tracks in at least one media file.

Accordingly, the invention enables the combination of different portions, and in particular of different subsamples (or "tiles"). It is associated with the creation of a valid file format and an elementary stream at parsing time by the client whatever the selected set of portions or tiles downloaded by a client device.

Therefore, the device of the invention is suitable for efficient streaming of independent portions or tiles, given it requires only useful data to be sent to a client device. It is suitable for streaming more than one portion or tile selection (i.e. arbitrary Region Of Interest), given it reduces transmission overhead (compared to sample based byte-range requests), and can be integrated in a MPEG standard.

In an embodiment, the created sub-track boxes are defined in accordance with ISO/IEC 14496-12.

In an embodiment, at least one of the created sub-track boxes comprises information to indicate that the at least one of the created sub-track boxes is associated with a particular track providing tiling information.

In an embodiment, the at least one microprocessor is further configured for carrying out a step of linking a group of samples or of subsamples to at least one tile.

In an embodiment, a group of tiles is encoded within at least one sub-track associated with at least one of the created sub-track boxes.

In an embodiment, at least one of the created sub-track boxes comprises information to indicate a number of tiles encoded within a sub-track associated with at least one of the created sub-track boxes.

In an embodiment, media files resulting from encapsulating each of the created tracks comprise a data structure for storing metadata including definitions of the corresponding track, including definitions of the sub-track boxes comprised within the corresponding track.

According to another aspect of the invention there is provided a video encoder comprising the device described above.

According to another aspect of the invention there is provided a device for providing a timed media data bitstream from partitioned timed media data encapsulated in at least one media file, in a client device, the partitioned timed media data comprising timed samples, each timed sample comprising a plurality of subsamples, several of the subsamples being grouped to form at least one group so that at least part of the subsamples belongs to a group of subsamples, the at least one media files comprising at least one track, the at least one track comprising at least two subsamples of the same group selected from amongst the plurality of subsamples of one of the timed samples, one sub-track box being created for each of the subsamples selected to create the at least one track, at least one of the created sub-track boxes comprising definitions and properties that are common to the selected sub-samples, the device comprising at least one microprocessor configured for carrying out the steps of:

selecting at least one sub-track box from the at least one media file;

obtaining at least one set of definitions and properties from the at least one selected sub-track box; and obtaining a plurality of sub-samples to be decoded, the plurality of sub-samples depending on the at least one set of definitions and properties.

Accordingly, the invention enables the combination of different portions, and in particular of different subsamples (or "tiles"). It is associated with the creation of a valid file format and an elementary stream at parsing time by the client whatever the selected set of portions or tiles downloaded by a client device.

Therefore, the device of the invention is suitable for efficient streaming of independent portions or tiles, given it requires only useful data to be sent to a client device. It is suitable for streaming more than one portion or tile selection (i.e. arbitrary Region Of Interest), given it reduces transmission overhead (compared to sample based byte-range requests), and can be integrated in a MPEG standard.

In an embodiment, the created sub-track boxes are defined in accordance with ISO/IEC 14496-12.

In an embodiment, at least one of the sub-track boxes comprises information to indicate that the at least one of the sub-track boxes is associated with a particular track providing tiling information.

In an embodiment, a group of tiles is encoded within at least one sub-track associated with at least one of the sub-track boxes.

In an embodiment, at least one of the sub-track boxes comprises information to indicate a number of tiles encoded within a sub-track associated with at least one of the created sub-track boxes.

In an embodiment, media files resulting from encapsulating each of the tracks comprise a data structure for storing metadata including definitions of the corresponding track, including definitions of the sub-track boxes comprised within the corresponding track.

According to another aspect of the invention there is provided a video decoder comprising the device described above.

According to another aspect of the invention there is provided a device of encapsulating partitioned timed media data in a server to be streamed to a client's device, the partitioned timed media data comprising timed samples, each timed sample comprising a plurality of subsamples, the device comprising at least one microprocessor configured for carrying out the steps of:

grouping several of the subsamples to form at least one group so that at least part of the subsamples belongs to a group of subsamples;

selecting at least two subsamples of a same group from amongst the plurality of subsamples of one of the timed samples;

creating at least one track comprising the at least two selected subsamples; and independently encapsulating each of the created tracks in at least one media file.

Accordingly, the invention enables the combination of different portions, and in particular of different subsamples (or "tiles"). It is associated with the creation of a valid file format and an elementary stream at parsing time by the client whatever the selected set of portions or tiles downloaded by a client device.

Therefore, the device of the invention is suitable for efficient streaming of independent portions or tiles, given it requires only useful data to be sent to a client device. It is suitable for streaming more than one portion or tile selection (i.e. arbitrary Region Of Interest), given it reduces transmission overhead (compared to sample based byte-range requests), and can be integrated in a MPEG standard.

According to a further aspect of the invention there is provided a method of encapsulating partitioned timed media data in a server, the partitioned timed media data comprising timed samples, each timed sample comprising a plurality of subsamples, the method comprising:

selecting at least one subsample from amongst the plurality of subsamples of one of the timed samples;

for each selected subsample, creating one partition track comprising the selected subsample and one corresponding subsample of each of the other timed samples;

creating at least one reference track comprising at least one extractor identifying at least one of the created partition tracks; and independently encapsulating each of the created tracks in at least one media segment file.

Accordingly, the invention enables the combination of different portions, and in particular of different tiles, and the creation of a valid file format and elementary stream at parsing time whatever the selected set of portions or tiles downloaded by a client device.

Therefore, the method of the invention is suitable for efficient streaming of independent portions or tiles, requires only useful data to be sent to a client device, is suitable for more than one portion or tile selection (i.e. arbitrary ROI), reduces indexation overhead (compared to byte-range requests), and can be integrated in a MPEG standard.

In an embodiment, the partitioned timed media data are tiled timed media data, the subsamples being spatial subsamples, the at least one partition track being at least one tile track, and the at least one reference track being at least one composite track. The at least one reference track may contain extractors and optionally initialization data.

In an embodiment, the at least one extractor further identifies at least one spatial subsample of the at least one identified tile track.

In an embodiment, the method further comprises a step of creating an initialization segment file comprising parameters allowing description of a spatial portion of the tiled timed media data from the created tile tracks and the created at least one composite track. The initialization segment file may comprise references to the created tile tracks, a list of referenced tile tracks associated with the at least one created composite track, a tile handler associated with each of the created tile tracks indicating that the track contains spatial subsample information, and/or general presentation information associated with each of the created tile tracks.

In an embodiment, at least two tile tracks are created in the step of creating one tile track for each selected spatial subsample, the at least one composite track comprising at least one item of data that is to be used to decode any of two spatial subsamples comprised within the same timed sample.

In an embodiment, the tiled timed media data are scalable tiled timed media data according to which each of the timed samples comprises a reference layer and at least one enhancement layer, the reference layer comprising at least one reference spatial subsample and the at least one enhancement layer comprising a plurality of enhancement spatial subsamples, and wherein tile tracks created in the step of creating one tile track for each selected spatial subsample are enhancement tile tracks comprising enhancement spatial subsamples, the method further comprising a step of creating at least one reference track comprising reference spatial subsamples.

In an embodiment, the reference layer comprises a plurality of reference spatial subsamples and wherein a plurality of reference tracks are created, each reference track of the plurality of reference tracks forming a reference tile track.

In an embodiment, media segment files resulting from encapsulating each of the created tracks comprise a data structure for storing metadata including definitions of the corresponding track.

In an embodiment, at least one of the media segment files resulting from encapsulating each of the created tracks comprises a data structure for storing metadata including at least one definition of at least one group of subsamples of the corresponding track.

In an embodiment, at least one of the media segment files resulting from encapsulating each of the created tracks comprises a data structure for storing metadata including different definitions of different groups of subsamples of the corresponding track.

In an embodiment, the data structure storing metadata includes at least one definition and a version type indicating that at least one definition applies to all subsamples of the corresponding track.

In a preferred embodiment, the data structure storing metadata further includes a parameter (for example a flag) indicating that all the definitions apply to all subsamples of the corresponding track.

The parameter can also indicate that all the definitions apply to a sample (for example if the definitions apply to all the subsamples of the sample).

In an embodiment, at least one parameter of the data structure storing metadata including at least one definition of at least one group of subsamples of the corresponding track, relating to subsample decoding dependencies, indicates that each subsample of the group can be decoded without using a subsample of another group.

In an embodiment, the subsamples of a group are identified according to a grouping type to which the subsamples belong.

In an embodiment, the subsamples of a group are identified according to a grouping type to which the subsamples belong, a grouping type providing a definition for each subsample of the group.

In an embodiment, the initialization segment file comprises one definition to be used by default for processing subsamples of at least one tile track that are not associated to any specific definition stored in the media segment file resulting from encapsulating the corresponding at least one tile track.

In an embodiment, the method further comprises a step of adding initialization data in at least one of the media segment files resulting from encapsulating each of the created tracks to allow modifying the definition stored in the initialization segment file that is to be used by default.

In an embodiment, media segment files resulting from encapsulating each of the created tracks comprise a data structure for storing spatial subsamples.

In an embodiment, media segment files resulting from encapsulating each of the created tracks comprise a data structure for storing extractors.

In an embodiment, at least one of the media segment files resulting from encapsulating each of the created tracks comprises initialization data stored in the reference track so that the at least one of the media segment files can be processed independently as a standard media segment file.

In an embodiment, at least one of the media segment files resulting from encapsulating each of the created tracks comprises a data structure for storing at least one extractor identifying initialization data stored in the reference track.

In an embodiment, at least one of the media segment files resulting from encapsulating each of the created tracks comprises a data structure for storing at least one extractor identifying initialization data of the composite track so that the at least one of the media segment files can be processed independently as a standard media segment file.

In an embodiment, the method further comprises a step of setting a flag indicating that the at least one of the media segment files can be processed independently as a standard media segment file.

In an embodiment, the method further comprises a step of creating at least one initialization data track comprising initialization data, the at least one initialization data track being independently encapsulated in at least one media segment file.

In an embodiment, at least one of the media segment files resulting from encapsulating each of the created tracks comprises a data structure for storing at least one extractor identifying initialization data stored in the initialization data track so that the at least one of the media segment files can be processed independently as a standard media segment file.

In an embodiment, the method further comprises a step of setting a flag indicating that the at least one of the media segment files can be processed independently as a standard media segment file.

In an embodiment, the server is compatible with the HyperText Transfer Protocol (HTTP).

In an embodiment, the media segment files resulting from encapsulating each of the created tracks are compatible with the Base Media File Format and the Dynamic Adaptive Streaming over HTTP format as defined by the International Standard Organization.

Another aspect of the invention provides a method of providing a timed media data bit-stream from partitioned timed media data encapsulated in a plurality of media segment files, in a client device, the partitioned timed media data comprising timed samples, each timed sample comprising a plurality of subsamples, the plurality of media segment files comprising at least one reference track and at least one partition track, each of the at least one partition track comprising one subsample selected from amongst the plurality of subsamples of one of the timed samples and comprising one corresponding spatial subsample of each of the other timed samples, the at least one reference track comprising at least one extractor identifying at least one partition track and identifying at least one subsample of the identified partition track, the method comprising:

selecting an item of information representative of a subsample;

requesting the at least one partition track comprising the selected subsample, the selected subsample corresponding to the selected item of information;

receiving the plurality of media segment files; and replacing extractors of the at least one reference track by corresponding identified subsamples to generate the timed media data bit-stream.

Accordingly, the invention enables the combination of different portions, and in particular of different tiles, and the creation of a valid file format and elementary stream at parsing time whatever the selected set of portions or tiles downloaded by a client device.

Therefore, the method of the invention is suitable for efficient streaming of independent portions or tiles, requires only useful data to be sent to a client device, is suitable for more than one portion or tile selection (i.e. arbitrary ROI), reduces indexation overhead (compared to byte-range requests), and can be integrated in a MPEG standard.

In an embodiment, the partitioned timed media data are tiled timed media data, the subsamples being spatial subsamples, the at least one partition track being at least one tile track, and the at least one reference track being at least one composite track.

In an embodiment, the partitioned timed media data are tiled timed media data, the subsamples being spatial subsamples, the at least one partition track being at least one tile track, and the at least one reference track being at least one composite track containing extractors and optionally initialization data.

In an embodiment, the method further comprises:

obtaining a track reference from an extractor of the at least one composite track;

checking whether or not the track corresponding to the obtained track reference has been received; and if the track corresponding to the obtained track reference has not been received, removing corresponding extractor to generate the timed media data bit-stream.

In an embodiment, the method further comprises a step of verifying that the track corresponding to the obtained track reference is a track of tile type.

In an embodiment, the method further comprises:

obtaining a track reference from an extractor of the at least one composite track;

checking whether or not the track corresponding to the obtained track reference has been received; and if the track corresponding to the obtained track reference has not been received, replacing corresponding extractor by padding to generate the timed media data bit-stream.

In an embodiment, the method further comprises a step of verifying that the track corresponding to the obtained track reference is a track of tile type.

In an embodiment, the method further comprises a step of receiving an initialization segment file comprising parameters allowing formation of a spatial portion of the tiled timed media data from the created tile tracks and the created at least one composite track.

In an embodiment, at least two media segment files representative of at least two tile tracks are received, the at least one composite track comprising at least one item of data that is to be used to decode any of two spatial subsamples belonging to the same set of spatial subsamples.

In an embodiment, the tiled timed media data are scalable tiled timed media data according to which each of the timed samples comprises a reference layer and at least one enhancement layer, the reference layer comprising at least one reference spatial subsample and the at least one enhancement layer comprising a plurality of enhancement spatial subsamples, and wherein at least two media segment files representative of at least two tracks are received, one of the at least two received tracks being a reference track comprising reference spatial subsamples and the other of the at least two received tracks being an enhancement tile track comprising enhancement spatial subsamples.

In an embodiment, the reference layer comprises a plurality of reference spatial subsamples and wherein a plurality of reference tracks, each forming a reference tile track, are received.

In an embodiment, at least one of the media segment files comprises a data structure for storing metadata including at least one definition of at least one group of subsamples of the corresponding track, the method comprising a step of obtaining the at least one definition for processing the at least one group of subsamples of the corresponding track.

In an embodiment, at least one of the media segment files comprises initialization data stored in the reference track, the method further comprising a step of processing independently the at least one of the media segment files as a standard media segment file.

In an embodiment, at least one of the media segment files comprises a data structure for storing at least one extractor identifying initialization data stored in the reference track, the method further comprising a step of accessing the data stored in the reference track when processing at least one of the media segment files.

In an embodiment, at least one of the media segment files comprises a data structure for storing at least one extractor identifying initialization data of the composite track, the method further comprising a step of accessing the data stored in the reference track for processing independently the at least one of the media segment files as a standard media segment file.

In an embodiment, the method further comprises a step of obtaining at least one initialization data track comprising initialization data, the at least one initialization data track being independently encapsulated in at least one media segment file.

In an embodiment, at least one of the media segment files comprises a data structure for storing at least one extractor identifying initialization data stored in the initialization data track, the method further comprising a step of accessing the data stored in the reference track for processing independently the at least one of the media segment files.

In an embodiment, the client device is compatible with the HyperText Transfer Protocol (HTTP).

In an embodiment, the received media segment files are compatible with the Base Media File Format and the Dynamic Adaptive Streaming over HTTP format as defined by the International Standard Organization.

According to another aspect of the invention, there is provided a device comprising means adapted for carrying out each step of the method described above.

According to another aspect of the invention, there is provided a device for encapsulating partitioned timed media data in a server, the partitioned timed media data comprising timed samples, each timed sample comprising a plurality of subsamples, the device comprising at least one microprocessor configured for carrying out the steps of:

selecting at least one subsample from amongst the plurality of subsamples of one of the timed samples;

for each selected subsample, creating one partition track comprising the selected subsample and one corresponding subsample of each of the other timed samples;

creating at least one reference track comprising at least one extractor identifying at least one of the created partition tracks; and independently encapsulating each of the created tracks in at least one media segment file.

Accordingly, the invention enables the combination of different portions, and in particular of different tiles, and the creation of a valid file format and elementary stream at parsing time whatever the selected set of portions or tiles downloaded by a client device.

Therefore, the method of the invention is suitable for efficient streaming of independent portions or tiles, requires only useful data to be sent to a client device, is suitable for more than one portion or tile selection (i.e. arbitrary ROI), reduces indexation overhead (compared to byte-range requests), and can be integrated in a MPEG standard.

In an embodiment, the partitioned timed media data are tiled timed media data, the subsamples being spatial subsamples, the at least one partition track being at least one tile track, and the at least one reference track being at least one composite track.

In an embodiment, the partitioned timed media data are tiled timed media data, the subsamples being spatial subsamples, the at least one partition track being at least one tile track, and the at least one reference track being at least one composite track containing extractors and optionally initialization data.

In an embodiment, the microprocessor is further configured for carrying out the step of creating an initialization segment file comprising parameters allowing formation of a spatial portion of the tiled timed media data from the created tile tracks and the created at least one composite track, the initialization segment file comprising references to the created tile tracks.

In an embodiment, the initialization segment file further comprises a list of referenced tile tracks associated with the at least one created composite track.

In an embodiment, the initialization segment file further comprises a tile handler associated with each of the created tile tracks indicating that the track contains spatial subsample information.

In an embodiment, the initialization segment file further comprises general presentation information associated with each of the created tile tracks.

In an embodiment, the microprocessor is further configured so that at least two tile tracks are created in the step of creating one tile track for each selected spatial subsample, the at least one composite track comprising at least one item of data that is to be used to decode any of two spatial subsamples comprised within the same timed sample.

In an embodiment, the tiled timed media data are scalable tiled timed media data according to which each of the timed samples comprises a reference layer and at least one enhancement layer, the reference layer comprising at least one reference spatial subsample and the at least one enhancement layer comprising a plurality of enhancement spatial subsamples, the microprocessor being further configured so that tile tracks created in the step of creating one tile track for each selected spatial subsample are enhancement tile tracks comprising enhancement spatial subsamples, the microprocessor being further configured for carrying out the step of creating at least one reference track comprising reference spatial subsamples.

In an embodiment, the reference layer comprises a plurality of reference spatial subsamples and wherein the microprocessor is further configured so that a plurality of reference tracks are created, each reference track of the plurality of reference tracks forming a reference tile track.

In an embodiment, media segment files resulting from encapsulating each of the created tracks comprise a data structure for storing metadata including definitions of the corresponding track.

In an embodiment, media segment files resulting from encapsulating each of the created tracks comprise a data structure for storing spatial subsamples.

In an embodiment, media segment files resulting from encapsulating each of the created tracks comprise a data structure for storing extractors.

In an embodiment, the server is compatible with the HyperText Transfer Protocol (HTTP) and wherein the media segment files resulting from encapsulating each of the created tracks are compatible with the Base Media File Format and the Dynamic Adaptive Streaming over HTTP format as defined by the International Standard Organization.

According to another aspect of the invention there is provided a video encoder comprising the device as described above.

According to another aspect of the invention, there is provided a device for device for providing a timed media data bit-stream from partitioned timed media data encapsulated in a plurality of media segment files, in a client device, the partitioned timed media data comprising timed samples, each timed sample comprising a plurality of subsamples, the plurality of media segment files comprising at least one reference track and at least one partition track, each of the at least one partition track comprising one subsample selected from amongst the plurality of subsamples of one of the timed samples and comprising one corresponding subsample of each of the other timed samples, the at least one reference track comprising at least one extractor identifying at least one partition track and identifying at least one subsample of the identified partition track, the device comprising at least one microprocessor configured for carrying out the steps of:

selecting an item of information representative of a subsample;

requesting the at least one partition track comprising the selected subsample, the selected subsample corresponding to the selected item of information;

receiving the plurality of media segment files; and replacing extractors of the at least one reference track by corresponding identified subsamples to generate the timed media data bit-stream.

Accordingly, the invention enables the combination of different portions, and in particular of different tiles, and the creation of a valid file format and elementary stream at parsing time whatever the selected set of portions or tiles downloaded by a client device.

Therefore, the method of the invention is suitable for efficient streaming of independent portions or tiles, requires only useful data to be sent to a client device, is suitable for more than one portion or tile selection (i.e. arbitrary ROI), reduces indexation overhead (compared to byte-range requests), and can be integrated in a MPEG standard.

In an embodiment, the partitioned timed media data are tiled timed media data, the subsamples being spatial subsamples, the at least one partition track being at least one tile track, and the at least one reference track being at least one composite track.

In an embodiment, the partitioned timed media data are tiled timed media data, the subsamples being spatial subsamples, the at least one partition track being at least one tile track, and the at least one reference track being at least one composite track containing extractors and optionally initialization data.

In an embodiment, the microprocessor is further configured for carrying out the steps of:

obtaining a track reference from an extractor of the at least one composite track;

checking whether or not the track corresponding to the obtained track reference has been received; and if the track corresponding to the obtained track reference has not been received, removing corresponding extractor to generate the timed media data bit-stream.

In an embodiment, the microprocessor is further configured for carrying out the step of verifying that the track corresponding to the obtained track reference is a track of tile type.

In an embodiment, the microprocessor is further configured for carrying out the steps of:

obtaining a track reference from an extractor of the at least one composite track;

checking whether or not the track corresponding to the obtained track reference has been received; and if the track corresponding to the obtained track reference has not been received, replacing corresponding extractor by padding to generate the timed media data bit-stream.

In an embodiment, the microprocessor is further configured for carrying out the step of verifying that the track corresponding to the obtained track reference is a track of tile type.

In an embodiment, the microprocessor is further configured for carrying out the step of receiving an initialization segment file comprising parameters allowing formation of a spatial portion of the tiled timed media data from the created tile tracks and the created at least one composite track.

In an embodiment, the microprocessor is further configured so that at least two media segment files representative of at least two tile tracks are received, the at least one composite track comprising at least one item of data that is to be used to decode any of two spatial subsamples belonging to the same set of spatial subsamples.

In an embodiment, the tiled timed media data are scalable tiled timed media data according to which each of the timed samples comprises a reference layer and at least one enhancement layer, the reference layer comprising at least one reference spatial subsample and the at least one enhancement layer comprising a plurality of enhancement spatial subsamples, and wherein the microprocessor is further configured so that at least two media segment files representative of at least two tracks are received, one of the at least two received tracks being a reference track comprising reference spatial subsamples and the other of the at least two received tracks being an enhancement tile track comprising enhancement spatial subsamples.

In an embodiment, the client device is compatible with the HyperText Transfer Protocol (HTTP) and wherein the received media segment files are compatible with the Base Media File Format and the Dynamic Adaptive Streaming over HTTP format as defined by the International Standard Organization.

According to another aspect of the invention there is provided a video decoder comprising the device as described above.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which:

FIG. 1, comprising FIGS. 1a and 1 b, illustrates an example of coding tiles in an encoded video bit-stream;

FIG. 6a and FIG. 6b, is a flow chart illustrating steps for transmitting timed media data between a server and a client device according to a particular embodiment;

FIG. 9, comprising

FIG. 12a and FIG. 12b, illustrates signalization of the position of a tile in a full video, the size of the tile, and of the indication that the tile track can be decoded without any artifact, at sub-sample level, adapted to handle various tiling configuration;

FIG. 19, comprising

FIG. 21, comprising

DETAILED DESCRIPTION OF EMBODIMENTS OF THE INVENTION

Figure 2:
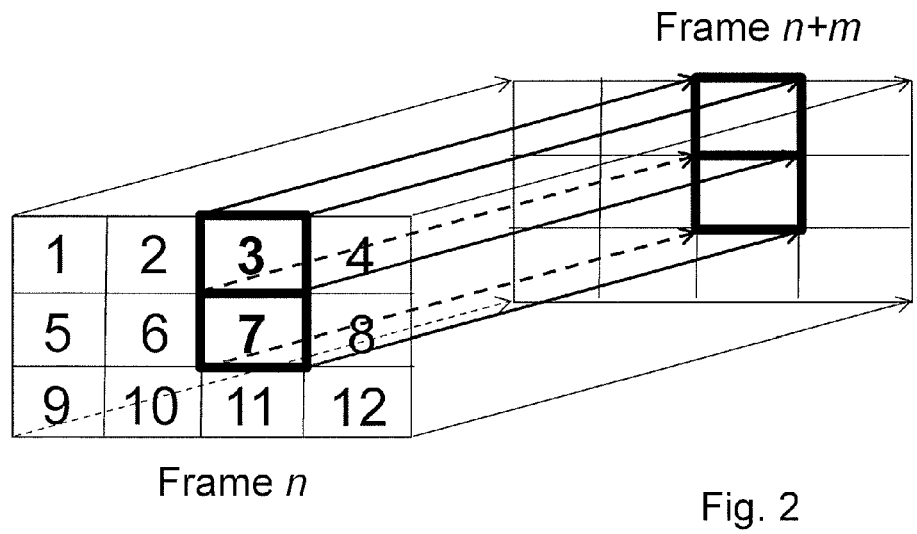
FIG. 2 illustrates a temporal pipe of tiles selected by a user to be displayed.

According to a particular embodiment, partitioned timed media data such as tiled timed media data (e.g. video data) comprising timed samples (e.g. images) are transmitted as a set of several timed media data tracks, typically a base layer track and several tile tracks, and a reference or composite track that comprises references to timed media data tracks. Each tile track comprises one spatial subsample (e.g. several NAL units) of several timed samples. An extended extractor type is defined for referencing timed media data tracks from a composite track. Timed media data tracks are labeled as not displayable and convey and describe timed media data for tiles. Such a set of timed media data tracks and a composite track allows the selecting, composing, and efficient streaming of spatial video tiles. Each track can be transmitted from a server device to a client device as a set of media segment files. An initialization segment file can be used to transmit metadata required to decode media segment files.

FIG. 1, comprising FIG. 1a and FIG. 1b, illustrates an example of coding tiles in an encoded video bit-stream.

For the sake of illustration, it is considered in the following description that each video frame (timed sample) is composed of independently decodable tiles corresponding to spatial sub-parts (spatial subsamples) of the video frame. The video is preferably scalable and organized in different levels of scalability. As illustrated in FIG. 1a, a video frame 100 may comprise an HD base layer (102) and a 4K2K enhancement layer (104). Still for the sake of illustration, enhancement layer 104 can be divided into four regular tiles denoted a, b, c, and d. It is to be noted that tiles of different shapes may be handled. Likewise, base layer 102 can be divided into several tiles. In such a case, several composite tracks can be used, for example one for the base layer and one for the enhancement layers or for each of the enhancement layers.

It is also to be noted that the invention is not limited to scalable video format. It can apply to all video formats allowing tiles to be decoded independently. Accordingly, any video compression algorithms like MPEG4, AVC, HEVC, SVC, or future SHVC can be used in conjunction with an embodiment of the invention.

FIG. 1b represents a typical encoded video bit-stream in a decoding order. As illustrated, the encoded video bit-stream comprises here three video frames (110, 112, and 114) encoded in a temporal order. Each video frame comprises all the network abstraction layer (NAL) units of the base layer (BL) followed by the NAL units of the enhancement layer. For example, the NAL units (1BL, 116) of the base layer (102-1) of the first video frame (110) are followed by the NAL units (1common, 1a, 1b, 1c, 1d, 118) of the enhancement layer (104-1) of the first video frame.

The part of the video bit-stream corresponding to an enhancement layer with spatial tiles is composed of NAL units of each tile. Optionally, it may also contain NAL units that are common to all tiles and that are required to decode any of the tiles. The NAL units that are common to all tiles of a given frame can be located anywhere in the corresponding part of the video bit-stream (i.e. before, between, or after the NAL units of the tiles of the video frame).

As illustrated, the part of the video bit-stream corresponding to the enhancement layer of the first video frame (110), comprising spatial tiles a, b, c, and d, is composed of NAL units for each tile (1a, 1b, 1c, and 1d) and of NAL units (1 common) that are common to all tiles a, b, c, and d.

FIG. 2 illustrates a temporal pipe of tiles selected by a user to be displayed. More precisely, FIG. 2 represents a first video frame n and a second video frame n+m (where n and m are integer values), each of the first and second video frames comprising twelve tiles numbered 1 to 12. Amongst these twelve tiles, only the third and seventh ones are to be displayed (as denoted with bold lines). Video frames n and n+m belong to a series of consecutive frames corresponding to a given temporal period. Therefore, the third and seventh tiles of each frame from frame n to frame n+m are displayed consecutively.

As illustrated in FIG. 1, the data of a video bit-stream are organized as temporal samples that correspond to full frames. Accordingly, it is required to access several small byte ranges for each frame when particular spatial areas of these frames are to be accessed during a given period of time as described above by reference to FIG. 2. This is inefficient in HTTP streaming in terms of the number of generated requests and in terms of data overhead.

Therefore, to provide a more efficient access in compressed videos for ROI streaming, the timed media data bit-stream is to be indexed or is to be reorganized so that data of a particular tile are organized as a contiguous byte range (forming a pipe) for a given time period (i.e. a set of consecutive frames).

Accordingly, when only a spatial sub-part of video frames is to be displayed, only pipes of tiles corresponding to the selected spatial area must be downloaded (for instance tiles 3 and 7 in FIG. 2) using one HTTP request per pipe and per time period.

Figure 3:
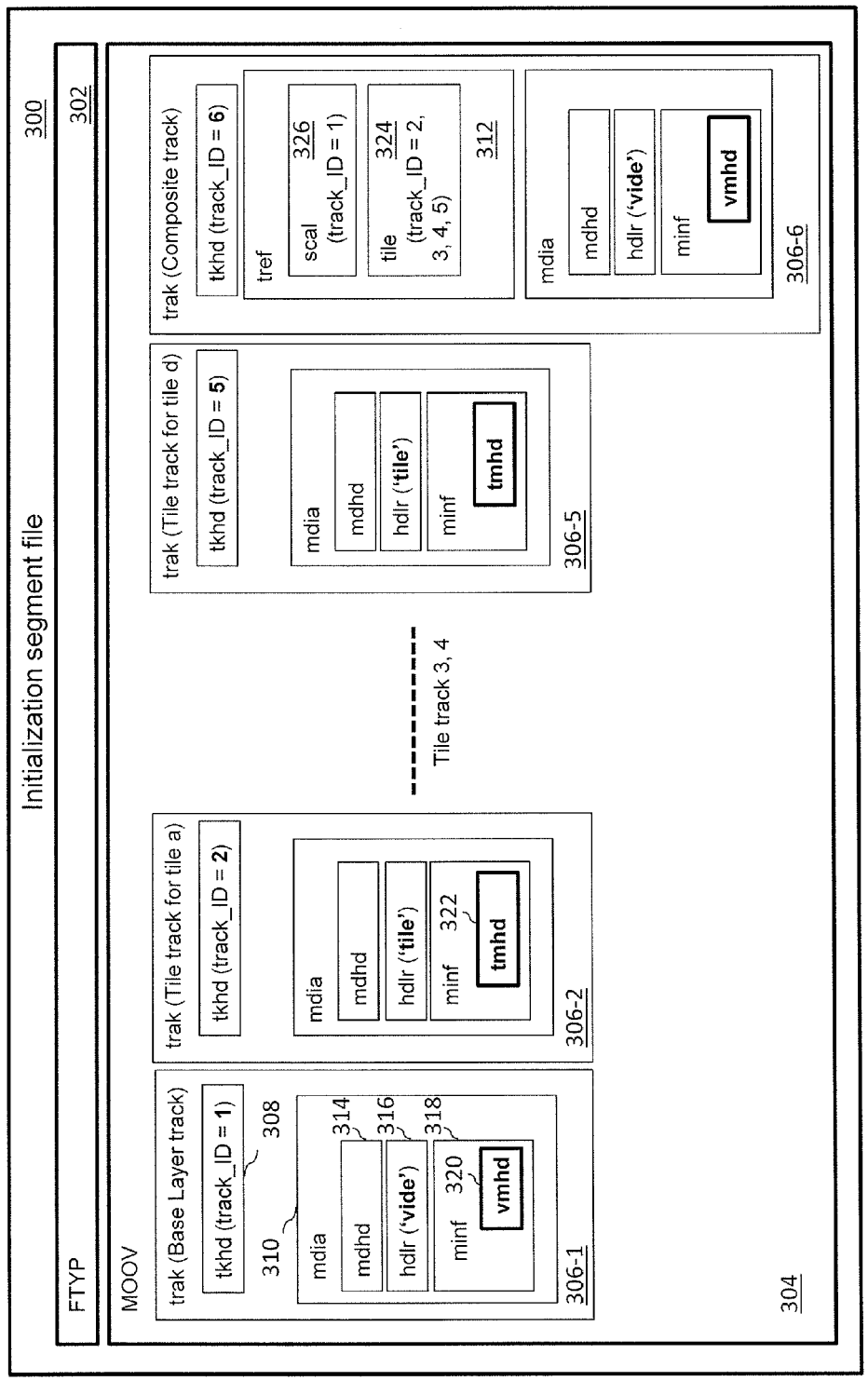
FIG. 3 illustrates an example of block diagrams of an initialization segment file using scalable media data tracks according to a particular embodiment.

FIG. 3 illustrates an example of block diagrams of an initialization segment file using media data tracks according to a particular embodiment.

Figure 4:
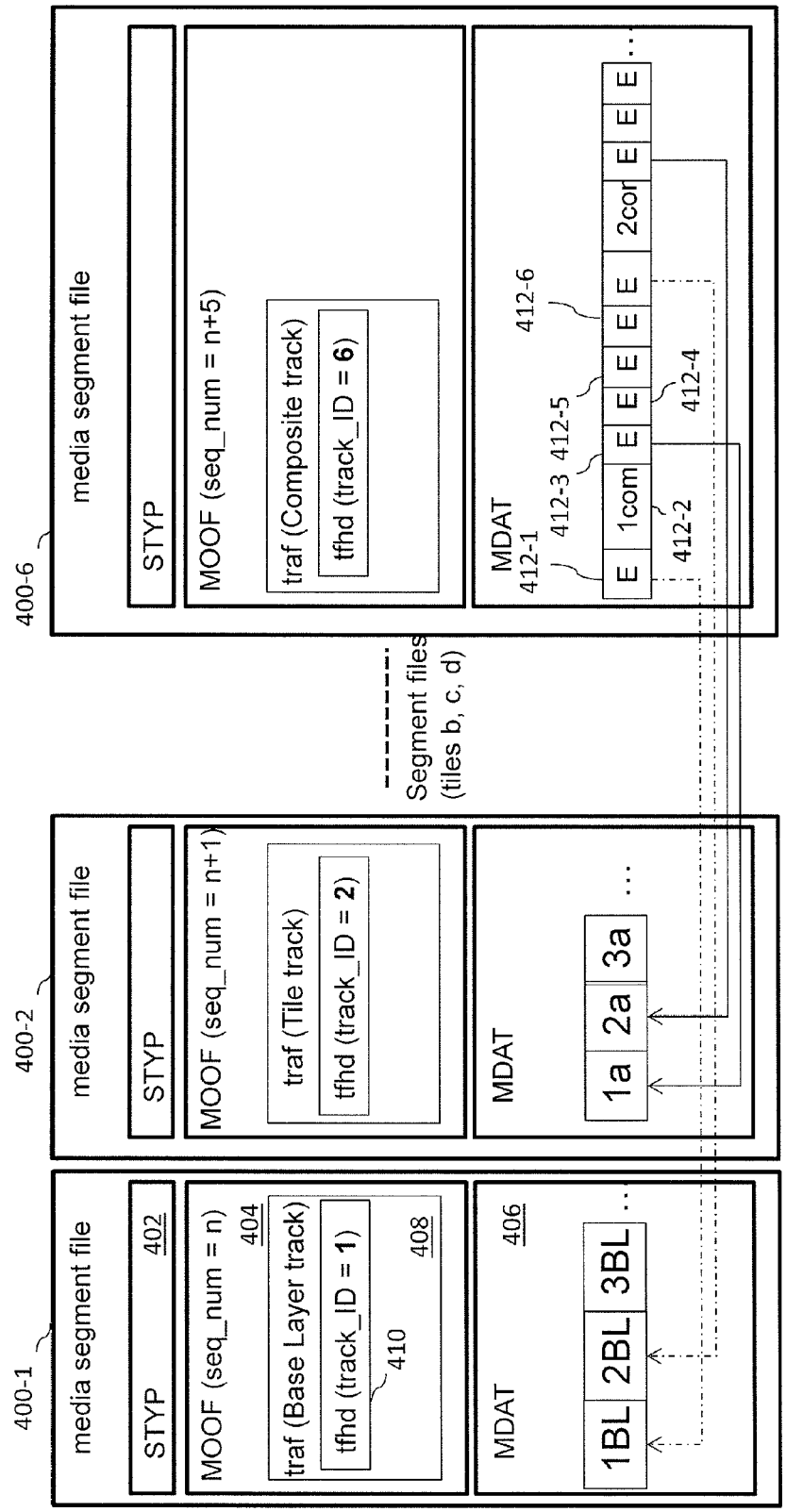
FIG. 4 illustrates an example of block diagrams of media segment files comprising tile tracks and one composite track, according to a particular embodiment, corresponding to tracks declared in an initialization segment file such as the one shown in FIG. 3.

The initialization segment file illustrated in FIG. 3 and the media segment files illustrated in FIG. 4 illustrate an embodiment of the invention to reorganize and encapsulate a video bit-stream in ISO Base Media File Format while several tracks are streamed independently. For the sake of illustration, the content of FIGS. 3 and 4 are based on the video bit-stream illustrated in FIG. 1.

To reorganize and encapsulate a video bit-stream in ISO BMFF while several tracks are streamed independently, a new type of track called tile track is defined. A tile track is a track that is, by definition, a timed sequence of related samples where a sample represents all the data associated with a single timestamp. Contrary to a known video media track where a sample is typically an individual video frame, a sample of a tile track defines a spatially-defined sub-part of a full video frame. Accordingly, tile tracks only contain NAL units related to a given tile. In this way, it is possible to create pipes of tiles with contiguous byte ranges by storing each track in independent segment files.

However, since a tile track does not contain all the required NAL units and information to be decoded and played, an additional track called "composite track" is used. According to a particular embodiment, a composite track is a media track representing a complete tiled frame (i.e. the composition of all tiles). A composite track is the representation of an encoded timed media data bit-stream in its typical organization as described by reference to FIG. 1 (frame by frame in decoding order). The composite track uses extractor objects to refer to NAL units in their respective tile tracks. In addition it may contain NAL units that are common to all tiles if such NAL units exist.

According to a particular embodiment, an initialization segment file is used to transmit all the metadata that are necessary to define timed media data bit-streams encapsulated in other media segment files. As illustrated in FIG. 3, the initialization segment file 300 contains a file type box "ftyp" 302 and a movie box "moov" 304. File type box 302 preferably identifies which ISO BMF specifications the segment files comply with and indicates a version number of that specification. Movie box "moov" 304 provides all the metadata describing the presentation stored in media segment files and in particular all tracks available in the presentation.

Movie box "moov" 304 contains a definition for each of the tracks ("track" boxes 306-1 to 306-6) corresponding to the scalable video bit-stream provided as an example in FIG. 1.

Track box 306-1 represents the base layer (track_ID=1), the four track boxes 306-2 to 306-5 (track boxes 306-3 and 306-4 not being shown) represent the four tiles a, b, c, and d of the enhancement layer (track_ID=2 to 5), and track box 306-6 represents a composite track describing the enhancement layer (track_ID=6).

Each track box contains at least a track header box "tkhd", generically referenced 308, and a track media box "mdia" generically referenced 310. If a track depends on data from other tracks, there is also a track reference box "tref". As illustrated, the composite track having the identifier track_ID=6 comprises track reference box "tref" 312 indicating that the track depends on data from tracks having the identifiers track_ID=1 to 6.

It is to be noted that other boxes may be mandatory or optional depending on ISO BMFF specifications used to encapsulate the timed media data bit-stream.

However, since embodiments of the invention do not rely on these boxes to be applicable, they are not presented here.

Track header box "tkhd" 308 specifies the characteristics of the track. Among several items of information, it provides the track's identifier (track_ID), the track's duration, and/or the track's visual presentation size (i.e. width and height of the display area). It also comprises a flag parameter that indicates whether or not the track is playable.

According to an embodiment, the default value of the track header flag for tile tracks is 0 (track_enabled=0, track_in_movie=0, track_in_preview=0), meaning that tile tracks are ignored for local playback and preview by a client device. In another embodiment, a new track header flag can be created to signal that the track is a tile track.

Track media box "mdia" 310 can be seen as a container containing all the objects used to declare parameters of timed media data within a track. It contains at least a media header box "mdhd" generically referenced 314, a handler reference box "hdlr" generically referenced 316, and a media information box "minf" generically referenced 318.

Handler reference box "hdlr" 316 declares the process by which the timed media data of the track is to be presented and thus, the nature of the timed media data in the track. For example, a video track would be handled by a video handler (noted with the handler type attribute equal to 'vide'). A video sample can be described by the use of an object of the VisualSampleEntry( ) type. According to a particular embodiment, a new handler type, called a tile handler (noted with the handler type attribute equal to 'tile'), is defined to indicate that the track contains spatial subsample information. Depending on the coding format, if an object of the VisualSampleEntry( ) type cannot describe a sample in a tile track, it is possible to define a specific object of the TileSampleEntry( ) type to describe the sample.

Media information box "minf" 318 contains all the objects that define characteristic information of the timed media data in the track. For instance, for the base layer and for the enhancement layer defined in the composite track, the "minf" box may contain a standard video media header box "vmhd" (320).

Regarding tile tracks, a specific box referred to as Tile Media Header Box (tmhd, 322), corresponding to the new tile handler, is used to define general presentation information, independent of the coding, for tiles. In particular, it may contain the geometry information of the spatial area covered by the tile relative to the video resolution represented by the composite video track, which can be defined as follow:

```
aligned(8) class TileMediaHeaderBox
extends FullBox('tmhd', version = 0, 0) {
    unsigned int(16) horizontal_offset;
    unsigned int(16) vertical_offset;
}
```

As described previously, the composite track comprises specific track reference box "tref" 312 that provides typed reference to another track in the presentation. According to a particular embodiment, such typed references may comprise a "tile" reference (324) that can be used to establish a link from the composite track to the tile track that it refers to and a "scal" reference (326) that can be used to establish a link from the track containing this reference to the timed media data track that it depends on (e.g. the base layer track (track_ID=1)).

FIG. 4 illustrates an example of block diagrams of media segment files comprising tile tracks and one composite track, according to a particular embodiment, corresponding to tracks declared in an initialization segment file such as the one shown in FIG. 3. As described previously, the initialization segment file illustrated in FIG. 3 and the media segment files illustrated in FIG. 4 illustrate an embodiment of the invention to reorganize and encapsulate a video bit-stream in ISO Base Media File Format while several tracks are streamed independently.

As illustrated in FIG. 4, each of media segment files 400-1 to 400-6 (media segment files 400-3 to 400-5 being not shown) comprises, as specified in the DASH standard, a segment type box "styp" generically referenced 402, at least one movie fragment box "moof" generically referenced 404, and at least one media data box "mdat" generically referenced 406. A media segment file is associated with an HTTP-URL.

It is to be noted that other boxes may be mandatory or optional depending on ISO BMFF specifications used to encapsulate the timed media data bit-stream. However, since embodiments of the invention do not rely on these boxes to be applicable, they are not presented here.

The format of segment type box "styp" 402 is similar to the one of file type box "ftyp" 302 in FIG. 3 however, its reference indicates that the file is a media segment file.

Movie fragment box 404 provides the information that is generally stored within the movie box "moov". Its header ("mfhd") contains a sequence number (labeled seq_num in FIG. 4) that increases for each movie fragment. Such a sequence number allows a client device to concatenate received segment files in increasing order and to verify integrity of the sequence (if necessary). The movie fragment box 404 contains a track fragment box "traf" (generically referenced 408) for each track having data in an associated media data box ("mdat", 406). Track fragment box 408 comprises a track fragment header box "tfhd", generically referenced 410, that is used to store an identifier (track_ID) of the track's bit-stream present in the corresponding media data box (("mdat", 406).

A media data box generally contains timed media data. In standard video tracks, it contains video frames. In tile tracks, media data box 406 contains spatially-defined sub-parts of complete video frames. For the sake of illustration, the media data box associated with track identifier track_ID=2 contains all NAL units corresponding to the tile of the enhancement layer.

In a composite track (track_ID=6 in FIG. 4), media data box 406 contains extractors (labeled E in FIG. 4) for each tile and for each dependent layer and contains NAL units common to all tiles (if any).

As illustrated in FIG. 4, the media data box 406 of media segment file 400-6 associated with a composite track comprises, in particular:
 a first extractor 412-1 that provides a link to base layer data (NAL units 1BL) encoded within a base layer track stored in the media data box 406 of media segment file 400-1 associated with a base layer track;
 NAL units 412-2 that are common to several tiles;
 a second extractor 412-3 that provides a link to enhancement layer data (NAL units 1a) of a first tile encoded within media data box 406 of media segment file 400-2 associated with a first tile track of the enhancement layer;
 a third extractor 412-4 that provides a link to enhancement layer data (NAL units, 1b) of a second tile encoded within media data box 406 of media segment file 400-3 (not shown) associated with a second tile track of the enhancement layer;
 a fourth extractor 412-5 that provides a link to enhancement layer data (NAL units, 1c) of a third tile encoded within media data box 406 of media segment file 400-4 (not shown) associated with a third tile track of the enhancement layer; and
 a fifth extractor 412-6 that provides a link to enhancement layer data (NAL units, 1d) of a fourth tile encoded within media data box 406 of media segment file 400-5 (not shown) associated with a fourth tile track of the enhancement layer.

NAL units that may be obtained thanks to extractor 412-1 allow the decoding of a base layer of a frame whose enhancement layer may be fully decoded using NAL units 412-2 and NAL units that may be obtained thanks to extractors 412-3 to 412-6. As can be observed from FIG. 4, if only a spatial part of a frame is to be decoded, it is not necessary to download all media segment files 400-2 to 400-5 (i.e. bit-streams corresponding to tile tracks).

According to a particular embodiment, an extractor is a file format internal structure having the following syntax:

```
class aligned(8) Extractor ( ) {
    NALUnitHeader( );
    unsigned int(8) track_ref_index;
    signed int(8) sample_offset;
    unsigned int((lengthSizeMinusOne+1)*8)
        data_offset;
    unsigned int((lengthSizeMinusOne+1)*8)
        data_length;
}
``` where NALUnitHeader( ) represents the first four bytes of a NAL unit compliant with the coding format used to encode the video bit-stream. These four bytes identify the NAL unit as an extractor (e.g., in SVC the attribute nal_unit_type is set to the extractor NAL unit type (type 31)).

The value track_ref index specifies the index to be used, in the track reference box "tref" of type 'scal' or 'tile' of a composite track, for finding the track from which data are to be extracted. The value sample_offset gives the relative index of the sample in the linked track that is to be used as the source of information. The values data_offset and data_ length are the offset of the first byte within the reference sample to copy and the number of bytes to copy, respectively.

For the sake of illustration and with reference to FIG. 3, if the value of track_ref_index of a given extractor is equal to 2, this means that the extractor references the track identified by the second entry in the tref box (i.e. track having identifier track_ID=2, that is the tile track for tile a, the first index representing the reference track (e.g. base layer)).

Figure 5:
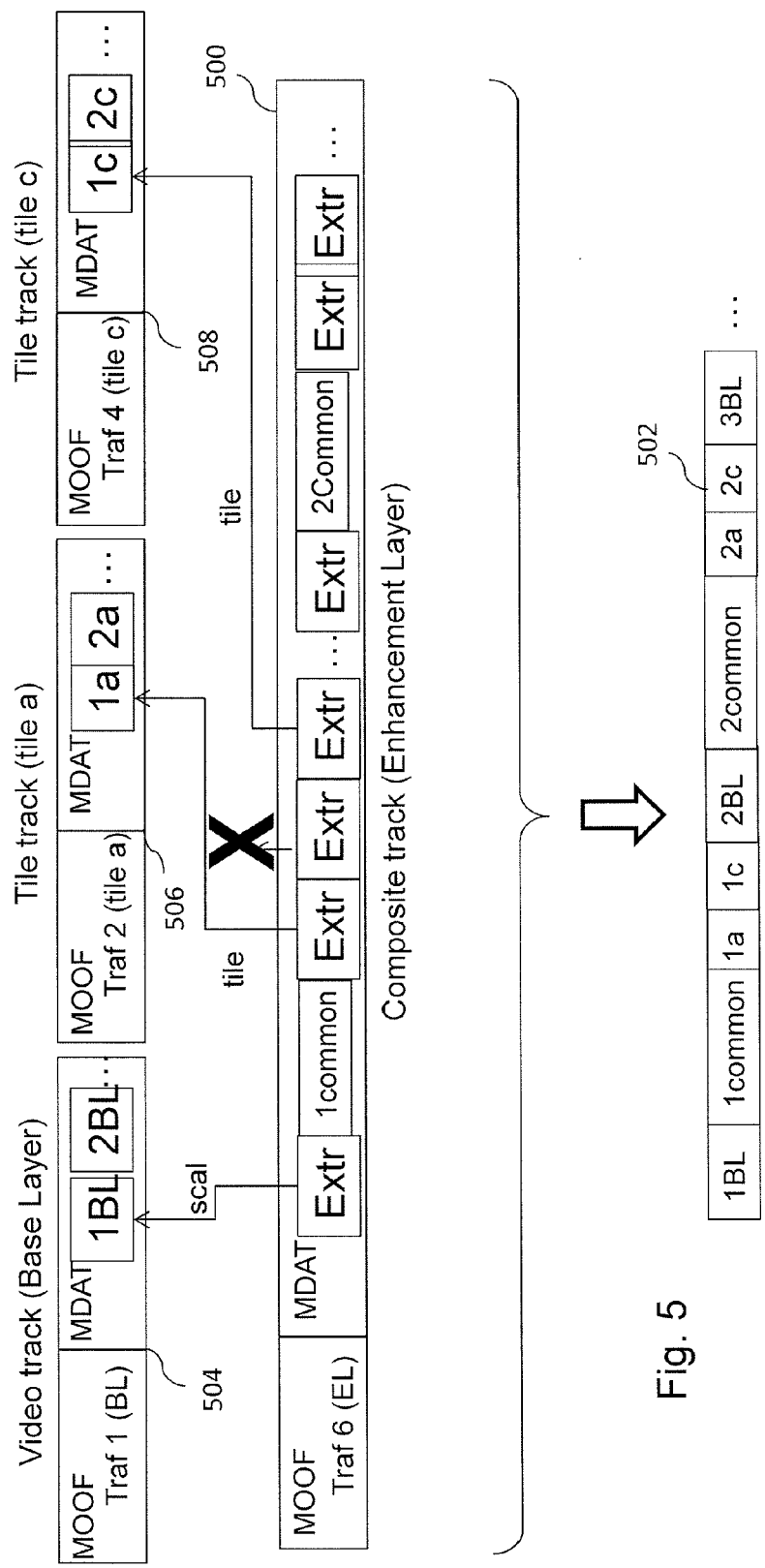
FIG. 5 illustrates an example of concatenating downloaded media data segments to build a valid decodable timed media data bit-stream representing a spatial part of consecutive video frames for a given temporal period.

FIG. 5 illustrates an example of concatenating downloaded media data segments to build a valid decodable timed media data bit-stream representing a spatial part of consecutive video frames for a given temporal period (corresponding here to two consecutive frames). The same figure could be repeated for other temporal periods.

As described with reference to FIGS. 3 and 4, a timed tiled media data bit-stream is preferably transmitted as a set of data comprising one initialization segment file and a plurality of media segment files, the latter comprising several tile tracks and one composite track.

The initialization segment file comprises a movie box ("moov") that provides general information on each track, in particular the type of track (e.g. media track (audio or video) or tile track), a coding format, a frame resolution and the dependence among tracks (given in a track reference box "tref"). These data are used to process downloaded media segment files. Referring to the example described with reference to FIGS. 1, 3, and 4, the content of the movie box of the initialization segment file can comprise, in particular, the following:

MOOV
track 1: base layer
track 2: tile a
track 3: tile b
track 4: tile c
track 5: tile d
track 6: enhancement layer
   tref (scal): track_ID=1
   tref(tile): track_ID=2
      track_ID=3
      track_ID=4
      track_ID=5

FIG. 5 roughly illustrates the file format obtained by concatenating media segments when only required media segment files (corresponding here to the base layer and tiles a and c in the enhancement layer) are downloaded from a server. It is to be noted that not only does such a mechanism allow downloading of only the required media segment files but it also prevents downloading of duplicate data.

As illustrated, composite track 500 allows the building of a valid decodable timed media data bit-stream 502 by referencing data from base layer track 504 (in case of scalability) and from non-playable tile tracks (506 and 508) and by handling appropriately extractors referencing missing data (as described by reference to FIG. 7).

The obtained file format is compliant with scalable file format definition. For example, a client device can decide to play only the base layer by selecting the base layer track or the enhancement layer with the chosen tiles a and c by selecting the composite track. The client device can also change the tiles to be displayed by downloading different "tile tracks" (i.e. media segment files) in a later temporal period while it continues to play the composite track.

Figure 6:
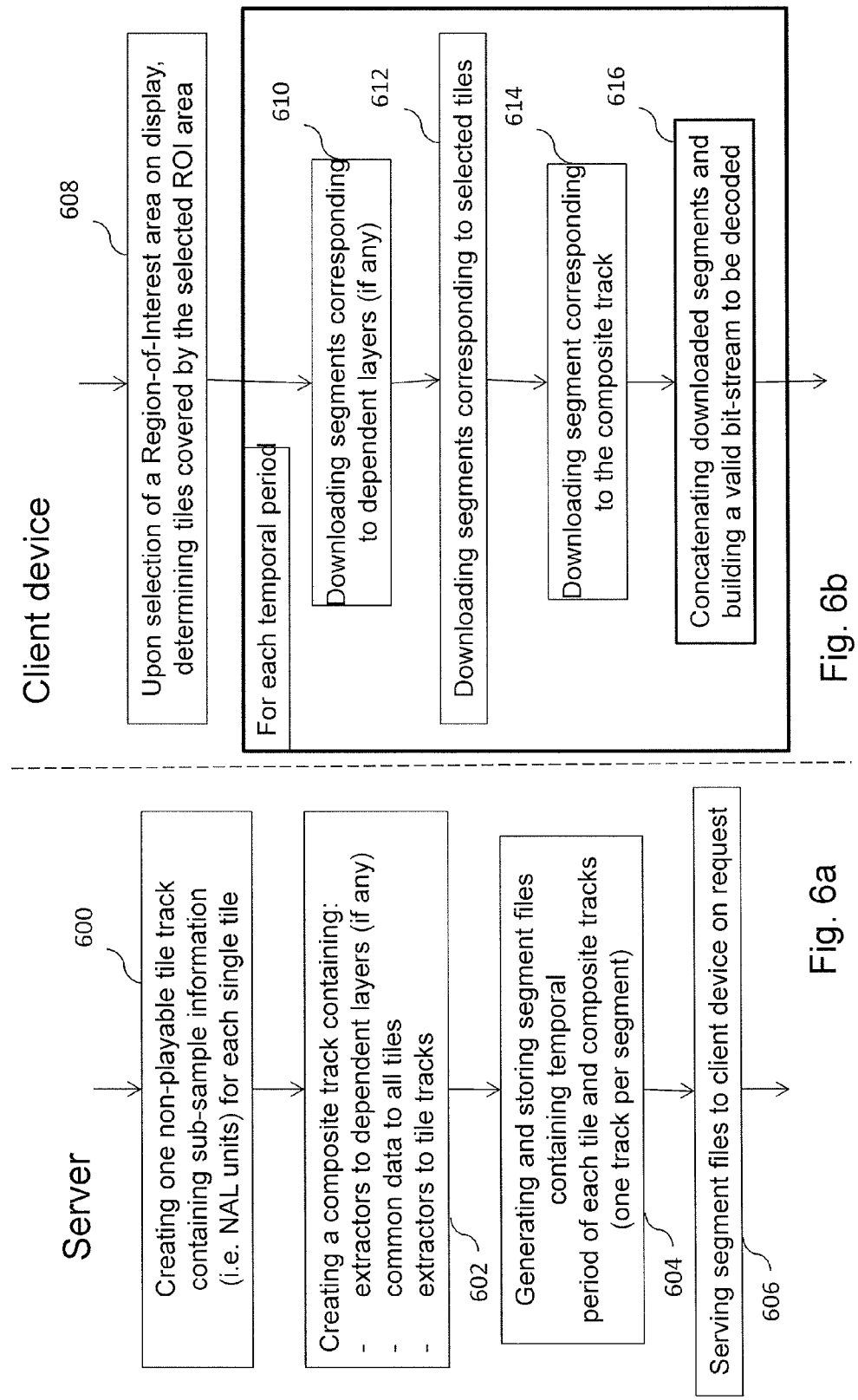
FIG. 6, comprising

FIG. 6, comprising FIG. 6a and FIG. 6b, is a flow chart illustrating steps for transmitting timed media data between a server and a client device according to a particular embodiment. Steps shown in FIG. 6a are implemented within the server to prepare a media presentation by creating segment files adapted to ROI streaming from a tiled timed media data bit-stream while steps shown in FIG. 6b are implemented within the client device.

In a first step (step 600), the server identifies all NAL units that are associated with the tiles and, for each tile, creates a tile track containing sub-samples composed of all NAL units corresponding to the given tile. For example, the server may rely on sub-picture level SEI messages to identify the association of NAL units with different regions and on sequence-level SEI messages for identifying the position and size of each ROI as it has been proposed in HEVC standardization (proposal JCTVC-K0128). Accordingly, the server can create pipes of tiles for given periods of time.

In a following step (step 602), the server creates a composite track containing extractors linked to lower level scalability tracks (if any), NAL units common to all tiles, and extractors linked to each tile track. Extractors and common NAL units are advantageously ordered such that replacing the extractors by the data they are referencing results in a valid timed media data bit-stream composed of complete samples in decoding order (as described with reference to FIG. 1).

Next, in step 604, the server generates and stores an initialization segment file and media segment files containing temporal period according to the ISO BMFF representation, as described with reference to FIGS. 3 and 4. All the timed media data tracks (e.g. video tracks), composite tracks, and tile tracks are stored in separate media segment files.

The server then serves, on request, the initialization and media segment files to a client device (step 606). The server may be a conventional HTTP server that responds to HTTP requests.

In the context of HTTP streaming and in a preferred embodiment, it is assumed that the client device has access to a manifest file describing the media presentation available from the server. This manifest file provides sufficient information (media properties and a list of segments) for the client device to stream the media presentation by first requesting the initialization segments and then media segment files from the server.

Upon selection of a ROI at the client device end, typically on a display with selecting means such as a pointing device, during the streaming of a tiled video, the tiles corresponding to the selected ROI are determined (step 608).

Next, for each temporal period, in case of scalable media data, the client device sends a request to the server to download the segment files corresponding to dependent layers (step 610). According to a particular embodiment, the layers that are depended from are downloaded before the layers depending from those depended from layers. For example, base layer segment files are downloaded before enhancement layer segment files.

In a following step, the client device sends a request to the server to download the media segment files corresponding to selected tiles (step 612) and sends a request to the server to download the media segment files corresponding to the composite track (step 614).

Next, the downloaded segment files are concatenated by the client device to build a valid (decodable) timed media data bit-stream conforming to the ISO BMFF standard (step 616), corresponding to the selected ROI.

It is to be noted that if the flow chart illustrated in FIG. 6 is based on the use of extractors to establish links between tracks (i.e. to define dependencies), links between tracks can be signaled differently as described by reference to FIGS. 18, 19 and 20.

Figure 7:
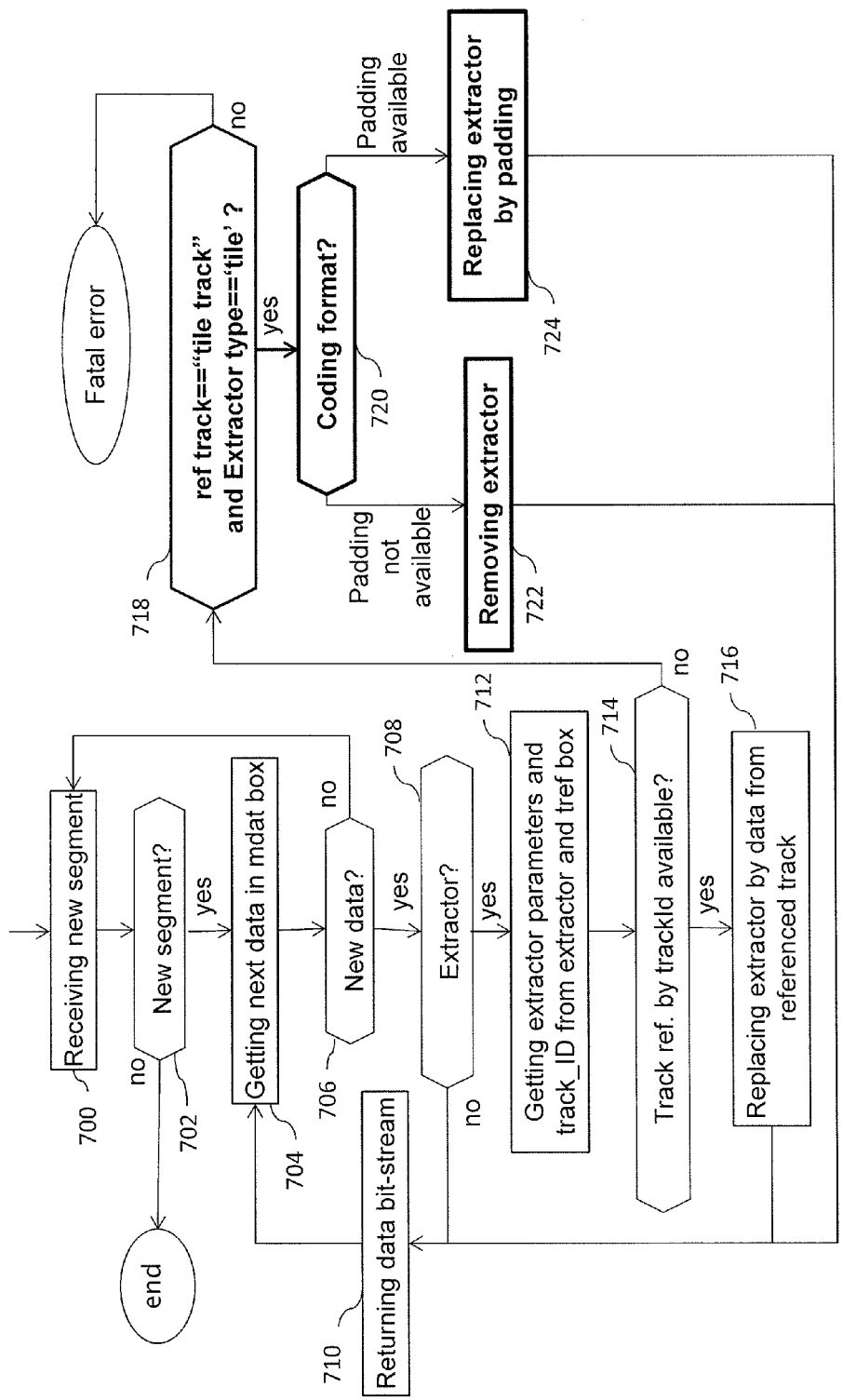
FIG. 7 is a flow chart illustrating the generation of a valid timed media data bit-stream from concatenated media segments received by a client device.

Step 616 (in case where extractors are used to establish links between tracks) is described in details with reference to FIG. 7.

FIG. 7 is a flow chart illustrating the generation of a valid timed media data bit-stream from concatenated media segments received by a client device, that is to say the generation of a decodable bit-stream from selected tiles and one composite track when the composite track is played by the client device.

In a first step (step 700), the client device receives the media segment files that have been previously requested (e.g. steps 612, 614, and 616 in FIG. 6) and a test is performed to determine whether or not at least one media segment file has been received (step 702). If no media segment file has been received, the process ends.

If at least one media segment file has been received and if the received media segment files do not contain a composite track (i.e. they contain dependent tracks, e.g. lower level layer or tile tracks), they are buffered for later usage.

On the contrary, if at least one media segment has been received and if the received media segment file contains a composite track, the bit-stream (typically NAL units) corresponding to the composite track is parsed to extract the first item of data (or the next item of data if at least one item of data of the received media segment has been processed, typically a NAL unit) from the media data box "mdat" of the received media segment (step 704). If there is no further item of data to parse in the media data box, the process returns to step 700 to receive new media segment files (step 706).

Next, a test is performed to determine whether or not the extracted item of data (e.g. extracted NAL unit) corresponds to an extractor (step 708). If the extracted item of data does not correspond to an extractor, it is returned as is to be further decoded by a video decoder (step 710). On the contrary, if the extracted item of data is an extractor, it must be replaced by the item of data it is referencing. To that end, the values of the extractor's parameters are obtained from its structure (step 712). As described above, an extractor comprises all the parameter values required to extract data from another track (e.g., track_ref_index, sample_offset, data_offset, and data_length).

Once the identifier of the referenced track has been identified, a test is performed (step 714) to determine whether or not the referenced track is available in the set of media segment files buffered during step 700. It is to be recalled that some tile tracks are missing since the client device downloads only the media segment files corresponding to the selected Region-of-Interest.

If the referenced track is available in the set of media segment files buffered during step 700, the extractor is replaced by the data it is referencing (step 716) and the bit-stream is sent to a video decoder to be decoded (step 710).

If the referenced track is not available in the set of media segment files buffered during step 700, specific steps have to be performed since the absence of data referenced in an extractor leads to a fatal error according to the ISO BMF standard. A test is performed to determine whether or not the referenced track is a tile track (the referenced track can correspond to a dependent scalability layer) and whether or not the extractor is of the tile type (step 718).

If the referenced track is not a tile track or if the extractor is not of the tile type, a standard fatal error is detected. On the contrary, if the referenced track is a tile track and if the extractor is of the tile type, the extractor is removed (step 722) or the extractor is replaced by padding from an alternative "padding track" or "padding box" containing 'skipped' data for the missing tiles (step 724), depending on the coding format used to encode the timed media data bit-stream (step 720). Here, 'skipped' data represent pixel data missing in a current image that are replaced by other pixel data obtained from a previously decoded image either belonging to a same scalable layer or belonging to another scalable layer. 'Skipped data are generally represented by at least one flag. For example, when considering HEVC video compression format, the padding data can be one or more NALUs that exclusively contain coding units encoded with a skip flag set to 1.

Next, the bit-stream is transmitted to a video decoder to be decoded (step 710) and displayed and the process loops to step 704 to handle a following item of data.

Figure 8:
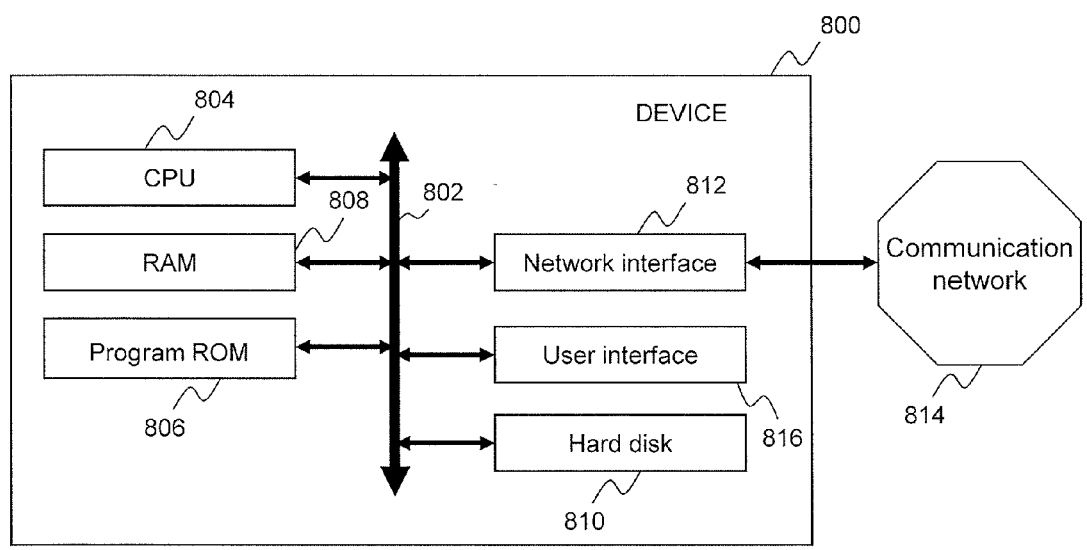
FIG. 8 represents a block diagram of a server or a client device in which steps of one or more embodiments may be implemented.

FIG. 8 represents a block diagram of a server or a client device 800 in which steps of one or more embodiments may be implemented.

Preferably, the device 800 comprises a communication bus 802, a central processing unit (CPU) 804 capable of executing instructions from program ROM 806 on powering up of the device, and instructions relating to a software application from main memory 808 after the powering up. The main memory 808 is for example of Random Access Memory (RAM) type which functions as a working area of CPU 804 via the communication bus 802, and the memory capacity thereof can be expanded by an optional RAM connected to an expansion port (not illustrated). Instructions relating to the software application may be loaded to the main memory 808 from a hard-disc (HD) 810 or the program ROM 806 for example. Such software application, when executed by the CPU 804, causes the steps described with reference to FIG. 6a to be performed in the server and the steps described with reference to FIGS. 6b and 7 to be performed in the client device.

Reference numeral 812 is a network interface that allows the connection of the device 800 to the communication network 814. The software application when executed by the CPU 804 is adapted to react to requests received through the network interface and to provide data streams and requests via the network to other devices.

Reference numeral 816 represents user interfaces to display information to, and/or receive inputs from, a user.

It should be pointed out here that, as a variant, the device 800 for managing the reception or sending of multimedia bit-streams can consist of one or more dedicated integrated circuits (ASIC) that are capable of implementing the method as described with reference to FIGS. 6a, 6b and 7. These integrated circuits are for example and non-restrictively, integrated into an apparatus for generating or displaying video sequences and/or for listening audio sequences.

As described above, an embodiment of the invention can apply, in particular, to the video format known as HEVC.

According to HEVC standard, images can be spatially divided in tiles, slices, and slice segments. In this standard, a tile corresponds to a rectangular region of an image that is defined by horizontal and vertical boundaries (i.e., rows and columns). It contains an integer number of Coding Tree Units (CTU). Therefore, tiles can be efficiently used to identify regions of interest by defining, for example, positions and sizes for regions of interest. However, the structure of a HEVC bit-stream as well as its encapsulation as Network Abstract Layer (NAL) units are not organized in view of tiles but are based on slices.

In HEVC standard, slices are sets of slice segments, the first slice segment of a set of slice segments being an independent slice segment, that is to say a slice segment that general information stored within a header does not refer to the one of another slice segment. The other slice segments of the set of slice segments, if any, are dependent slice segments (i.e. slice segments that general information stored within a header refers to the one of an independent slice segment).

A slice segment contains an integer number of consecutive (in raster scan order) Coding Tree Units. Therefore, a slice segment can be of a rectangular shape or not and so, it is not suited to represent a region of interest. It is encoded in a HEVC bit-stream under the form of a slice segment header followed by slice segment data. Independent and dependent slice segments differ by their header: since a dependent slice segment depends on an independent slice segment, the amount of information of its header is smaller than the one of an independent slice segment. Both independent and dependent slice segments contain a list of entry points in the corresponding bit-stream that are used to define tiles or as entropy decoding synchronization points.

Figure 9A:
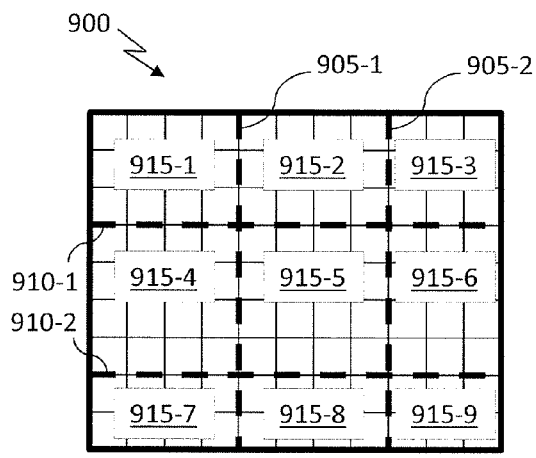
FIGS. 9a, 9b, and 9c, illustrates examples of tiles and slice segments in a HEVC bit-stream.
Figure 9B:
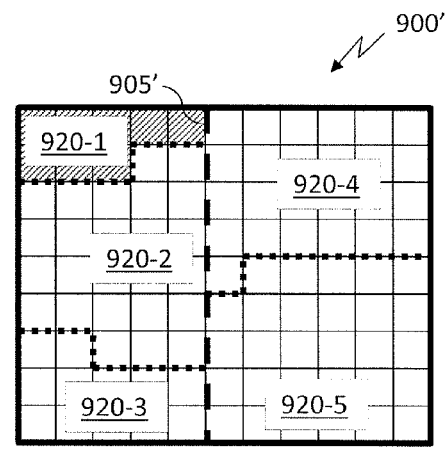
Figure 9C:
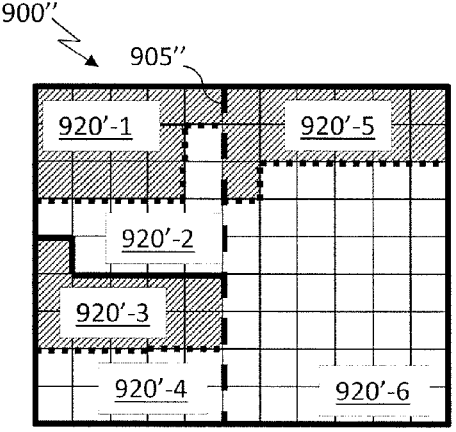

FIG. 9, comprising FIGS. 9a, 9b, and 9c, illustrates examples of tiles and slice segments. More precisely, FIG. 9a illustrates an image (900) divided in nine portions by vertical boundaries 905-1 and 905-2 and horizontal boundaries 910-1 and 910-2. Each of the nine portions referenced 915-1 to 915-9 represents a particular tile.

FIG. 9b illustrates an image (900') containing two vertical tiles delimited by vertical boundary 905'. Image 900' comprises a single slice (not referenced) containing five slice segments, one independent slice segment 920-1 (represented with hatched lines) and four dependent slice segments 920-2 to 920-5.

FIG. 9c illustrates an image (900") containing two vertical tiles delimited by vertical boundary 905". The left tile comprises two slices: a first slice containing one independent slice segment (920'-1) and one dependent slice segment (920'-2) and a second slice also containing one independent slice segment (920'-3) and one dependent slice segment (920'-4). The right tile comprises one slice containing one independent slice segment (920'-5) and one dependent slice segment (920'-6).

According to HEVC standard, slice segments are linked to tiles according to rules that may be summarized as follows (one or both conditions have to be met):
- all CTUs in a slice segment belong to the same tile (i.e. a slice segment cannot belong to several tiles); and
- all CTUs in a tile belong to the same slice segment (i.e. a tile may be divided into several slice segments provided that each of these slice segments only belongs to that tile).

As mentioned above, while tiles can be considered as an appropriate support for regions of interest, slice segments are the entities that are actually put in NAL units for transport over a communication network and aggregated to form access units (i.e. coded picture or samples at file format level).

It is to be recalled that according to HEVC standard, the type of a NAL unit is encoded in two bytes of the NAL unit header that can be defined as follows:

```
nal_unit_header ( ) {
    forbidden_zero_bit
    nal_unit_type
    nuh_layer_id
    nuh_temporal_id_plus1
}
```

NAL units used to code slice segments comprise slice segment headers indicating the address of the first CTU in the slice segment thanks to a slice segment address syntax element. Such slice segment headers can be defined as follows:

```
slice_segment_header ( ) {
    first_slice_segment_in_pic_flag
    if(nal_unit_type >= BLA_W_LP && nal_unit_type <= RSV_IRAP_VCL23)
        no_output_of_prior_pics_flag
    slice_pic_parameter_set_id
    if(!first_slice_segment_in_pic_flag){
        if(dependent_slice_segments_enabled_flag)
            dependent_slice_segment_flag
        slice_segment_address
    }
    If(!dependent_slice_segment_flag){
    [...]
```

Tiling information is provided in a PPS (Picture Parameter Set) NAL unit. The relation between a slice segment and a tile can then be deduced from these parameters.

While spatial predictions are reset on tile borders (by definition), nothing prevents a tile to use temporal predictors from a different tile in the reference frame(s). Accordingly, to build independent tiles, motion vectors for the prediction units are advantageously constrained inside a tile, during encoding, to remain in the co-located tile in the reference frame(s). In addition, the in-loop filters (deblocking and sample adaptive offset (SAO) filters) are preferably deactivated on the tile borders so that no error drift is introduced when decoding only one tile. It is to be noted that such a control of the in-loop filters is available in HEVC standard. It is set in slice segment header with a flag known as loop_filter_across_tiles_enabled_flag. By explicitly setting this flag to zero, the pixels at the tile borders cannot depend on pixels that fall on the border of the neighbor tiles. When these two conditions relating to motion vectors and to in-loop filters are met, tiles can be considered as "independently decodable tiles" or "independent tiles".

When a video bit-stream is encoded as a set of independent tiles, it then enables a tile-based decoding from one frame to another without any risk for missing reference data or propagation of reconstruction errors. This configuration then enables to reconstruct only a spatial part of the original video that can correspond, for example, to the region of interest illustrated in FIG. 2 (comprising tiles 3 and 7). Such a configuration can be indicated as supplemental information in a video bit-stream so as to indicate that tile-based decoding is reliable.

In order to handle the different possible configurations for HEVC tiles, typically the number of slices per tiles, of tiles per slices the coding dependencies, and the type of the slice segments (independent or dependent), the tile decoding order dependencies is to be considered at the server end during the encapsulation step (following the compression step). This is important for a client device to be in position of building a valid video elementary stream that can be processed in a video decoder after parsing a received encapsulated file.

It is to be noted that two types of dependencies co-exist: decoding dependencies and decoding order dependencies.

The first type of dependency is frequently used in scalable video coding wherein an enhancement layer depends on a base layer and cannot be decoded by itself. Another case is directed to data that are split in different tracks, for example as described by reference to FIGS. 10, 13, and 14 or for coding multiple views. In such cases, data coming from different samples may be aggregated to build one sample to decode and display. However, the aggregation may lead to errors if it is done in random order.

For the sake of illustration, "MVC Track structure" section of ISO/IEC 14496-15 indicates how to build a sample from different views. Likewise, there are rules in ISO/IEC 14496-1 for the aggregation of elementary stream descriptors in a single object descriptor. In the first case, dependencies are signaled with a 'scal' track reference type while in the second case, an explicit flag dependsOn_ES_ID indicates the identifier of another elementary stream on which this elementary stream depends on. This notion of dependsOn_ES_ID was translated in the mp4 file format (ISO/IEC 14496-14) as a simple 'dpnd' track dependency whose exact processing semantics are given by MPEG-4 systems (ISO/IEC 14496-1). While they cover some of the required features for dependencies signaling between multi-track data, 'dpnd' and 'scal' only describe downward dependencies (from a higher layer to a lower layer) and fail to address complex cases where decoding order is required between some layers but undetermined between other layers. The ISO Base Media File then lacks a generic tool to indicate that some tracks are dependent from other tracks in terms of decoding, and should therefore have their samples decoded after the samples of the track they depend on.

Figure 21A:
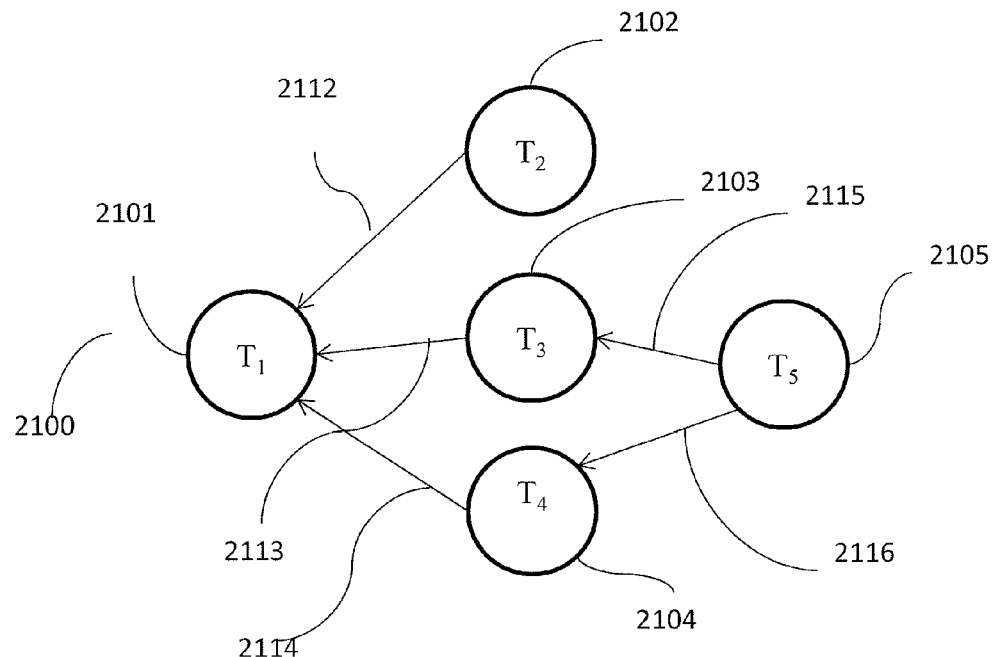
FIGS. 21a and 21b, represents graphs illustrating the dependency according to the prior art and an embodiment of the invention, respectively.

Indeed, assuming a dependency graph of the prior art as the one illustrated in FIG. 21a according to which a media file 2100 contains 5 tracks, denoted Ti and reference 2101 to 2105, with dependencies such that tracks T2 (2102), T3 (2103) and T4 (2104) depend on track T1 (2101) but not on each other, and track T5 (2105) depends on tracks T3 (2103) and T4 (2104), dependency references ('scal' or 'dpnd') are set as represented with references 2112, 2113, 2114, 2115, and 2116, respectively, without any notion of order. In such a case, the decoding of track T5 (2105) gives the following dependency graph: T5→[T3,T4] or [T4,T3]→T1. As can be seen, track T2 (2102) would not be in the dependency graph with such a mechanism and therefore, reconstruction of the complete stream from these dependencies is problematic. It implies the scan of all tracks to discover T2→T1 dependency (2112) and still misses the order in which T2 should be processed.

Regarding the second type of dependency (meaning the decoding order dependency also called below "upward track reference", represented in FIG. 21b with numerals 1 to 3), many use cases require that a precise order of track processing is specified such as, for example, Simple scalability (spatial, SNR, temporal) where each scalable level is stored in a dedicated track, each layer being dependent on a single lower layer. Each layer has to be passed to the mp4 parser in order, starting from the base for correct video elementary stream reconstruction. A second use case is the independent decoding of spatial areas in a video stream, similar to independent tiles in HEVC. In this case, each tile can be processed independently, in any order but has to be processed after the track containing non-VCL NAL units. Another use case related to region of interest is advanced scalability such as SNR refinements of region of interests, where several regions can be defined and decoded independently of each other. Finally, scalable hybrid coding where base layer and enhancement layers do not use the same media format (similar to SHVC design).

For the specific case of HEVC, the specification indicates a decoding order between NAL units representing slice segments, in particular when data are split into different tracks as described by reference to FIG. 14. Accordingly, an object of the invention is directed to signaling these dependencies at encapsulation layer so that the transmission of spatial parts leads to a valid and decodable video elementary stream after parsing at client end.

According to an embodiment of the invention, an efficient access to tiles in the context of HTTP streaming is provided by using the ISO BMFF file format applied to HEVC standard. Accordingly, each of the independent tiles to be coded (e.g. each of the twelve tiles represented in FIG. 2) is represented by a specific track called a "tile track" as described below be reference to FIG. 10.

Figure 10:
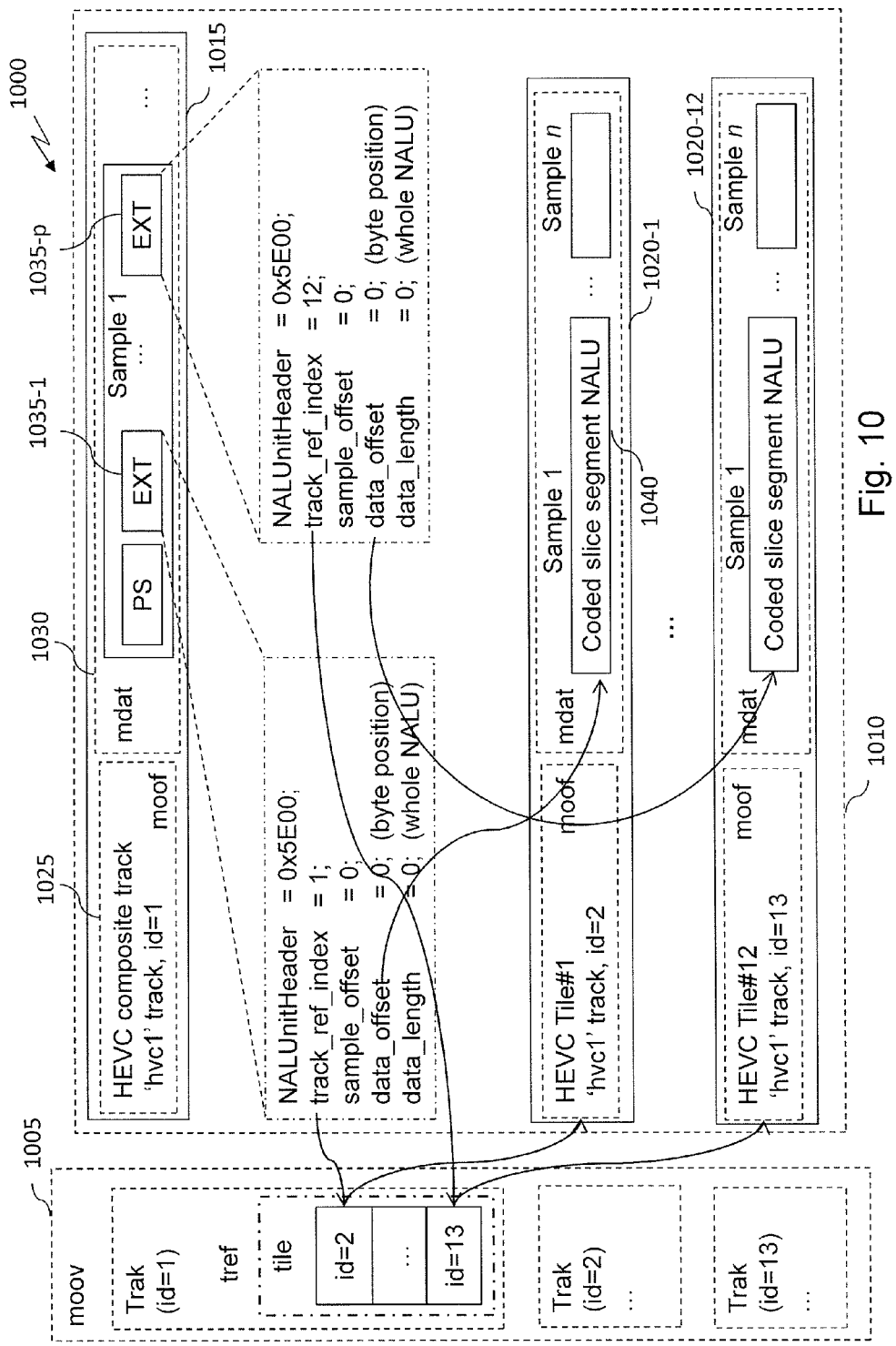
FIG. 10 illustrates an example of encapsulating a HEVC bit-stream as a set of tracks comprising a composite track and independent tile tracks, according to an embodiment of the invention.

These tile tracks are referenced (via a track reference box 'tref' of a movie box 'moov' containing a definition for each of the tracks) in a composite track that corresponds to the HEVC bit-stream in full-frame as illustrated in FIG. 10. Each tile track contains compressed video data, packaged in NAL units. The composite track contains various parameter sets (e.g. video parameter set, sequence parameter set, and/or picture parameter set) corresponding to initialization data. It also contains extractors that are NAL units of a specific type.

As described above, an extractor can be a file format internal structure having the following syntax:

```
class aligned(8) Extractor ( ) {
    NALUnitHeader( );
    unsigned int(8) track_ref_index;
    signed int(8) sample_offset;
    unsigned int((lengthSizeMinusOne+1)*8)
        data_offset;
    unsigned int((lengthSizeMinusOne+1)*8)
        data_length;
}
```

Extractor act as pointers or references to data from other tracks and enable building compact tracks with references to dependent tracks instead of data duplication in both tracks. An extractor preferably uses the NAL unit syntax. Accordingly, it comprises a header having the same structure as NAL unit header, comprising, in particular, information pertaining to the NAL unit type. This NAL unit type is set, for example, to the value '47' currently corresponding to a reserved NAL unit type in HEVC. The header is followed by an index (denoted track_ref_index) in the track reference box (tref) that allows retrieving the entry of the tref box that contains the identifier of the track (track_id) corresponding to the track that is referenced by the extractor. A third parameter is a time offset of the sample (sample_offset) that is referenced by the extractor in comparison to the current sample. The fourth and fifth parameters (denoted data_offset and data_length) respectively provide position (preferably in bytes) from where to copy and the amount of data to copy (the value 0 is reserved to indicate the copy of the whole referenced NAL unit).

FIG. 10 illustrates an example of encapsulating a HEVC bit-stream as a set of tracks comprising a composite track and independent tile tracks, according to an embodiment of the invention. For the sake of illustration, the encapsulated bit-stream corresponds to the video sequence schematically illustrated in FIG. 2.

As illustrated, the encapsulated bit-stream 1000 comprises an initialization segment file 1005 containing a movie box ('moov') providing a definition for tracks and media segment file 1010 representing a composite track 1015 and twelve tile tracks 1020-1 to 1020-12 (each of the tile tracks 1020-1 to 1020-12 being associated to one tile of the video sequence).

Composite track 1015 comprises, as specified in the DASH standard, a segment type box 'styp' (not represented), at least one movie fragment box 'moof' 1025 comprising metadata such as a track segment type and an identifier, and at least one media data box "mdat" 1030 comprising, for each video data samples, PPS and references to video data.

Similarly, each of the tile tracks 1020-1 to 1020-12 comprises a segment type box "styp" (not represented), at least one movie fragment box "moof" comprising metadata such as a track segment type and an identifier, and at least one media data box "mdat" comprising compressed video data packaged in NAL units (NALUs).

Tile tracks 1020-1 to 1020-12, having identifier 2 to 13, are referenced in track reference box "tref" 1035 of initialization segment file 1005 (more precisely of the movie box "moov" of the initialization segment file 1005, in the definition of the composite track having identifier id=1).

As illustrated, composite track 1015 comprises extractors acting as pointers or references to data from other tracks. For the sake of illustration, several parameters amongst which an index of a tile track (track_ref_index), a data_offset (data_offset), and a data_length (data_length) corresponding to extractors 1035-1 and 1035-p of composite track 1015 are represented.

Still for the sake of illustration, when NAL unit 1035-1 of composite track 1015 is processed, it is determined that it represents a NAL unit of the extractor type (NALUnitHeader equals to the hexadecimal value 5E00). Accordingly, it is processed in order to recover corresponding compressed video data. To that end, its tile track index (i.e. track_ref_index=1) is obtained. From this index, it is possible to recover a tile track identifier from the tile track definitions stored in the initialization segment file 1005. In the given example, since the index is equal to one, the first tile track identifier of the tref box is selected (id=2). Next, this identifier is used to access the corresponding tile track and then, using data_offset (i.e. a relative index of a sample in the identified track that is to be used as the source of information) and data_length (i.e. the number of bytes to copy, for example the whole NALU when data_length=0) parameters of extractor 1035-1, compressed video data are extracted from tile track 1020-1 (i.e. coded slice segment NALU 1040 in the given example).

After having been processed an extractor is replaced by the data it references. According to the example illustrated in FIG. 10, the parsing and processing of extractor 1035-1 lead to its replacement by the coded slice segment NALU 1040, thus forming a HEVC compliant bit-stream.

It is to be noted that the semantic used for storing parameters of a HEVC extractor can be close to the one defined in the SVC standard. Accordingly, for an extractor referencing HEVC NAL units, the following can apply:

the parameter known as forbidden_zero_bit is set as specified in ISO/IEC 23008-2;

the parameter known as nal_unit_type is set to 47 (reserved code in the Final Draft International Standard for HEVC);

the parameters known as nuh_layer_id and nuh_temporal_id_plus1 are copied from the first NALU referenced by the extractor (an extractor in a HEVC track referencing HEVC NAL units does not reference several NAL units with different nuh_layer_id and nuh_temporal_id_plus1 values); and the parameter known as sample_offset is set to 0.

According to embodiments of the invention, tile tracks are to be considered as particular tracks used to support the indexation of spatially arranged data (e.g. HEVC tiles). Therefore, specific signaling is required for each track to indicate, in particular, the position of the tile in the full video (horizontal and vertical coordinates) and the size of the tile (width and height) and to provide information to indicate whether or not that the tile track can be decoded without any artifact. Such a signalization can be achieved according to several embodiments.

Figure 15:
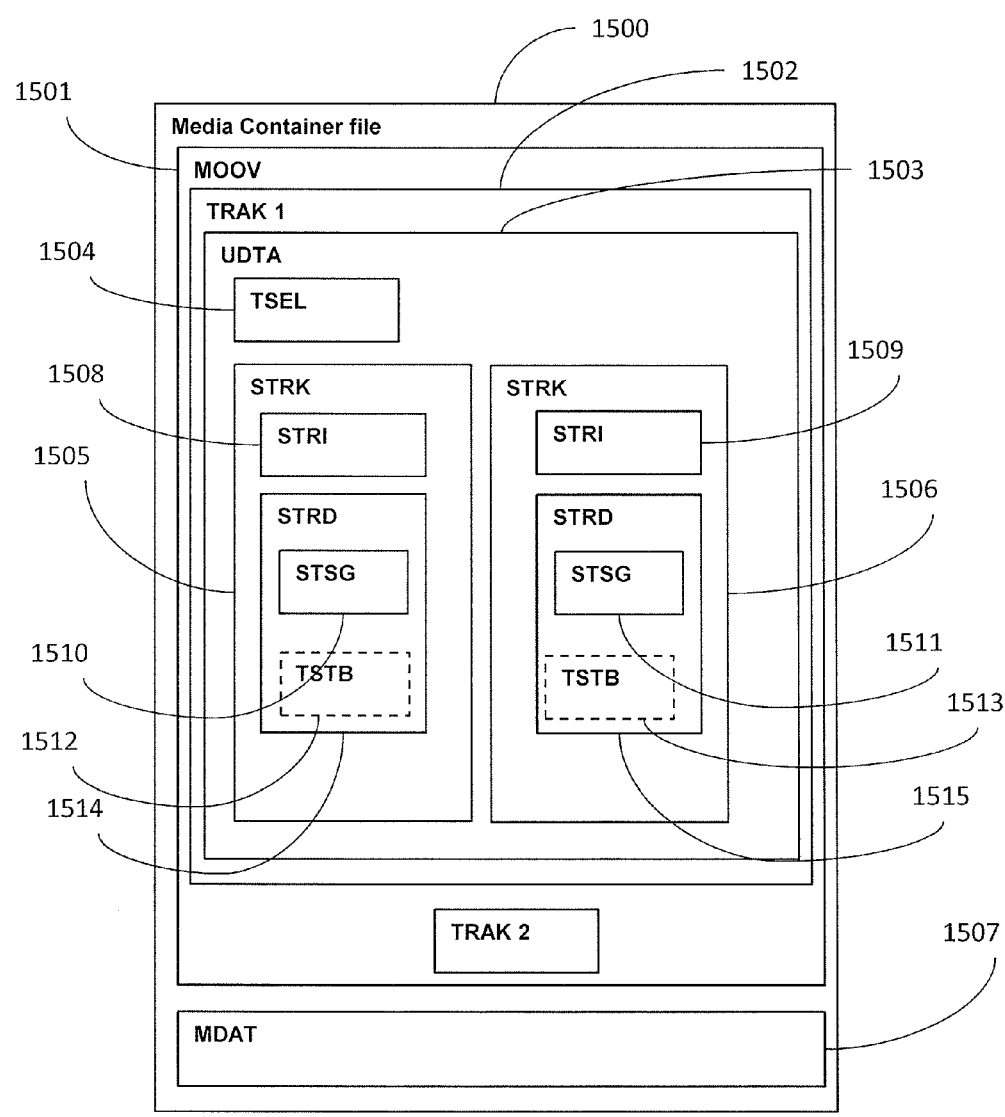
FIG. 15 illustrates an example of using the sub-track feature (i.e. sub_track boxes) for describing tiles.
Figure 16:
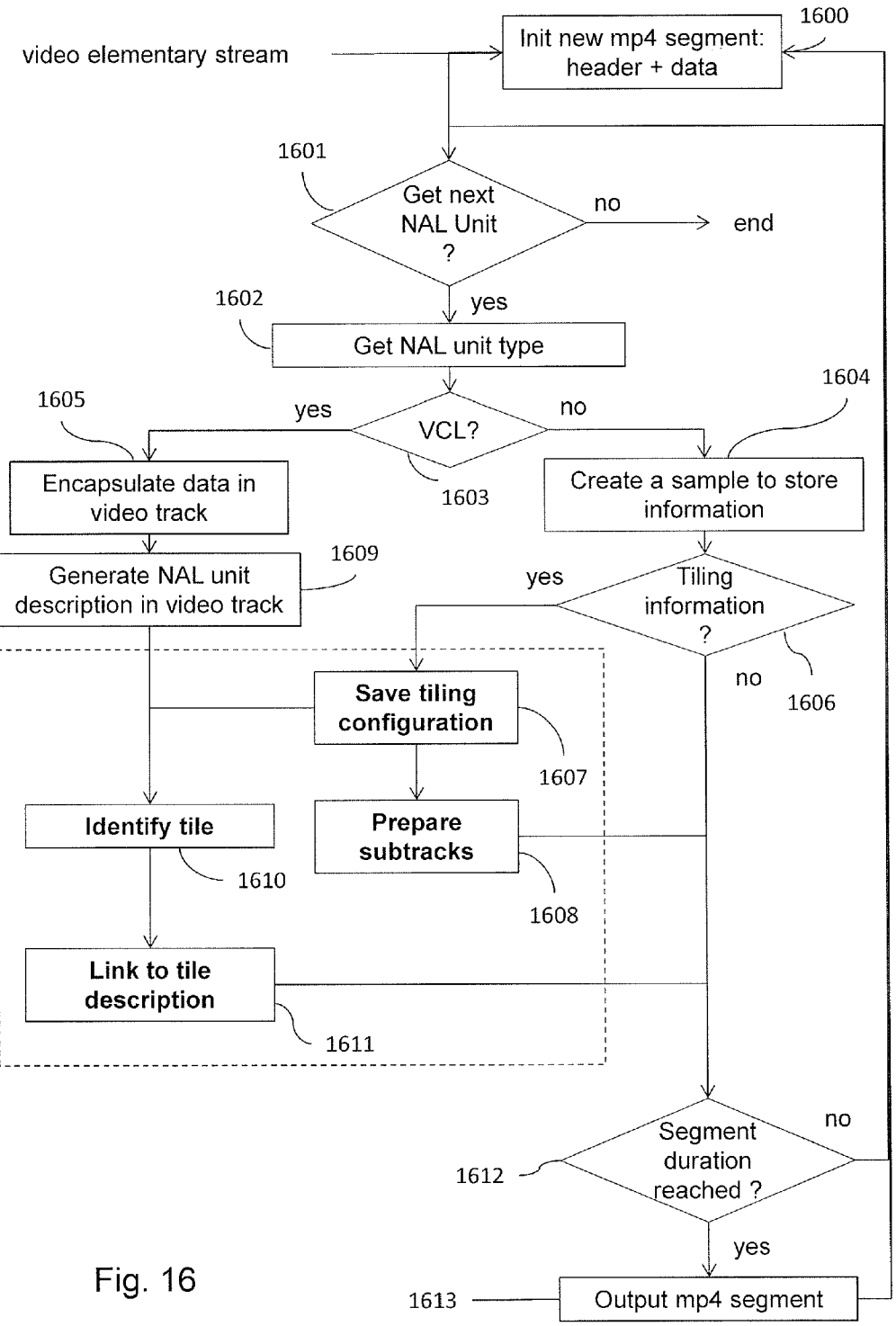
FIG. 16 is a flow chart illustrating the encapsulation of tiles with sub-tracks.

A particular embodiment, different than the one described by reference to FIG. 10, is illustrated in FIGS. 15 and 16.

FIG. 15 illustrates an example of using the sub-track feature (i.e. sub-track boxes) for describing tiles. According to this embodiment, only one video track referenced 1502 is built from an HEVC elementary bit-stream. Tile description and grouping information can be stored along with user data, referenced 1503, preferably at the same place as the track selection box referenced 1504 that is used to provide choices to a user (or client) of the encapsulated file.

It is to be recalled that the ISO Base Media File Format defines boxes to describe sub-tracks, for example sub-tracks referenced 1505 and 1506 that are used to assign parts of tracks to alternate and switch groups in the same way as (entire) tracks can be assigned to alternate and switch groups. In other words, sub-tracks can be used to describe different tiles or different versions of different tiles.

A generic syntax is provided for sub-track description as illustrated with boxes in FIG. 15 (except boxes 1512 and 1513 that are new boxes (Tile Sub Track Group boxes) according to the current embodiment). The ISO Base Media File Format indicates that these generic boxes have to be specialized for each media format (for example SVC and MVC).

In this embodiment, it is considered that the input video elementary stream is a tiled HEVC bit-stream. Therefore, to properly encapsulate the tiles (i.e. having the positions of first and last byte plus tile parameters such as position, size, and decoding information), it is requested to:

identify data referenced 1507 from the NAL units of the video elementary stream that correspond to each spatial tile. This can be represented by the positions of the first byte and of the last byte;

link each tile description (typically tile parameters like position, size and independent encoding) to each sub-track 1505 and 1506; and provide the user tile selection information, in particular indicate the possible combinations between tiles and sub-tracks.

FIG. 16 is a flow chart illustrating the encapsulation of tiles with sub-tracks. It represents steps carried out at the server end (that can be a standard server or, for example, a device capturing video since encapsulation can be done indifferently at video capture time or later when preparing content for upload to a streaming server) to encapsulate the video elementary stream into mp4 segments.

Figure 11:
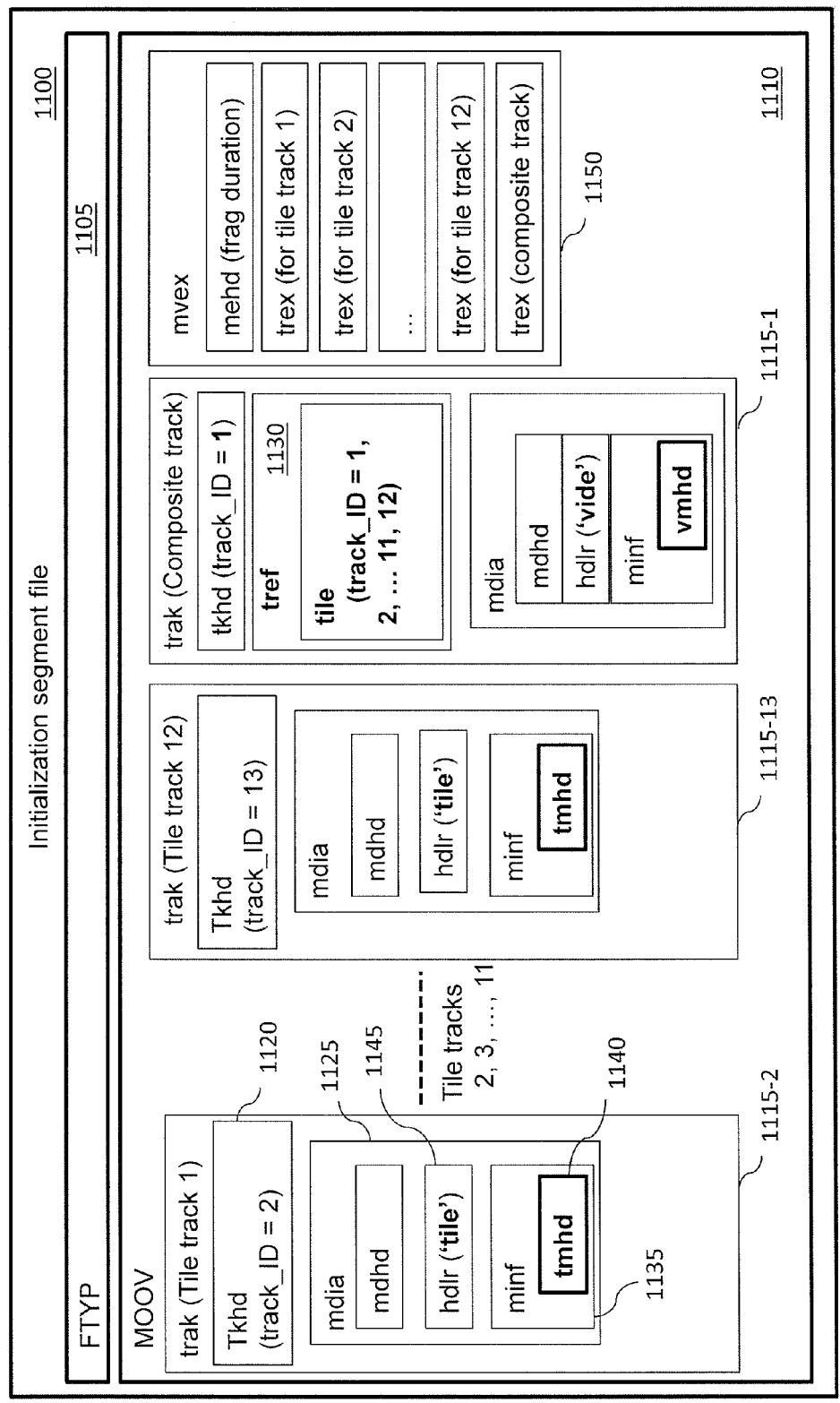
FIG. 11 illustrates an example of block diagrams of an initialization segment file using media data tracks, according to a first embodiment, to encapsulate a HEVC bit-stream.

It is to be recalled that an mp4 segment is an addressable entity made up of a header part and a data part (as illustrated, for example, in FIG. 11). Mp4 segments have a duration that can be variable or that can be the same along the sequence. For the sake of clarity, it is assumed here that the segment duration is constant along time and is provided as an initialization parameter of the server in charge of encapsulating the data. However, handling variable durations would not change the steps illustrated in FIG. 16.

As illustrated, a first step of the encapsulation process comprises the initialization of a first mp4 segment (step 1600).

As mentioned above and according to this particular embodiment, the encapsulation consists in creating a single video track (as described by reference to FIG. 12b) to represent the video elementary stream.

In a following step, the server looks for a NAL unit header (step 1601). If not any NAL unit is found (i.e. the result of test 1601 is false), this means that the end of the video elementary stream has been reached. This terminates the encapsulation process.

On the contrary, if a NAL unit is found (i.e. the result of test 1601 true), its type is checked in a following step (step 1603) to determine whether it contains high level information (i.e. non-VCL (Video Coding Layer) data) or not (i.e. VCL data). If the current NAL unit contains non-VCL data, the result of test 1303 is false while if it contains VCL data, the result of test 1303 is true.

It is to be noted that the server, while looking and processing NAL units, maintains a current timestamp value corresponding to the video frame being processed. The initial timestamp value is set to zero and is updated each time a new video frame is detected (from HEVC high level syntax elements like, for example, the syntax parameters in use to compute the PicOrderCntVal).

As illustrated, data of both non-VCL and VCL NAL units are stored as samples in the data part of the video track in steps 1604 and 1605. For non-VCL NAL units, the server creates (at step 1604) a sample in the data part of the track with a timestamp value corresponding to current time. Next, it looks at the specific type of this NAL unit to determine whether it can provide information on tiling configuration (step 1606). For the sake of illustration, this can be a type of NAL unit equals to PPS NUT that specifies the tiles horizontal and vertical borders or a specific SEI message with NAL unit type equals to PREFIX SEI NUT that gives information on tiles and/or regions of interest or independently encoded spatial areas of the video.

When such a NAL unit is available, the server saves the obtained tiling configuration at step 1607 for future description of video data (described below by reference to steps 1610 and 1611). This is done in a tile descriptor, for example in the box called TileRegionSampleGroupEntry as described by reference to FIG. 12b (box 1275). It also creates the corresponding sub-tracks (referenced 1505 and 1506 in FIG. 15) that are used, in particular, to describe the tiles or the independently encoded spatial parts, one sub-track being used for each tile or spatial part (step 1608).

More precisely, step 1608 aims at preparing a sub-track information box to indicate that the current sub-track is a specific track that provides tiling information. This can be done by extending the current list of attributes of the existing SubtrackInformationBox ('stri') box, referenced 1508 and 1509 in FIG. 15. Currently, this box describes the switching and/or alternative between sub-tracks but does not enable to describe spatial parts of a video that one may compose together to display any spatial area of the original video.

Simultaneously, the server can create a track selection box (referenced 1504 in FIG. 15) to indicate to a user device that it can select one or more tiles for rendering spatial parts of the video. This requires some modifications of the track selection box because this is not currently supported.

According to a particular embodiment, a 'tile' value is added as a new descriptive attribute in the attribute list for the track selection box as well as the value 'ntls' differentiating attribute in the same attribute list. Note that the names here are provided as examples and any 4-character code could be chosen provided that it does not conflict with existing codes in the ISO base media file format and its extensions. The first one enables to indicate that the track can be scaled in terms of number of tiles while the second value indicates the number of tiles in the sub-track. The 'ntls' differentiating attribute at sub-track information and track selection levels can be relevant if the media presentation contains alternate tracks in terms of tile resolutions/number. A desired resolution/number of tiles (also known as spatial access granularity) can then be selected.

Likewise, when an alternate group of tracks contains the full-frame video (ntls=0) and a tiled representation of the same video (ntls=N), the two tracks differentiate in terms of their number of tiles. The list of possible attributes in the sub-track information box is also extended with the first new value 'tile' to indicate that the current sub-track is a particular sub-track that provides spatial access in the video track.

Returning to FIG. 16, for VCL NAL units, once the data are stored in the data part of the video track during step 1605, the server generates the header part of the track at step 1609 for the current video data (typically a slice segment in HEVC). To that end, it stores the byte positions for the current NAL unit in a track header (reference 308 in FIG. 3) or in a track fragment header (reference 410 in FIG. 4), for example in the sample size box 'stsz' or in Track Run box ('trun'). It also stores the timing information in dedicated boxes to reference the data (for example the composition time to sample 'ctts' and decoding time to sample 'stts' boxes).

Next, when tiling information is present (i.e. when test 1606 is true) and saved (step 1607), the tile from which the current NAL unit comes is identified (step 1610). For HEVC video elementary stream, this identification can be based on the slice segment address provided in the HEVC slice segment header. Given the slice segment address and knowing the tile configuration, the tile index can be deduced. When identified, the current sample is associated with the tile descriptor recorded at step 1607 for the identified tile (step 1611).

This consists in a subsample grouping mechanism, the subsample being the slice segment conveyed by the current NAL unit. This slice segment can cover the whole tile (such a case corresponds to the one illustrated in FIG. 9a) or be a part of the tile (i.e. the tile would contain more than one slice segment, such cases correspond to the ones illustrated in FIG. 9b or 9c). This associating or linking step 1611 also updates the sub-track prepared at step 1608.

Step 1611 aims at providing a mapping between sub-tracks (referenced 1505 and 1506 in FIG. 15) and data (referenced 1507 in FIG. 15). This can be done with the box known as SubTrackDefinitionBox ('strd', references 1514 and 1515 in FIG. 15). The SubTrackDefinitionBox box is a container for format specific sub tracks (e.g. SVCSubTrackLayerBox or MVCSubTrackViewBox) and for optional sample grouping information SubtrackSampleGroupBox ('stsg' in section 8.14.6 of ISO/IEC 14496-12:2012 standard) that is defined as follows:

```
aligned(8) class SubTrackSampleGroupBox extends FullBox('stsg', 0,
0){
    unsigned int(32) grouping_type;
    unsigned int(16) item_count;
    for(i = 0; i< item_count; i++)
        unsigned int(32) group_description_index;
}
```

In the particular case of tile sub-tracks, the Subtrack-SampleGroupBox preferably indicates:
- as grouping_type: the value that indicates a TileRegion-SampleGroupEntry (e.g. 'trif' for Tile Region InFormation or 'trsg' as illustrated with reference 1275 in FIG. 12*b*). Whatever the 4-letter code, it shall be unique to identify the kind of sample grouping that is to say, according to this particular embodiment, the grouping of samples or subsamples into a tile; and
- as group_description_index: the value of the groupID or the tileID for the current tile. This value is recorded in the SampleGroupDescriptionBox for describing the tiles of the track, as described by reference to FIG. 12*b*.

Additional grouping information can be provided to define a sub-track as a group of tiles. A new TileSubTrackGroupBox (or HEVCTileSubTrackGroupBox) can be defined as follows:

| HEVC Tile Sub Track Group box |
|---|
| Definition |
| Box Type: 'tstb ' |
| Container: Sub Track Definition box ('strd') |
| Mandatory: No |
| Quantity: Zero or more |
| Syntax |
| aligned(8) class TileSubTrackGroupBox extends FullBox('tstb', 0, 0) {<br>    unsigned int(16) item_count;<br>    for(i = 0; i< item_count; i++) {<br>        unsigned int(16) GroupId;<br>    }<br>} |

The union of GroupIds in this box describes the sub-track defined by this box, item_count counts the number of tile groups listed in this box, and GroupId represents the identifier of the tile group contained in this sub-track.

Returning to FIG. 16, once linked, the server continues the encapsulation by checking whether current segment should be finished by determining whether or not the current timestamp is greater than pre-defined segment duration (step 1612). If the current timestamp is greater than pre-defined segment duration, the mp4 segment is stored as ready for streaming on the server (step 1613) and a new segment is created in 1600 to process next NAL units in 1601. If the segment duration is not reached, the server considers the next NAL unit in 1601 to keep on constructing the data part of the current segment.

Figure 17:
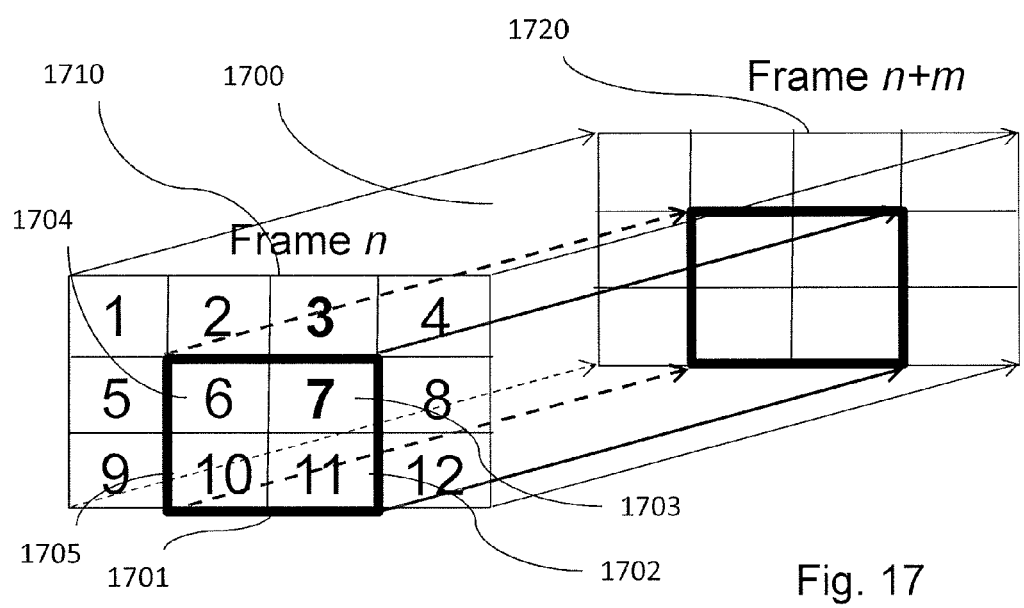
FIG. 17 illustrates an example of a region of interest covering multiple tiles of a video.

FIG. 17 illustrates an example of a region of interest covering multiple tiles of a video. As illustrated, new box TileSubTrackGroupBox (or HEVCTileSubTrackGroupBox) can be useful to describe a region of interest referenced 1701 in a video sequence referenced 1700, the region of interest being detected on a set of video frames (referenced 1710 to 1720) and that would cover more than one tile (referenced 1702 to 1705).

In this case, a sub-track is created to describe the pre-defined ROI. The associated SubTrackDefinitionBox contains a TileSubTrackGroupBox (or HEVCTileSubTrackGroupBox) to indicate which tiles (through a list of groupID) are covered by the pre-defined ROI associated to the sub-track. Such region of interest and the corresponding covered tiles could be provided in a SEI message in the HEVC video elementary stream and handled by steps 1604 to 1608 and 1610 and 1611.

According to a particular embodiment illustrated in FIG. 11, similar to the one described above, signaling can be done at track level.

FIG. 11 illustrates an example of block diagrams of an initialization segment file using media data tracks, according to a first embodiment, to encapsulate a HEVC bit-stream. It is based on the example described by reference to FIG. 10.

The initialization segment file 1100 and media segment files (not represented) are used to reorganize and encapsulate a video bit-stream conforming to the HEVC standard in ISO Base Media File Format. Tracks are streamed independently.

As described above, the initialization segment file is used to transmit all the metadata that are necessary to define timed media data bit-streams encapsulated in other media segment files. As illustrated in FIG. 11, initialization segment file 1100 contains a file type box 'ftyp' 1105 and a movie box 'moov' 1110. File type box 1105 preferably identifies which ISO BMF specifications the segment files comply with and indicates a version number of that specification. Movie box 'moov' 1110 provides all the metadata describing the presentation stored in media segment files and in particular all tracks available in the presentation.

Movie box 1110 contains a definition for each of the tracks ('track' boxes 1115-1 to 1115-13) comprising, in the given example, one composite track (1115-1) and twelve tile tracks (1115-2 to 1115-13).

Each track box contains at least a track header box 'tkhd', generically referenced 1120, and a track media box 'mdia' generically referenced 1125. If a track depends on data from other tracks, there is also a track reference box 'tref'. As illustrated, the composite track having the identifier track_ID=1 comprises track reference box 'tref' 1130 indicating that the track depends on data from tile tracks having the identifiers track_ID=2 to 13.

As mentioned above, it is to be noted that other boxes may be mandatory or optional depending on ISO BMFF specifications used to encapsulate the timed media data bit-stream. However, since embodiments of the invention do not rely on these boxes to be applicable, they are not presented here.

According to the embodiment described by reference to FIG. 11, signalization of the position of the tile in the full video, the size of the tile, and of the indication that the tile track can be decoded without any artifact is done once for the whole HEVC bit-stream to be encapsulated, in the 'moov' box (1110), in each track definition, using the track header box 'tkhd' (1120) and boxes of the media information box 'mdia' (1125).

The positions of the tiles are placed in a new type of media header information box 1135, referred to as the TileMediaHandlerEntry box or 'tmhd' (1140) that defines horizontal and vertical offsets (horizontal_offset and a vertical_offset).

The size of the visual presentation of the considered tile is put in the existing track header's width and height parameters. If required, the real pixel dimensions of the considered tile can be documented in sample descriptions (via the parameters known as VisualSampleEntry( ) in the box known as SampleDescriptionBox)

Finally, signaling a specific track (tile track) is explicitly done by defining a new type of track ('tile') in the handler box 'hdlr' (1145).

The movie box "moov" 1110 of the initialization segment file 1100 further comprises 'mvex' box 1150. This box is used to inform client accessing the encapsulated file that movie fragments are present. It enables to specify in the initialization segment file the duration of the longest track in the presentation. It makes simpler the computation of the presentation duration, avoiding the examination of each movie fragment duration. As illustrated, mvex box 1150 contains a track extend box per track in order to avoid duplication of information that is common to all fragments of each track (i.e. the tile tracks and the composite track), for example the track identifiers and the default size of the samples in the track.

It is to be noted that such an embodiment of signaling tile tracks does not introduce significant overhead in comparison to usual video track signaling. Moreover, it remains independent of the number of movie fragments into which the presentation is split. However, it is not adapted to varying tiling configuration along a video sequence.

According to another particular embodiment that is adapted to handle variation in tiling configuration along a video sequence, signaling is done at a sample level, using the sample grouping mechanisms from the ISO BMFF standard.

Such sample grouping mechanisms are used for representing partitions of samples in tracks. They rely on the use of two boxes: a SampleToGroup box ('sbgp') that describes the assignment of samples to sample groups and a SampleGroupDescription box ('sgpd') that describes common properties of samples within a particular sample group. A particular type of sample grouping is defined by the combination of one SampleToGroup box and one SampleGroupDescription box via a type field ('grouping_type'). Multiple sample grouping instances (i.e. pair of SampleToGroup and SampleGroupDescription boxes) can exist based on different grouping criteria.

According to embodiments of the invention, a new grouping criterion related to the tiling of samples is defined. This new grouping_type, called 'tile', describes the properties of a tile and is derived from the standard VisualSampleGroupEntry. It can be referred to as TileRegionSampleGroupEntry HEVCSpatialEntry or TileRegionGroupEntry (whatever the name provided that it has a unique box identifier code (typically a 4-letter code in ISO BMFF), to keep coherence with existing ScalableGroupEntry or MultiviewGroupEntry) and is defined as follows:

```
classTileRegionGroupEntry ( ) extends VisualSampleGroupEntry
('trsg') {
    unsigned int(16) tileID; (or groupID)
    unsigned int(2) independent;
    unsigned int(6) reserved=0;
    unsigned int(16) horizontal_offset;
    unsigned int(16) vertical_offset;
    unsigned int(16) region_width;
    unsigned int(16) region_height;
// other boxes
}
```

According to this new type of group entry, tileID (or groupID) parameter is a unique identifier for the tile described by the group. horizontal_offset and vertical_offset parameters are used to set an horizontal and a vertical offset, respectively, of the top-left pixel of the rectangular region represented by the tile, relative to the top-left pixel of the HEVC frame, in luma samples of the base region. region_width and region_height parameters are used to set the width and height, respectively, of the rectangular region represented by the tile, in luma samples of the HEVC frame. independent parameter is a 2-bit word that specifies that the tile comprises decoding dependencies related to samples only belonging to the same tile, as described above by reference to the definition of independent tiles. For the sake of illustration and referring to a standard use of SEI messages for describing tile organization, the flag known as tile_section_exact_match_flag can be used to set the value of the independent flag. The meaning of the latter can be set as follows:

if independent parameter equals 0, the coding dependencies between this tile and other tiles in the same frame or in previous frames is unknown; information can be found by exploring the track reference box for potential decoding dependency signaling.

if independent parameter equals 1, there are no spatial coding dependencies between this tile and other tiles in the same frame but there can be coding dependencies between this tile and the tile having the same tileID in the previous frames, and if independent parameter equals 2, there are no coding dependencies between this tile and other tiles having the same tileD in the same frame or in previous frames;

the independent parameter value 3 can be used to indicate a simple slice_segment_header dependency from other tiles. This can be the case where one slice contains multiple tiles: one tile can be encoded with only dependent slice segments thus depending on the tile where the previous independent slice segment has been encoded. In such a case, the information on the tile from which the current one depends can be found in the track reference box.

Optionally, a parameter describing an average bitrate per tile can be set in the tile descriptor so as to be provided to streaming client for adaptation based on bandwidth.

According to this embodiment, the properties of each tile are given once in the movie header ('moov' box) by defining, for each tile track, one SampleGroupDescription box ('sgpd') with the 'tile' grouping_type and a HEVCSpatialEntry (or TileRegionGroupEntry). Then, according to ISO BMFF standard, a SampleToGroup box is defined in each tile track fragment to associate each sample of the tile track fragment with its properties since the number of samples is not known in advance.

In case the grid of tiles changes over time, a new SampleGroupDescription box ('sgpd') with a new HEVCSpatialEntry (or TileRegionGroupEntry) can be defined in track fragment box (Van and referenced by the SampleToGroup box ('sbgp'). Therefore, in the case according to which the grid is static over time, at least one SampleToGroup box is defined per tile track and tile track fragment. This box represents, in terms of description, at least 28 bytes. Assuming 16 tiles with fragments of 2 second durations, this would represent 1792 bits per second to signal tiling configuration over time, only for the SampleToGroup box. In the case according to which the grid is changing over time, the cost (in term of data amount) would be higher. As described below, this amount of supplemental initialization data can be reduced.

It is to be noted that sample group boxes provide an efficient and extensible tool to add meta-data to individual samples. It is however quite common that given meta-data are valid for all samples of a given track, as this can be the case with tiling descriptor with a fixed NALU pattern in each AU (i.e. with a static tiling configuration along time.

This can be indicated by flagging accordingly each sample of a group using a SampleToGroup box.

Alternately, in order to reduce the amount of initialization data per tile track, some sample groups can be marked as 'default' (i.e. valid for all samples). This default grouping limits the description cost in terms of bytes since, for static tiling configuration, it is defined at the 'moov' box level, once per track for the whole sequence.

To that end, a second version (version=2) of a group description type can be used in the box known as SampleGroupDescriptionBox (there can be multiple SampleGroupDescriptionBox per traf/stbl box), indicating (via the parameter known as grouping_type) that the referenced sample group applies to all the samples in the current track or in current track fragments.

The new version of the sample group description box can be defined as follows:

```
aligned(8) class SampleGroupDescriptionBox (unsigned int (32)
handler_type) extends FullBox('sgpd', version, 0) {
    unsigned int(32) grouping_type;
    if (version == 1) || (version==2) {unsigned int (32)
    default_length;}
    unsigned int (32) entry_count;
    int i;
    for ( i = 1; i <= entry_count; i++ ) {
        if (version != 0) {
            if (default_length==0) {
                unsigned int(32) description_length;
            }
        }
        switch(handler_type) {
            case 'vide': // for video tracks
                VisualSampleGroupEntry(grouping_type);
                break;
            case 'soun': // for audio tracks
                AudioSampleGroupEntry(grouping_type);
                break;
            case 'hint': // for hint tracks
                HintSampleGroupEntry(grouping_type);
                break;
        }
    }
}
```

According to this extended type of SampleGroupDescription box, when version equals 2, this group description and any SampleGroupEntry applies to all the samples of the current track or track fragment. Another embodiment to indicate that the sample group description box is specific is to extend this box with the support of flags attribute already used in some boxes of the ISO Base Media File Format. In this embodiment, the new definition for SampleGroupDescriptionBox is as follows:

```
aligned(8) class SampleGroupDescriptionBox (unsigned int (32)
handler_type) extends FullBox('sgpd', version, flags) {
    unsigned int(32) grouping_type;
    if (version== 1) { unsigned int(32) default_length; }
    unsigned int(32) entry_count;
    int i;
    for (i = 1 ; i <= entry_count ; i++){
        if (version==1) {
            if (default_length==0) {
                unsigned int(32) description_length;
            }
        }
        switch(handler_type) {
            case 'vide': // for video tracks
                VisualSampleGroupEntry(grouping_type);
```

-continued

```
                break;
            case 'soun': // for audio tracks
                AudioSampleGroupEntry(grouping_type);
                break;
            case 'hint': // for hint tracks
                HintSampleGroupEntry(grouping_type);
                break;
        }
    }
}
```

The semantics are unchanged, the only difference is the introduction of the flags attribute defined as follows, the following flags being defined for sgpd: 0x000001 sample-group-is-default: indicates that all samples in this track or in the current fragment are assigned to this group; consequently, all entries (the specific sample group entries) defined in this box apply to all samples in the track or in the track fragment (traf). If a default sgpd box is defined in a track fragment (traf) for a track with a default sgpd box (i.e. with above flags value or with version=2 or any other means to signal it as applying to all samples) with the same grouping_type, only the sgpd box defined in the traf shall be considered. When changing the size of movie fragments, or removing them, it may happen that default association no longer applies, in which case regular SampleGroupDescriptionBox along with SampleToGroupBox boxes should be created to reflect the new association. This default grouping mechanism can be useful (reduced description cost) for sample descriptions such as "roll" in case of GDR (Gradual Decoding Refresh) groups or tiles when encapsulated in separate tracks, or other sample group description types.

The grouping_type parameter is an integer that identifies the SampleToGroup box that is associated with this sample group description. It is to be noted that when a track or a track fragment comprises in its initialization data a SampleGroupDescription box with version=2, there is no need to put in these initialization data a SampleToGroup box describing the corresponding grouping_type (since description applies to all samples by definition).

In this definition of the new version of the sample group description box, entry_count is an integer that gives the number of entries in the following table, default_length indicates the length of every group entry (if the length is constant), or zero if it is variable, and description_length indicates the length of an individual group entry, in the case it varies from entry to entry and default_length is therefore zero.

According to this embodiment, the grouping_type could have a specific value to indicate a spatial/tile grouping: it can be, for example, the hexadecimal value corresponding to the ASCII code for 'tile' (0x74696C65). At most one occurrence of this box with the same value for grouping_type shall exist for a track.

It is to be noted that in case of adaptive grid moving over time, the sample to group box remains the same (i.e. 'tile' grouping_type) and keeps on applying to all samples. As such, only the sample group description box needs to be updated in the track fragments of tile tracks whose tiling configuration changed from the default configuration signaled in the moov/trak/mdia/minf/stbl box. This reduces the signalization cost for adaptive tiles.

Alternately, and still in order to reduce the amount of initialization data per tile track (to avoid repeating a SampleToGroup box in each tile track fragment), a new DefaultSampleToGroups box referred 'dsgp' (or another similar box having the same semantic, whatever its name) is defined to be included only in the SampleTable box ('stbl') from each moov/trak boxes as part of initialization information. This new box would associate to all samples a set of sample group descriptions that would apply to all samples within a track.

The new DefaultSampleToGroup box can be defined as follows:

```
aligned(8) class DefaultSampleToGroups extends FullBox('dsgp',
version, 0) {
    unsigned int(32) entry_count;
    for (i=1; i <= entry_count; i++) {
        unsigned int(32) grouping_type;
        if (version == 1) {
            unsigned int(32) grouping_type_parameter;
        }
        unsigned int(32) group_description_index;
    }
}
``` where entry_count parameter gives the number of entries in the list of groups to be associate to each sample and grouping_type parameter is an identifier for the type of grouping, referred to in the SampleGroupDescription box. For example, in a particular embodiment, the grouping type can have a specific value indicating a spatial/tile grouping. It can be, for example, the hexadecimal value corresponding to the ASCII code for 'tile' (0x74696C65). The group_description_index parameter is an integer that gives the index of the sample group entry which describes the samples in this group. The index ranges from one to the number of sample group entries in the SampleGroupDescription box or takes the value zero to indicate that this sample is not a member of any group of this type. Finally, the grouping_type_parameter parameter is an indication for the sub-type of the grouping (if used by the grouping type).

This enables to signal that all samples from a track follow the same group description for a given grouping type, using at most 32 bytes per tile whatever the number of movie fragments if only the tile grouping is in use (entry_count=1). In case of adaptive grid moving over time, a new DefaultSampleToGroups box and a new SampleGroupDescription box could be defined in the track fragments. The new DefaultSampleToGroups box would replace the previous definition and refers to the new tile description in the new SampleGroupDescription box. Thus, a SampleToGroup box is not defined for each track fragment but only when the tile grid definition changes. Still according to a particular embodiment that is adapted to handle variation in tiling configuration along a video sequence, signaling is done at sub-sample level with a new sample map box.

Still according to a particular embodiment, a generic signaling is used for coding dependencies. According to this embodiment, each tile is encoded in one track and references other than extractors (that are costly in terms of description size (typically 14 bytes per sample per tile)) are used.

Figure 18:
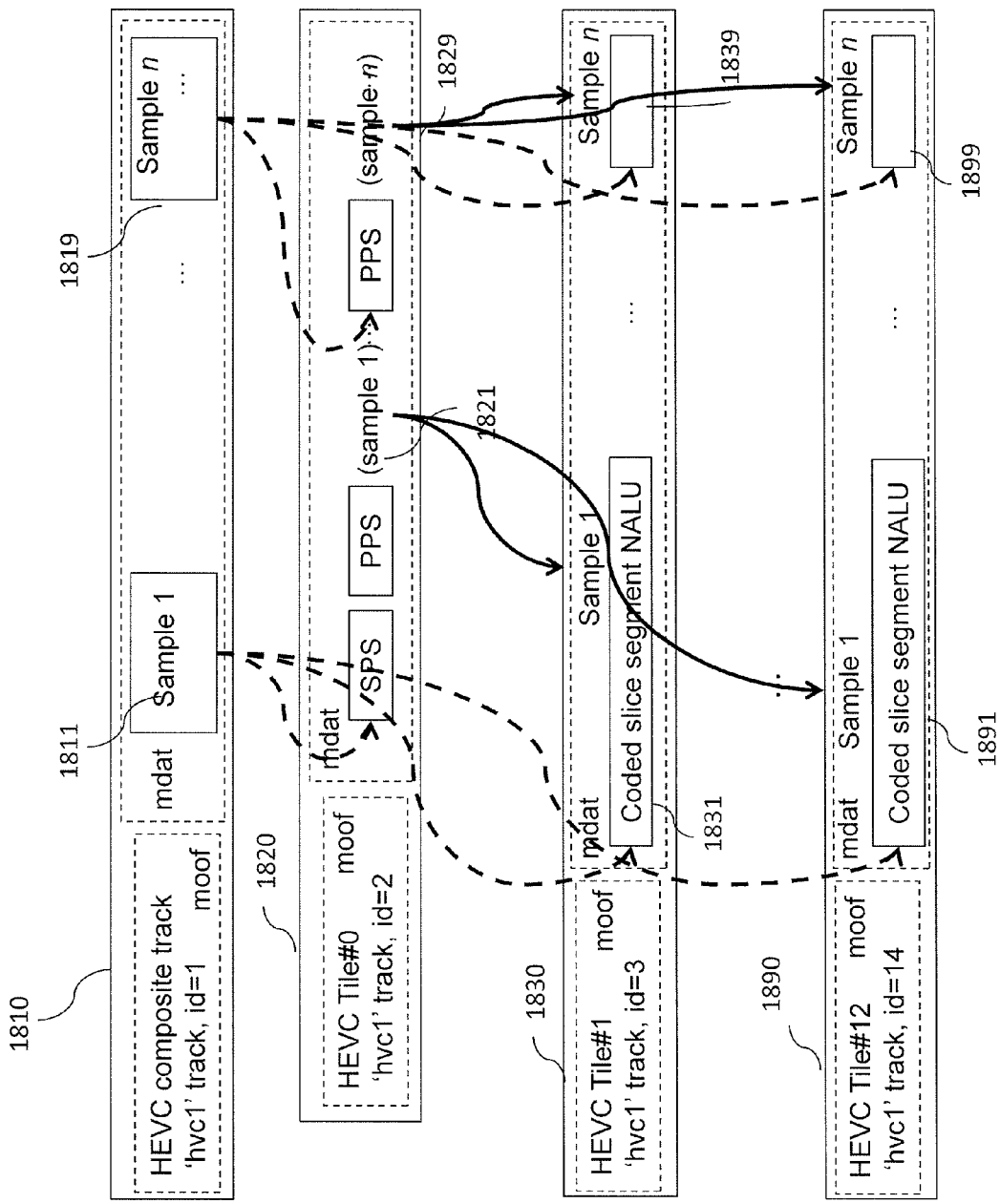
FIG. 18 illustrates an example of encapsulating a HEVC bit-stream using a generic signaling for coding dependencies.

FIG. 18 illustrates an example of encapsulating a HEVC bit-stream using a generic signaling for coding dependencies. It provides an example of encapsulation for a single layer stream as the one illustrated in FIG. 17. It corresponds to a tiled HEVC video elementary stream. For the sake of clarity, only the data part of the different tracks is represented in FIG. 18 (the header part is shown on FIG. 19a). These data parts represent:
the composite or virtual track 1810 that is used to aggregate data;
the parameter set tracks 1820 that stores information that is common to all tracks; and
the tile tracks 1830 to 1890 that each contains compressed video data for a given tile (for the sake of illustration, only tile tracks 1830 and 1890 are represented).

Figure 14:
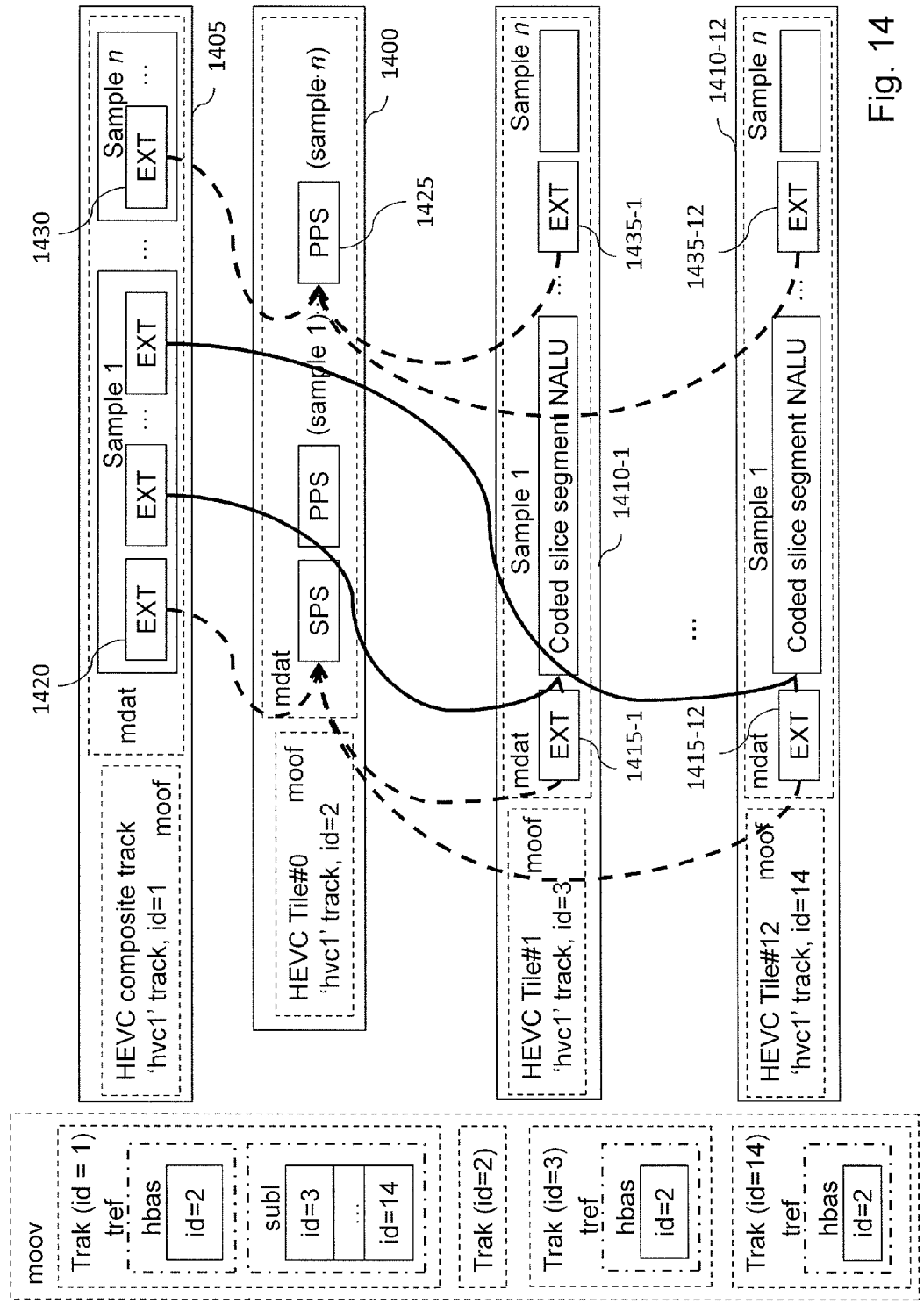
FIG. 14 illustrates an example of encapsulating a HEVC bit-stream as a set of tracks comprising a composite track, an initialization data track, and independent tile tracks that are playable as standard video tracks, according to another embodiment of the invention.

As one can see when compared to FIG. 14, the samples in the tile tracks illustrated in FIG. 18 no more use extractor NAL units. This makes the tile tracks' description smaller in size. The dashed arrows illustrate the decoding dependencies while the continuous arrows represent the decoding order dependencies.

For example, the first sample referenced 1811 in the composite track 1810 depends on the first sample 1821 of the parameter set track 1820, and on the first samples of each of tile tracks 1831 to 1891. This is the same for sample n referenced 1819. These dependencies are similar to the ones illustrated in FIG. 14 but the latter are expressed with extractor data structure, leading to an overhead of 14 bytes per dependency per sample.

A preferred embodiment providing a more compact description is proposed below. This preferred embodiment allows to:
specify a decoding order;
provide in case of a fixed pattern of base and enhancement (or non-VCL+tile) a simple rule for concatenation instead of repetition for each sample); such a simple rule also allows reducing the overhead (no need for extractor NALUs); and
bypass the fact that extractors cannot point to extractors (see subclause A.3.1 of ISO/IEC 14496-15), and therefore that the N-th scalable layer requires N extractors per sample to aggregate the complete stream.

According to this embodiment, the repetition of dependency links over the sample is used so that one description of the dependency links can be used to process all or at least several samples. In other words, such a repetition of dependency links enables to factorize them in the header part of each track and thus, to reduce the description cost.

Figure 19A:
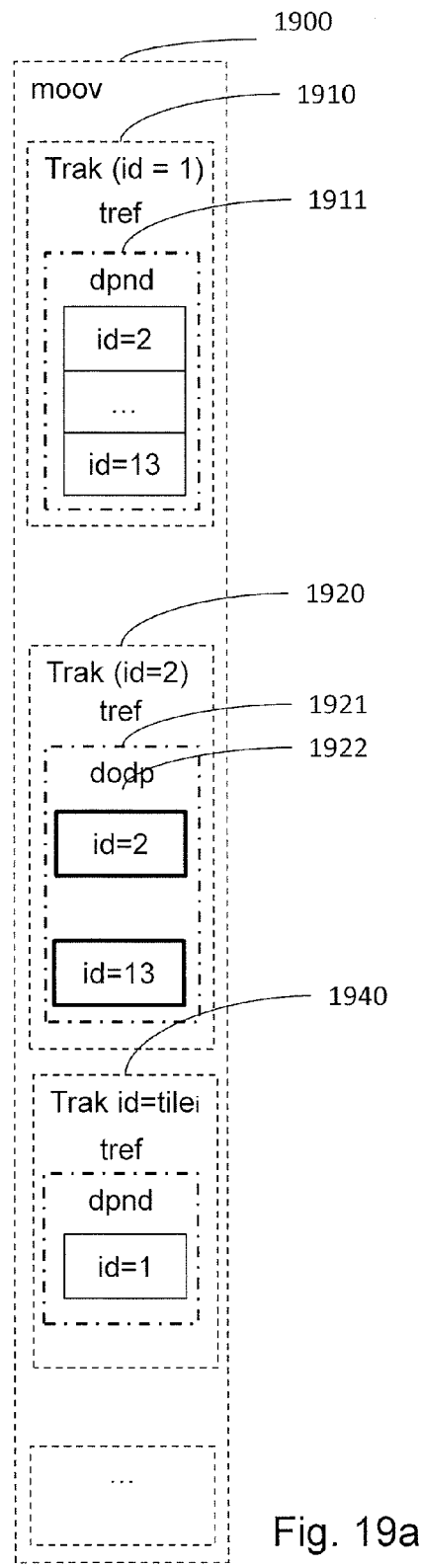
FIGS. 19a and 19b, illustrates examples of track headers and track references for tracks encapsulated using a generic signaling for coding dependencies.
Figure 19B:
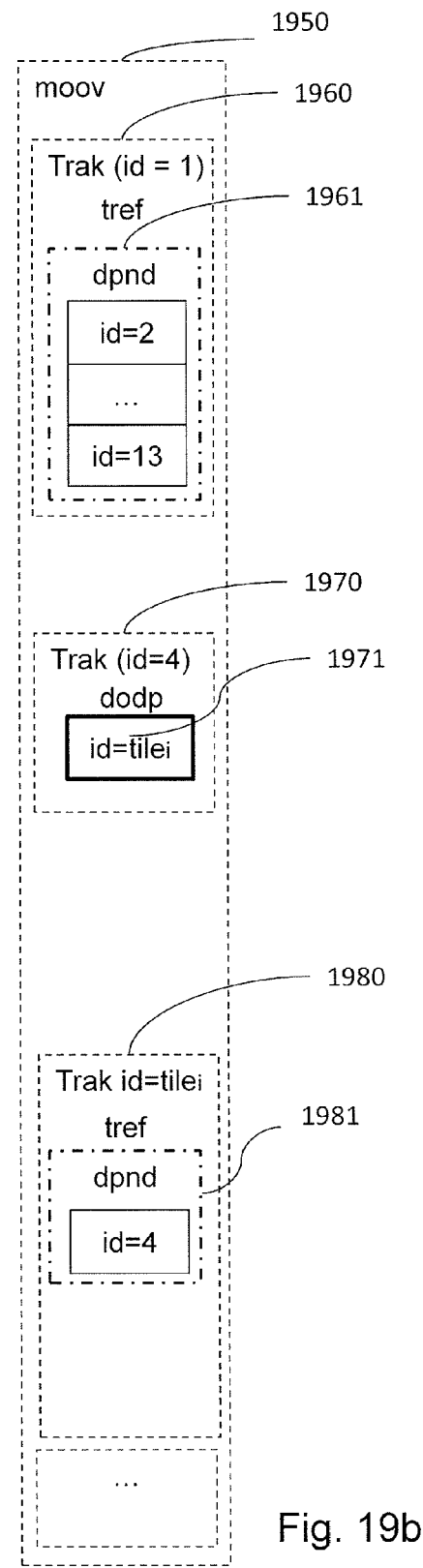

As illustrated in FIG. 19, comprising FIGS. 19a and 19b, that illustrates examples of track headers and track references for tracks encapsulated using a generic signaling for coding dependencies, the moov header box can be used to store such a description of dependencies.

For the sake of illustration, moov header 1900 of FIG. 19a corresponds to header data (trak box) of the tracks illustrated in FIG. 18. More precisely, the header information of the composite or virtual track 1810 of FIG. 18 is represented in FIG. 19a with reference 1910, the header data for the parameter set track 1820 of FIG. 18 is represented in FIG. 19a with reference 1920, and the header data for a tile track like tile track 1830 or tile track 1890 in FIG. 18 is represented in FIG. 19a with reference 1940.

As illustrated, each track box contains a track reference box denoted tref that lists the dependencies for a given track as a reference type and a list of track IDs concerned by this particular reference type. For the sake of illustration, two reference types denoted dpnd and dodp are used. The first reference type indicates a decoding dependency while the second reference type indicates a decoding order dependency. They can be combined with the other existing reference types defined in ISO/IEC 14496 Part 12 or Part 15. It is to be noted that dpnd and dodp names are given as examples, any other 4-letter code can be used provided that they do not conflict with other codes in the ISO Base media file format and its extensions.

In the illustrated example, the composite track has decoding dependencies on the parameter set track and on each tile track. Thus, its tref box (referenced 1911) lists all the other tracks as tracks on which the composite track depends. On the contrary, the parameter set track has no decoding dependency (as can be seen with reference 1921). As such, it can also be referred from other tracks as the base track using the 'hbas' dependency as described herein below by reference to FIG. 13. This can simplify the parsing process carried out at the client end as described by reference to FIG. 20.

This reference mechanism indicates for each track all the other tracks that are required to reconstruct a displayable track and in addition guarantees the correct decoding order between NAL units contained in the tracks.

Figure 20:
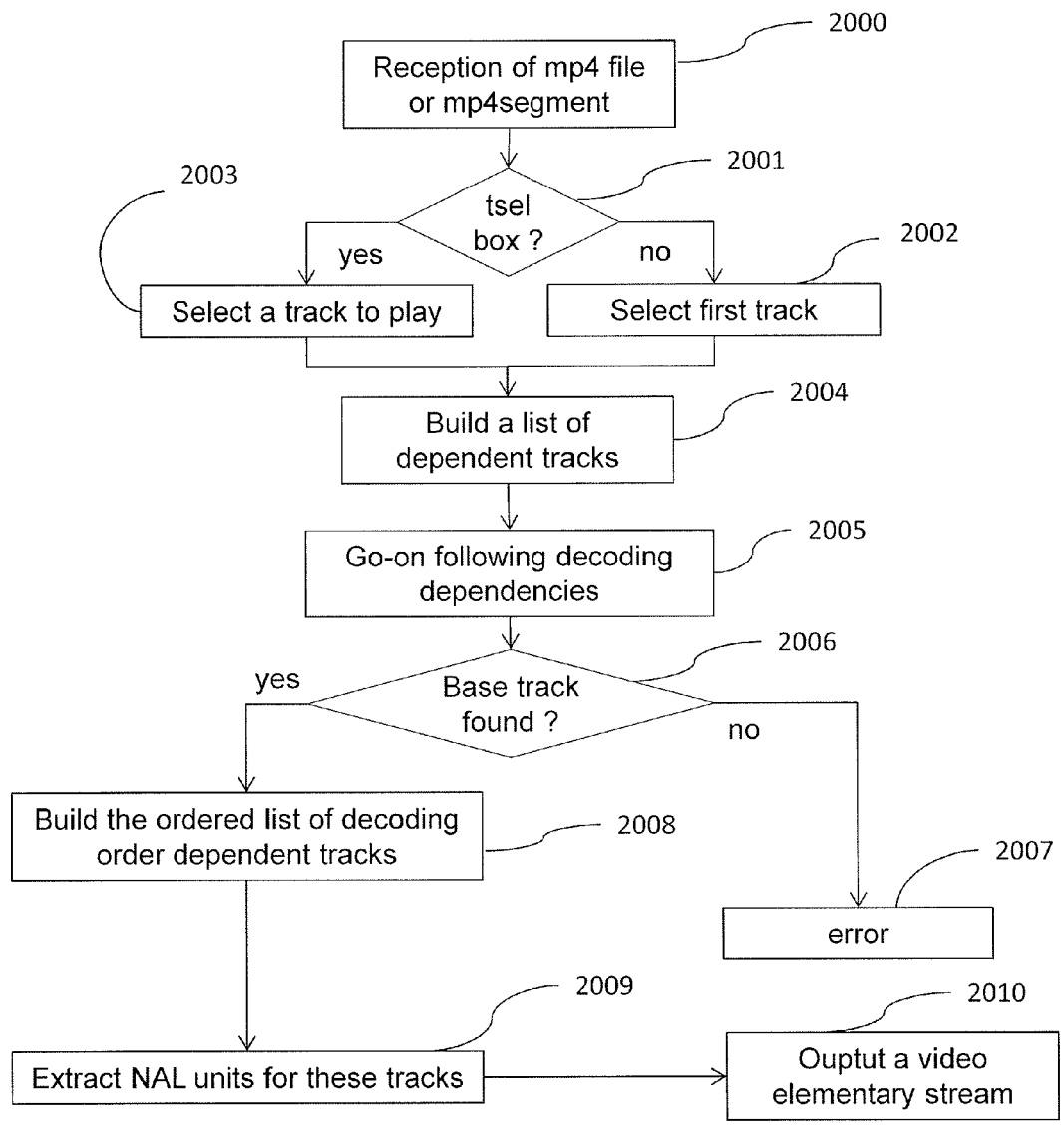
FIG. 20 is a flow chart illustrating a process carried out by a client device to interpret a mp4 file or segments encapsulated using a generic signaling for coding dependencies.

FIG. 20 is a flow chart illustrating a process carried out by a client device to interpret an mp4 file or segments encapsulated using a generic signaling for coding dependencies.

As illustrated, a first step (step 2000) consists in the reception of the mp4 file that can be a local file or a file downloaded from a server or streamed as segments. In a following step (step 2001) the moov box and a trak box are located to determine whether or not a user data box is present and contains a track selection box (tsel). This can help a client device or a user in choosing a track to display.

If no track selection box is present (i.e. the result of step 2001 is false), the track corresponding to the first encountered trak box is selected as default (step 2002). On the contrary, if a track selection box is present (i.e. the result of step 2001 is true), the client device can present the attributes of the tracks to the user to help him in his selection (step 2003). Alternately, the client device can parse the media handler information associated to the track in the track header box (e.g. reference in FIG. 11). According to this embodiment, only a video track (e.g. composite track 1810 in FIG. 18) can be selected and no tile track (e.g. tile tracks 1830 to 1890 in FIG. 18) or parameter set track (e.g. parameter set track 1820 in FIG. 18).

In a following step (step 2004), the client device starts parsing the track reference box for the selected track in order to build the list of tracks it is depending on for decoding. For each track in the list, it iteratively processes the decoding dependencies (step 2005).

While building this list, the client checks whether all of the dependent tracks contain a 'dpnd' reference type involving dependencies to other tracks (step 2006). In such a case, the process ends since such a case should not happen (step 1007). On the contrary, if at least one of the dependent tracks does not contain any 'dpnd' reference type to other tracks, it is selected as the base track to build the list of ordered tracks (step 2008) that guides creation of the samples at step 2009. The order is given by following the 'dodp' dependencies declared in this track (reference 1922 in FIG. 19).

This step is iterative on ordered tracks as obtained from step 2008 and on the NAL units having the same timestamp. For a given track, all NAL units with the same timestamp are concatenated. The so-concatenated NAL units are followed by the NAL units from the next track in the ordered list with again the same timestamp and so on until the end of the ordered list of tracks. Then, the next sample is built (corresponding to the next timestamp) following the same principle until the end of the input segment or file.

This leads to the generation of a video elementary stream at step 2010.

It is to be noted that the process carried out by the client device, in particular the step of getting a base track (i.e. steps 2005 and 2006) can be simplified by adding dependency information indicating which track is the base track. This can be done, for example, by using the track reference type 'tbas' or sbas as in ISO/IEC 14496-95 or box tbas' as described by reference to FIG. 13.

It is also to be noted that a verification step can be combined with step 2004 (during which the client follows the decoding dependencies), especially in a streaming configuration according to which not all the data are generally present in the client device. Indeed, when a decoding dependency is read by the client device, the referenced track must be present in the client device otherwise, the decoding won't be possible. If they are not already received, they can be requested at that time to enable the client to create samples (step 2009). At the opposite, if in the ordered list of tracks built at step 2008, if one track is not available at client side, it can be ignored without error. This enables to play only a spatial subpart of the whole video.

For the sake of clarity, the example illustrated in FIG. 19*b* is a simple case where only a single layer tiled stream is encapsulated with independent tiles. In the case of non-independent tiles, some decoding dependencies are signaled in the track reference box and a decoding order dependency is also signaled in the track to indicate that the NALU from this track shall occur before the ones in the track. For example, as illustrated in FIG. 19*b*, when tile i has a coding dependency from the tile corresponding to track having its ID equals to 4 (reference 1980), a decoding dependency 1981 is signaled in the track reference box and a decoding order dependency is also signaled (1971) in the track with ID=4 (reference 1970) to indicate that the NALU from this track shall occur before the ones in the track with ID=tile$_i$. This would be the same when tiles at an enhancement layer depend on the same tile at a lower layer.

Figure 21B:
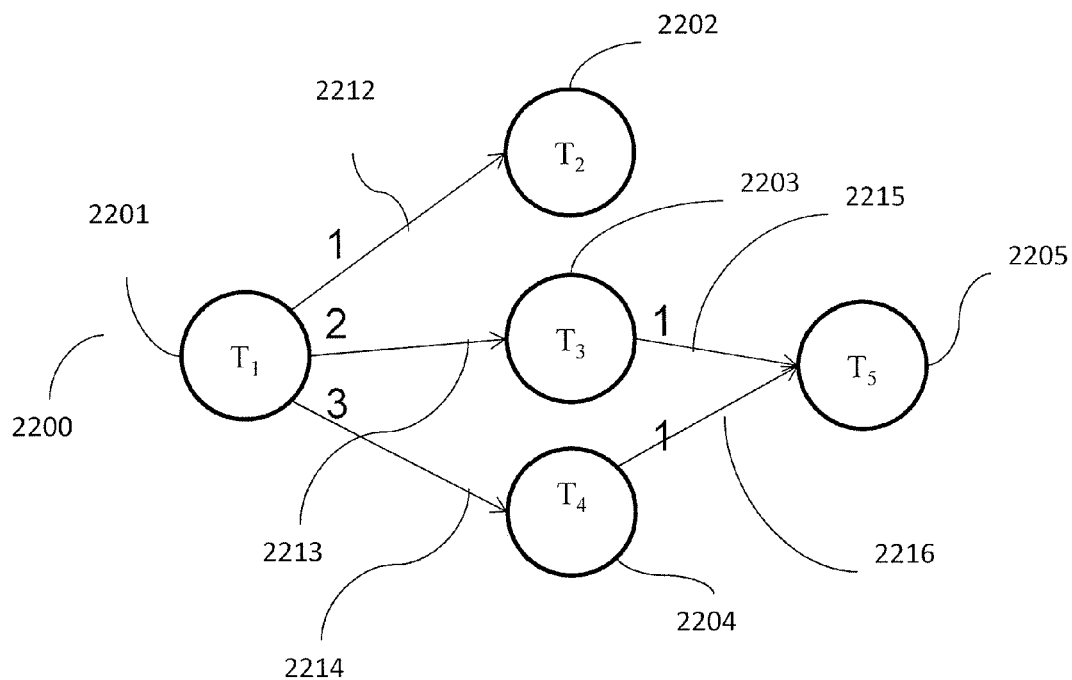

The process described in relation to FIG. 20 is illustrated in FIG. 21*b* when considering the decoding dependency graph from FIG. 21*a*. The 'dodp' dependency finally describes dependencies using track references going upward. As illustrated, the dependency graph comprises the order given on the dependencies from track T1 (2201): 2212, 2213, and 2214. These dependencies indicate that the expected processing order of samples Si at time t shall be: S1(t), S2(t), S3(t), S4(t), S5(t). If at a time MT2 there is no sample on the track T1 and no sample on the track T4, the processing order of samples shall be: S2(MT2), S3(MT2), S5(MT2), thus ignoring the decoding order dependency when no sample is available at a given time.

Finally, this new decoding order or upward dependency ('dodp' or whatever the 4-letter code name) can be summarized as follows: a 'dodp' reference defines a dependency sub-tree between the referencing track and the reference tracks. Referenced tracks may also have a 'dodp', defining other sub-trees. A track having a 'dodp' and not being referenced by any 'dodp' is the root of a dependency tree. For any media time MT, if there is a sample in one of the tracks in the dependency tree, the sample from Tracktref[i] with media time MT shall be passed to the media processor before the sample, if any, from Tracktref[i+1] with media time MT but after the sample, if any, with media time MT of the referring track. Starting from the root, all tracks in one level of the dependency tree are handled first, and tracks at a deeper level are then handled. If multiple dependencies referring to the same track are found, only the samples corresponding to first occurrence of the reference shall be passed to the media processor.

It is an error to have 'dodp' references between tracks that do not have the same media handler, but it is allowed to have 'dodp' references between tracks that do not have the same sample description types.

It is allowed to have a track with no sample used to carry a 'dodp' track reference; this allows for example describing coding hierarchy of HEVC tiles stored in separated tracks in an ISOBMF file with all parameter sets stored in the sample description of an empty track carrying the 'dodp'.

Tracks referenced by 'dodp' may not be processable individually, in which case, for backward compatibility reasons, these tracks shall be marked as disabled. A 'dodp' aware media processor may decide to play all or part of the disabled tracks.

More generally, the decoding order dependency allows for flexible description of coded-dependent media or provides simple sample data partitioning. Indeed, in opposition to extractors, this mechanism separates the dependency description from the actual NAL unit aggregation process. It then allows describing coding dependencies of enhancement layers stored in an ISOBMF files for a base media stream(s) stored or delivered by external means.

An extension of this dependency signaling that provides more flexibility than signaling based on the use of extractors is directed to the case according to which decoding dependencies change along time. For example, a virtual track consisting of several tile tracks can represent a region of interest at a given time. This region of interest may change along time leading to modifications of the dependencies between the virtual track and the track tiles (covered by the ROI). To be in position of handling such a case, a new track reference box is introduced at the track fragment level: a "track fragment reference box" (tfrf) that enables to temporarily overload the dependencies declared in the global track reference box in the trak box.

This embodiment for sample description regarding the tiling configuration applies to a single track encapsulated tiled HEVC bit-stream. It may find application for MPEG-4 encapsulation of a tiled HEVC bit-stream or at client side, after the resolution of the extractors of a composite track in order to save the downloaded spatial parts into a single video track conforming to MPEG-4 standard. Another application if directed to the transformation of a composite track into a standard single track conforming MPEG-4, addressed to a MPEG-4 parser that does not support extractors.

Figure 12:
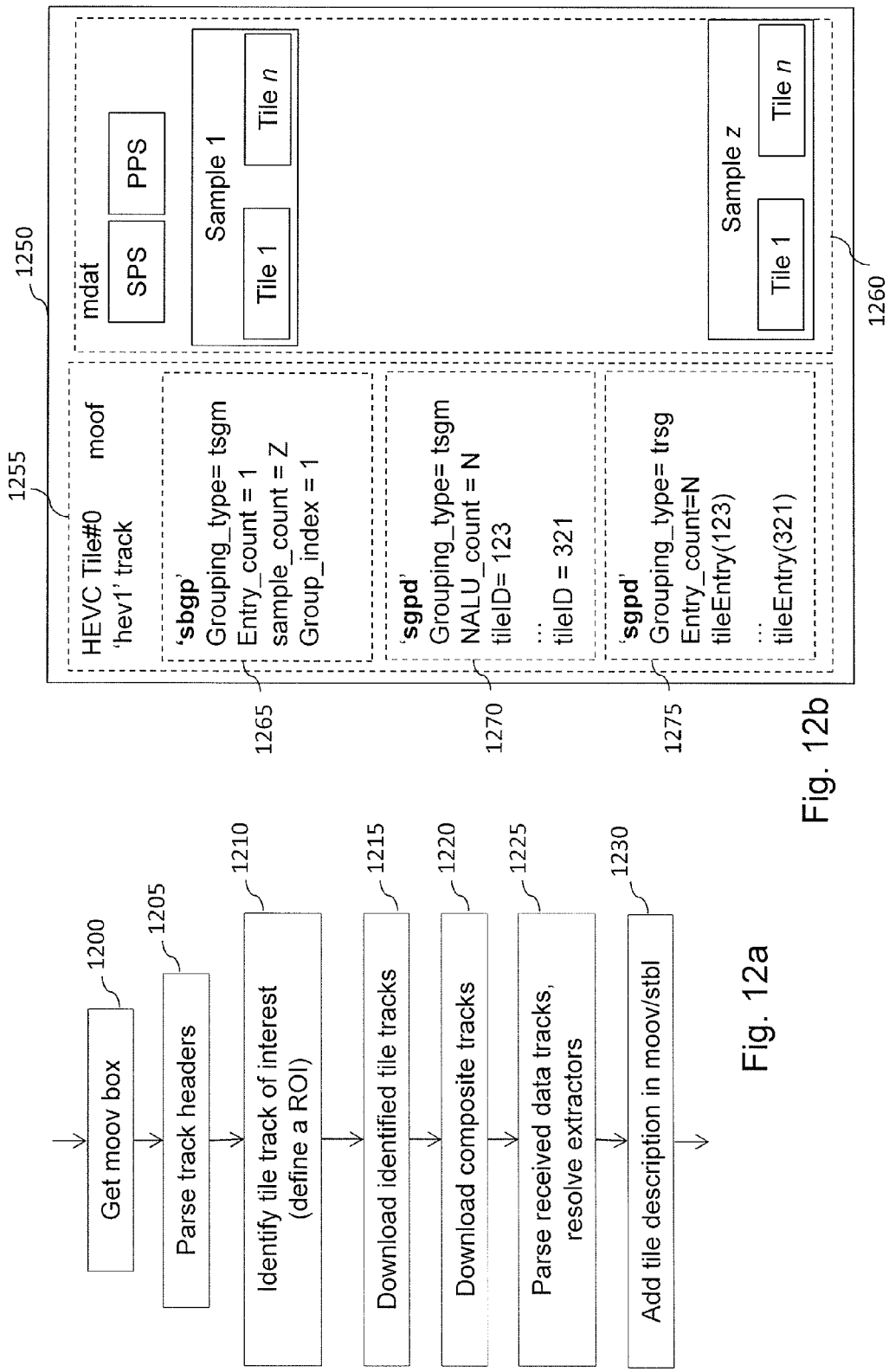
FIG. 12, comprising

FIG. 12, comprising FIG. 12a and FIG. 12b, illustrates signalization of the position of a tile in a full video, the size of the tile, and of the indication that the tile track can be decoded without any artifact, at sub-sample level, adapted to handle various tiling configuration.

FIG. 12a illustrates steps carried out by a client device (e.g. video player). In a first step (step 1200), the client device downloads initialization data, or reads initialization data if the file is a local file, for example initialization data of an encapsulated bit-stream conforming to MPEG-4 standard, typically the content of a moov box.

From these initialization data, the client device can parse track header information where tile information is coded (step 1205). With this tile information, the user can choose a region of interest via a graphical interface of the client device (step 1210) that can correspond to one or more tiles.

The corresponding tile tracks as well as the composite track are downloaded or read by the client device (steps 1215 and 1220). Next, the extractors of the composite tracks are resolved using tile tracks so as to obtain a single video track (step 1225). Finally, the client device builds and adds the tiling description, for example in the SampleTableBox, in the obtained video track (step 1230).

An example of tiling description is illustrated in FIG. 12b. As illustrated, tiling description 1250 comprises movie box "moof" 1255 and data box 'mdat' 1260. 'moof' box 1255 contains one SampleTable box per track that contains a SampleToGroup box 1265 that describes the different sample groups, a sample group description box 1270 that describes the mapping between NAL units of each sample and the tiles and a sample group description box 1275 that contains the tile descriptions. The sample to group box 1265 indicates the 'tsgm' grouping type for the group entry TileSampleMapEntry.

The TileNALUMapEntry (or more generally NALUMapEntry) group entry 1270 defines the mapping between NAL units of a sample and the tiles (this is the reason why such an embodiment refers to sub-sample level signaling). This box that grouping_type parameter is equal to 'tsgm' contains the number of NAL units per sample.

The TileNALUMapEntry (or NALUMapEntry) box can be defined as follows (as illustrated in FIG. 12b):

```
class TileNALUMapEntry( ) extends VisualSampleGroupEntry ('tsgm') {
    unsigned int(8) reserved = 0;
    unsigned int(8) entry_count;
    for (i=1; i<= entry_count; i++)
        unsigned int(32) tileID;
    }
}
``` where entry_count indicates the number of NALUs in a track sample and tileID provides the unique identifier for the spatial tile described by the current track. The TileNALUMapEntry (or NALUMapEntry) box can also be optimized, in terms of size, as follows:

```
class TileNALUMapEntry( ) extends VisualSampleGroupEntry ('tsgm') {
    unsigned int(6) reserved = 0;
    unsigned int(1) large_size;
    unsigned int(1) mode;
    if (large_size) {
        unsigned int(16) entry_count;
    } else {
        unsigned int(8) entry_count;
    }
    for (i=1; i<= entry_count; i++)
        if (mode) {
            if (large_size) {
                unsigned int(16) NALU_start_number;
            } else {
                unsigned int(8) NALU_start_number;
            }
        }
        unsigned int(16) tileID;
    }
}
``` where large_size parameter indicates whether the number of NAL unit entries in the track samples is represented on 8 or 16 bits and mode parameter indicates whether each NAL unit entry is described (when mode is not set) or only the NAL unit entries corresponding to tile ID change (when mode is set). In the latter case, the NAL unit number is coded on 16 or 8 bits depending on the value of large_size parameter.

It specifies the mapping between each of these NAL units and a specific tile. The tile description is provided in the sample group description box 1275, as described here above, each tile being described one after the other.

It is to be noted that the given example is a particular case where one NAL unit contains data for one tile and this along the sequence duration. When tile data are split over several NAL units, several aggregators are used for describing the set of NAL units corresponding to the tile. When the number of NAL units varies over the time, several tileSampleMap entries can be defined and the samples to group reference alternatively, from one fragment to another, in track fragment header, the appropriate tile map entry via the grouping type.

In the data encapsulation scheme as described by reference to FIG. 10, HEVC bit-stream is encapsulated as a composite track 1015 that points to tile tracks 1020-1 to 1020-2 actually containing the compressed video data. The composite track contains the configuration data coming from the different HEVC parameter set NAL units (denoted PS in FIG. 10). The other elements of the composite track mainly consist in a list of extractors, one per sample and per tile track, pointing (via the track reference box ('tref') contained in moov box of the initialization segment file 1005) to the compressed video data encapsulated in the tile tracks.

The current dependency signaling means in ISO BMFF standard (Part 15 of the standard) are located in the track reference box 'tref' that is part of track boxes in the moov box of the initialization segment file 1005. The 'tref' box provides a reference from the containing track to another track in the presentation. The containing track may reference multiple other tracks in the presentation. The type of dependency between tracks is specified by a reference_type parameter that can take two values, 'scal' or 'sbas', in current standard. 'sbas' value stands for scalable base. It indicates that the referenced track is the scalable base track of the current track in a scalable presentation. 'scal' value stands for scalability. It indicates a relationship between tracks representing different layers of a scalable representation. It means that the containing track depends on the referenced track.

In the embodiment described by reference to FIG. 10, there are no specific scalability related dependencies. Even if scalable videos can be taken into consideration, focus is made here on spatial dependencies between the composite track and the tile tracks. These dependencies can be explicitly indicated, for example, with a new 'tile' value as done in the tref box of moov box of the initialization segment file 1005, corresponding to the composite track 1015 (id=1).

While the illustrated example of dependencies from one track to other tracks is directed to tiles (i.e. dependencies from one composite track to tile tracks), other types of dependencies from one track to one or several tracks can be handled similarly. Therefore, the reference_type parameter may indicate, for example, a sub-layer dependency (e.g. 'subl' value) to indicate that a track depends on one or more tracks.

Accordingly, sub-layer tracks can be defined as tracks containing parts of an HEVC elementary bit-stream, that can be discarded without harming the decoding process of other HEVC NAL units. Such a definition applies, in particular, to temporal layers in scalable HEVC bit-streams as well as to tile tracks, as described above. Each track corresponding to a sub-layer track can be marked in the HEVCConfiguration record (i.e. in the SampleTableBox) using a bit (or a flag) that when set to a predetermined value indicates that this HEVC track is a sub-layer track and only contains NAL units that are referenced from other track(s) (i.e. this HEVC track is not displayable), for example from a composite track. When the value of this bit or flag has the opposite value, it indicates that this HEVC track is a sub-layer track that also contains initialization data (i.e. this HEVC track is displayable). For example, it is possible to use reserved bits in the current HE VCDecoderConfigurationRecord box.

According to a particular embodiment described by reference to FIG. 12, each tile track is playable as a standard video track.

Figure 13:
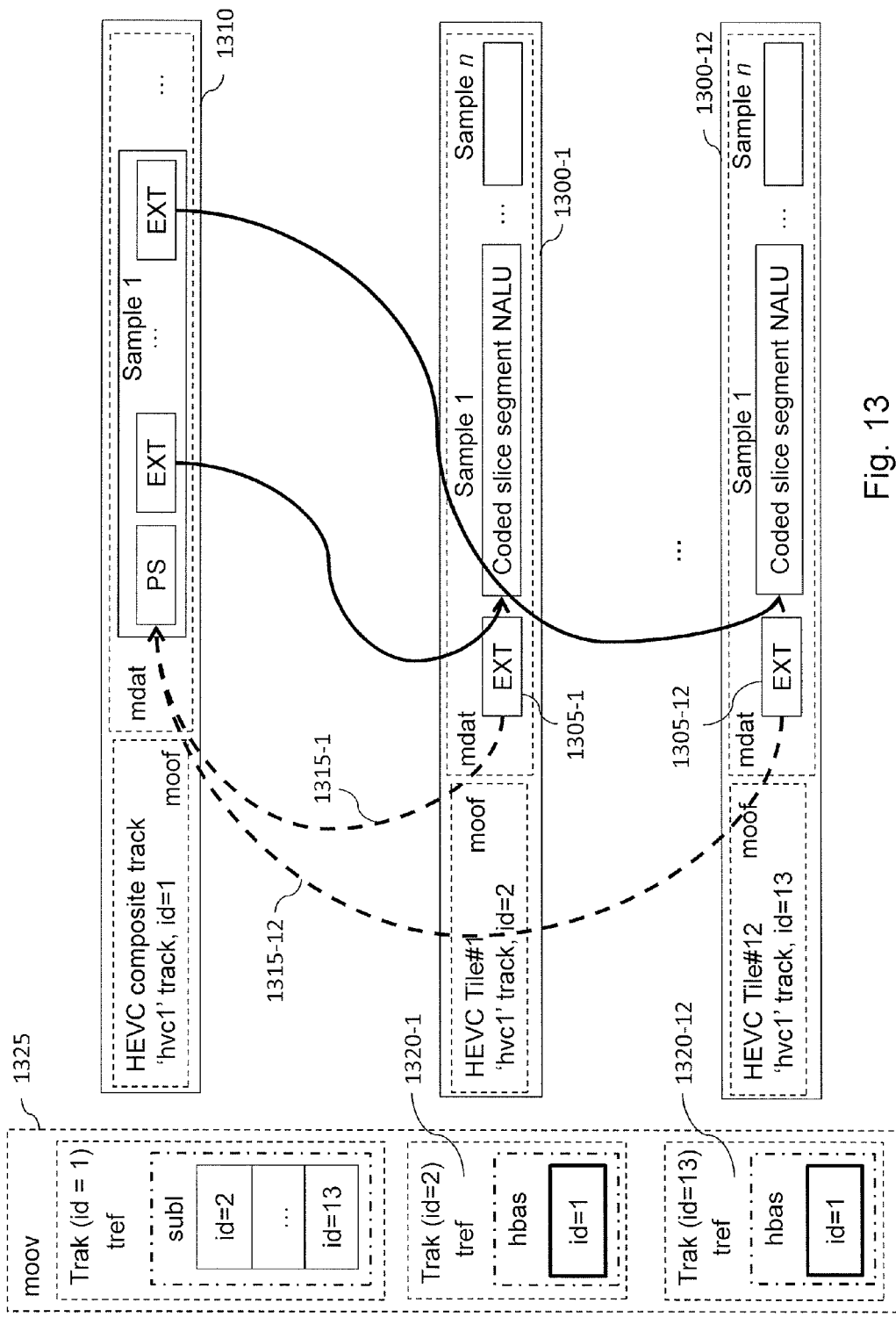
FIG. 13 illustrates an example of encapsulating a HEVC bit-stream as a set of tracks comprising a composite track and independent tile tracks that are playable as standard video tracks, according to an embodiment of the invention.

FIG. 13 illustrates an example of encapsulating a HEVC bit-stream as a set of tracks comprising a composite track and independent tile tracks that are playable as standard video tracks, according to an embodiment of the invention. For the sake of illustration, the encapsulated bit-stream corresponds to the video sequence schematically illustrated in FIG. 2.

The HEVC bit-stream encapsulation illustrated in FIG. 13 mainly differs from the one illustrated in FIG. 10 in that each tile track comprises a particular extractor that allows recovering of initialization and configuration data.

As illustrated, each of tile tracks 1300-1 to 1300-12 comprises an extractor 1305-1 to 1305-12 that points on HEVC parameter set NAL units (denoted PS) of composite track 1310, representing initialization and configuration data, being recalled that, according to HEVC standard, these initialization and configuration data typically correspond to the various parameter sets of the HEVC bit-stream. Accordingly, such initialization and configuration data make each tile track playable as a normal video track The extractor added to each tile track is advantageously located at the beginning of the media data box "mdat" of each tile track, before video data samples.

These dependencies from the tiles tracks (1300-1 to 1300-12) to the composite track (1310), denoted 1315-1 to 1315-12, have to be signaled, for example in the reference_type parameter of 'tref' boxes 1320-1 to 1320-12 associated to the tile tracks (in movie box 'moov' of initialization segment file 1325). According to this embodiment, the track containing the parameter set is considered as the HEVC base track tbas' (this is close to the SVC case where the track that contains the lowest operating point in a scalable presentation is considered as the 'scalable base track' 'sbas'). As illustrated, the tracks depending on the base track (i.e. tile tracks 1300-1 to 1300-12, having identifiers id=2 to 12, depending on composite track 1310, having identifier id=1) have the value tbas' in their track reference box (1320-1 to 1320-12).

Again, the tiling signalization can be at track level, at a sample level, or at track and sample levels.

It is to be noted that by default tile tracks are considered as not displayable. However, an advanced parser conforming to MPEG-4 standard can detect displayable tile tracks and expose them, for example, in a streaming manifest file by looking at the 'tref' box (if the tile track contains a reference type of the tbas' type, it can be considered as displayable). This means that this tile track can be considered as a standard video track even if marked with 'tile' value in the handler box. When the tiling signalization is sample based, the tile tracks or sub-layer tracks can be tagged as 'vide' in their handler box since the tiling information is put in the box known as SampleTableBox.

FIG. 14 illustrates an example of encapsulating a HEVC bit-stream as a set of tracks comprising a composite track, an initialization data track, and independent tile tracks that are playable as standard video tracks, according to another embodiment of the invention. For the sake of illustration, the encapsulated bit-stream corresponds to the video sequence schematically illustrated in FIG. 2.

The HEVC bit-stream encapsulation illustrated in FIG. 14 mainly differs from the one illustrated in FIG. 13 in that initialization data are put in a dedicated initialization data track 1400 (and not in the composite track 1310).

One of the advantages provided by such an embodiment as compared to the one described by reference to FIG. 13 is directed to the amount of data to be transmitted when tile tracks are to be played independently. Since initialization data are transmitted in a dedicated track, it is not requested to transmit the composite track.

It is to be recalled that according to the current specification of the HEVC file format, there exist two possibilities to convey parameter sets (PS) in the file format: in the box known as Sample Entry only or in the Sample Entry box and in the data samples. These two configurations are respectively signaled with the 'hvc1' and 'hev1' boxes in a box known as Sample Table. While storing parameters in samples is more complex, it allows for more dynamism in the case of parameter set updates. Therefore, in a preferred embodiment, parameter sets are conveyed in the Sample Entry box and in the data samples (with 'hev1' value in HEVCSampleEntries parameter in the Sample Table box) in order to be able to handle picture parameter sets (PPS) changes, in particular for tiling configuration changes.

Accordingly, dedicated initialization data track 1400 contains as data only non-VCL HEVC NAL units like NAL units that type is equal to 32, 33, or 34, corresponding to video parameter set, sequence parameter set, or picture parameter set, respectively.

As illustrated in FIG. 14, extractors 1415-1 to 1415-12 located at the beginning of the media data box "mdat" of the tile tracks 1410-1 to 1410-12 point to data of dedicated initialization data track 1400. Likewise, the first extractor (1420) of the composite track 1405 points to data of dedicated initialization data track 1400. Therefore, initialization data track 1400 is the only track of the encapsulated HEVC bit-stream that does not reference any other track. As such, since there is not any dependency indicated in the tref box (no tbas' dependency in tref box) associated to initialization data track 1400 (id=2), the latter is considered as not displayable independently.

When some initialization data are modified in the video bit-stream (i.e. when Picture Parameter Sets occur in the HEVC bit-stream), they are put in the sample data as illustrated with reference 1425, at the temporal location where changes occur. Corresponding extractors referenced 1430 and 1435-1 to 1435-12 are inserted in composite track 1405 and in each of the tile tracks 1410-1 to 1410-12, respectively, that is to say in each tile track referring to these new PPS.

In each track of the encapsulated HEVC bit-stream, the samples (and associated NALUs) are organized in temporal order. Likewise, the Picture Parameter Sets are organized in temporal order in the dedicated initialization data track 1400. A 'trun' box (not represented in FIG. 14) allows providing the correct decoding time for each sample.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of generating at least one media file based on partitioned timed media data in a server to be transmitted to a client, the partitioned timed media data comprising timed samples, each timed sample comprising a plurality of subsamples, the method comprises:
grouping one or more of the plurality of subsamples of a timed sample into at least one group;
creating at least one track comprising one or more subsamples which are grouped into a same group and corresponding subsamples of other timed samples,
and creating a box for describing a group identifier of the subsamples which are grouped into said same group, the group identifier being used to associate NAL units of the subsamples which are grouped into said same group with a particular TileRegionGroupEntry; and
generating at least one media file based on each of the created tracks and the created box.

2. The method of claim 1, further comprising a step of linking a group of samples or of subsamples to at least one tile.

3. The method of claim 2, wherein at least one of the created boxes or an associated track comprises information to indicate that the at least one of the created boxes or the associated track provides tiling information.

4. The method of claim 2, wherein the step of linking a group of samples or of subsamples to at least one tile comprises defining a sample group description identifier in one created box, the value of said sample group description identifier corresponding to a tile identifier value associated with the at least one tile.

5. The method of claim 1, wherein a group of tiles is encoded within at least one sub-track associated with at least one of the created boxes.

6. The method of claim 5, wherein at least one of the created boxes comprises information to indicate a number of tiles encoded within a sub-track associated with at least one of the created boxes.

7. The method of claim 1, wherein the group identifier is described in a movie box (moov box) defined in ISO/IEC 14496-12.

8. The method of claim 1, wherein said TileRegionGroupEntry comprising:
the group identifier,
information relating to coding dependencies of corresponding subsamples, and
information relating to horizontal offset and vertical offset of corresponding subsamples.

9. A non-transitory computer-readable storage medium storing instructions of a computer program for causing a computer to implement the method according to claim 1.

10. The method of claim 1, wherein the created box corresponds to a TileRegionGroupEntry.

11. A device for generating at least one media file based on partitioned timed media data to be transmitted to another device, the partitioned timed media data comprising timed samples, each timed sample comprising a plurality of subsamples, the device comprising at least one processor configured to:
group one or more of the plurality of subsamples of a timed sample into at least one group;
create at least one track comprising one or more subsamples which are grouped into a same group and corresponding subsamples of other timed samples, and create a box for describing a group identifier of the subsamples which are grouped into said same group, the group identifier being used to associated NAL units of the subsamples which are grouped into said same group with a particular TileRegionGroupEntry; and
generate at least one media file based on each of the created tracks and the created box.

12. The device of claim 11, wherein the group identifier is described in a movie box (moov box) defined in ISO/IEC 14496-12.

13. The device of claim 11, wherein said TileRegionGroupEntry comprises:

the group identifier, information relating to coding dependencies of corresponding subsamples, and information relating to horizontal offset and vertical offset of corresponding subsamples.

14. The device of claim 11, wherein at least one of the created boxes comprises information to indicate that the at least one of the created boxes provides tiling information.

15. The device of claim 11, wherein the at least one processor is further configured to link a group of samples or of subsamples to at least one tile.

16. The device of claim 15, wherein linking a group of samples or of subsamples to at least one tile comprises defining a sample group description identifier in one created box, the value of said sample group description identifier corresponding to a tile identifier value associated with the at least one tile.

17. The device of claim 11, wherein a group of tiles is encoded within at least one sub-track associated with at least one of the created boxes.

18. The device of claim 11, wherein at least one of the created boxes comprises information to indicate a number of tiles encoded within a sub-track associated with at least one of the created boxes.

19. The device of claim 11, wherein media files generated based on each of the created tracks comprise a data structure for storing metadata including definitions of the corresponding track, including definitions of the created boxes comprised within the corresponding track.

20. The device of claim 11, wherein the created box corresponds to a TileRegionGroupEntry.

* * * * *